US012500635B2

(12) United States Patent
Gao et al.

(10) Patent No.: US 12,500,635 B2
(45) Date of Patent: Dec. 16, 2025

(54) PRIORITY RULES FOR CSI REPORTS FOR COHERENT JOINT TRANSMISSION

(71) Applicant: Telefonaktiebolaget LM Ericsson (publ), Stockholm (SE)

(72) Inventors: Shiwei Gao, Nepean (CA); Siva Muruganathan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 19/102,580

(22) PCT Filed: Aug. 11, 2023

(86) PCT No.: PCT/IB2023/058158
§ 371 (c)(1),
(2) Date: Feb. 10, 2025

(87) PCT Pub. No.: WO2024/033900
PCT Pub. Date: Feb. 15, 2024

(65) Prior Publication Data
US 2025/0266871 A1 Aug. 21, 2025

Related U.S. Application Data

(60) Provisional application No. 63/397,521, filed on Aug. 12, 2022.

(51) Int. Cl.
*H04L 1/02* (2006.01)
*H04B 7/0456* (2017.01)

(52) U.S. Cl.
CPC .................. *H04B 7/0456* (2013.01)

(58) Field of Classification Search
CPC .................................................... H04B 7/0456
(Continued)

(56) References Cited

U.S. PATENT DOCUMENTS

| 2013/0106626 | A1* | 5/2013 | Fukui | ...................... H03M 7/00 341/50 |
| 2023/0075037 | A1* | 3/2023 | Liu | ....................... H04B 7/0626 |
| 2023/0344491 | A1* | 10/2023 | Lee | ......................... H04B 7/048 |

FOREIGN PATENT DOCUMENTS

| WO | 2020225642 A1 | 11/2020 |
| WO | 2023026196 A1 | 3/2023 |

(Continued)

OTHER PUBLICATIONS

Author Unknown, "RAN1 Chair's Notes," 3GPP TSG RAN WG1 #109-e, May 9-20, 2022, Electronic Meeting, 209 pages.
(Continued)

*Primary Examiner* — Helene E Tayong
(74) *Attorney, Agent, or Firm* — Withrow & Terranova, PLLC

(57) ABSTRACT

Systems and methods related to prioritization of non-zero coefficients for Channel State Information (CSI) for Coherent Joint Transmission (CJT) are disclosed. Embodiments of a UE and corresponding embodiments of a method performed by a UE for CJT CSI feedback in which non-zero coefficients of a precoding matrix indicator (PMI) feedback are prioritized are disclosed. Embodiment of a network node and corresponding embodiment of a method performed by a network node for CJT CSI feedback in which non-zero coefficients of a PMI feedback are prioritized are also disclosed.

20 Claims, 12 Drawing Sheets

(58) Field of Classification Search
USPC .......................................................... 375/267
See application file for complete search history.

(56) References Cited

FOREIGN PATENT DOCUMENTS

WO    2023026200  A1    3/2023
WO    2023170655  A1    9/2023

OTHER PUBLICATIONS

Author Unknown, "Technical Specification Group Radio Access Network; NR; Physical layer procedures for data (Release 15)," Technical Specification 38.214, Version 15.16.0, Mar. 2022, 3GPP Organizational Partners, 107 pages.

Author Unknown, "Technical Specification Group Radio Access Network; NR; Physical layer procedures for data (Release 17)," Technical Specification 38.214, Version 17.2.0, Jun. 2022, 3GPP Organizational Partners, 228 pages.

Ericsson, "R1-2203229: On CSI enhancements for Rel-18 NR MIMO evolution," 3GPP TSG-RAN WG1 Meeting #109-e, May 9-20, 2022, Electronic Meeting, 20 pages.

Lee, Gilwon, et al., "CSI Feedback for Distributed MIMO," IEEE Wireless Communications and Networking Conference, Apr. 10, 2022, pp. 2154-2159.

Nokia, et al., "R1-2204540: CSI enhancement for high/medium UE velocities and CJT," 3GPP TSG RAN WG1 Meeting #109-e, May 9-20, 2022, Electronic Meeting, 30 pages.

Xiamo, "R1-2203795: Discussion on CSI enhancement," 3GPP TSG RAN WG1 #109-e, May 9-20, 2022, Electronic Meeting, 8 pages.

International Search Report and Written Opinion for International Patent Application No. PCT/IB2023/058158, mailed Nov. 27, 2023, 18 pages.

International Preliminary Report on Patentability for International Patent Application No. PCT/IB2023/058158, mailed Jul. 4, 2024, 9 pages.

* cited by examiner $\text{Pri}(l, i, f, s)$ $(N_{RS}=2, v=4, L_1=L_2=2,)$

| | FD basis vector with $n_{3,l,s}^{(f)}=0$ | | | | | | | | | | | | FD basis vector with $n_{3,l,s}^{(f)}=N_3-1$ | | | | | | | | |
|---|---|---|---|---|---|---|---|---|---|---|---|---|---|---|---|---|---|---|---|---|---|
| | s=1 (TRP1) | | | | s=2 (TRP2) | | | | s=1 (TRP1) | | | | s=2 (TRP2) | | | | | | | | |
| $l$ | i=0 | i=1 | i=2 | i=3 | i=0 | i=1 | i=2 | i=3 | i=0 | i=1 | i=2 | i=3 | i=0 | i=1 | i=2 | i=3 | | ... |
| 1 | 1 | 5 | 9 | 13 | 17 | 21 | 25 | 29 | 33 | 37 | 41 | 45 | 49 | 53 | 57 | 61 | |
| 2 | 2 | 6 | 10 | 14 | 18 | 22 | 26 | 30 | 34 | 38 | 42 | 46 | 50 | 54 | 58 | 62 | |
| 3 | 3 | 7 | 11 | 15 | 19 | 23 | 27 | 31 | 35 | 39 | 43 | 47 | 51 | 55 | 59 | 63 | |
| 4 | 4 | 8 | 12 | 16 | 20 | 24 | 28 | 32 | 36 | 40 | 44 | 48 | 52 | 56 | 60 | 64 | | ... |

*FIG. 7*

PRIORITY RULES FOR CSI REPORTS FOR COHERENT JOINT TRANSMISSION

RELATED APPLICATIONS

This application is a 35 U.S.C. § 371 national phase filing of International Application No. PCT/IB2023/058158, filed Aug. 11, 2023, which claims the benefit of provisional patent application Ser. No. 63/397,521, filed Aug. 12, 2022, the disclosures of which are hereby incorporated herein by reference in their entireties.

TECHNICAL FIELD

The present disclosure relates to a cellular communications system and, more specifically, to Channel State Information (CSI) reporting for Coherent Joint Transmission (CJT) in a cellular communications system.

BACKGROUND

Codebook-Based Precoding

Multi-antenna techniques can significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

A core component of the fourth and fifth Generation (4G/5G) wireless network or New Radio (NR) specified in the $3^{rd}$ Generation Partnership Project (3GPP) is the support of MIMO antenna deployments and MIMO related techniques such as spatial multiplexing. Spatial multiplexing can be used to increase data rates in favorable channel conditions. FIG. 1 shows an example of spatial multiplexing, where an information carrying symbol vector s is multiplied by an $N_T \times r$ (rows×columns) precoding matrix or precoder W, which serves to distribute the transmit energy on the $N_T$ transmit antenna ports in r "virtual" spatial directions such that they can be distinguished at the UE. The precoding matrix is typically selected from a codebook of possible precoding matrices, and typically reported by a UE in the form of a Precoding Matrix Indicator (PMI). PMI indicates a desired precoding matrix in the codebook for a given number of symbol streams. Vector s contains r symbols each corresponding to a MIMO layer and r is referred to as the transmission rank. In this way, spatial multiplexing is achieved since multiple symbols can be transmitted simultaneously over the same time/frequency Resource Element (RE). r is selected to suit the channel.

NR uses Orthogonal Division Multiplexing (OFDM) in downlink. The received $N_R \times 1$ vector y at a UE on a certain RE can be expressed as $$y = HWx + e$$

where e is a receiver noise/interference vector.

The precoder W is chosen to match the characteristics of the $N_R \times N_T$ MIMO channel matrix H. This is also commonly referred to as closed-loop precoding. In closed-loop precoding, the UE feeds back recommendations on a suitable precoder to the next generation Node B (gNB) in the form of a PMI based on downlink channel measurements. For that purpose, the UE is configured with a Channel State Information (CSI) report configuration including CSI Reference Signals (CSI-RS) for channel measurements and a codebook of candidate precoders. In addition to precoders, the feedback may also include a Rank Indicator (RI) and a Channel Quality Indicator (CQI). RI, PMI, and CQI are part of a CSI feedback. In NR, PMI feedback can be either wideband, where one PMI is reported for the entire channel bandwidth, or frequency-selective, where one PMI is reported for each of multiple subbands, which is defined as a number of contiguous Physical Resource Blocks (PRBs) ranging between 4-32 physical resource blocks (PRBs) depending on the Bandwidth Part (BWP) size.

Given the CSI feedback from the UE, the gNB determines the transmission parameters it wishes to use to transmit to the UE, including the precoding matrix, transmission rank, and Modulation and Coding Scheme (MCS).

2D Antenna Arrays

Two-dimensional antenna arrays are widely used and can be described by a number of antenna ports, $N_1$, in a first dimension (e.g., the horizontal dimension), a number of antenna ports, $N_2$, in a second dimension that is perpendicular to the first dimension (e.g., the vertical dimension), and a number of polarizations $N_p$. The total number of antenna ports is thus $N = N_1 N_2 N_p$. The concept of an antenna port is non-limiting in the sense that it can refer to any virtualization (e.g., linear mapping) to the physical antenna elements. For example, pairs of physical antenna elements could be fed the same signal, and hence share the same virtualized antenna port.

An example of a 4×4 (i.e., $N_1 \times N_2$,) array with dual-polarized antenna elements (i.e., $N_p=2$) is illustrated below in FIG. 2. In other words, FIG. 2 illustrates an example of a two-dimensional antenna array of dual-polarized antenna elements ($N_p=2$), with $N_1=4$ horizontal antenna elements and $N_2=4$ vertical antenna elements.

Precoding may also be interpreted as beamforming where the signal to be transmitted on the antenna ports are multiplied by a set of beamforming weights prior to transmission. The beamforming weights are specified by the precoding matrix. Each MIMO layer is transmitted on an antenna beam.

Channel State Information Reference Signals

A CSI-RS is transmitted on an antenna port at the gNB and is used by a UE to measure downlink channel between the antenna port and each of the UE's receive antenna ports. The transmit antenna ports are also referred to as CSI-RS ports. The supported numbers of CSI-RS ports in NR are {1,2,4,8,12,16,24,32}. By measuring the received CSI-RS, a UE can estimate the channel that the CSI-RS is traversing, including the radio propagation channel and antenna gains. The CSI-RS for the above purpose is also referred to as Non-Zero Power (NZP) CSI-RS.

CSI-RS can be transmitted in certain REs in a slot and certain slots. FIG. 3 shows an example of CSI-RS REs for 12 antenna ports in one resource block (RB), where each CSI-RS port is transmitted in one RE per RB. The REs for CSI-RS is referred to as CSI-RS resource In addition, Interference Measurement Resource (IMR) is also defined in NR for a UE to measure interference. An IMR resource contains 4 REs, either 4 adjacent RE in frequency in the same OFDM symbol or 2 by 2 adjacent REs in both time and frequency in a slot. By measuring both the channel and the interference, a UE can estimate the effective channel and noise plus interference and determine the CSI.

CSI Framework in NR

In NR, a UE can be configured with multiple CSI reporting settings and multiple CSI resource settings. Each resource setting can contain multiple CSI-RS resource sets, and each resource set can contain up to 8 CSI-RS resources. For each CSI reporting setting, a UE feeds back a CSI report.

Each CSI reporting setting contains at least the following information:
- A CSI resource setting for channel measurement
- A CSI resource setting for interference measurement
- Time-domain behavior, i.e. periodic, semi-persistent, or aperiodic reporting
- Frequency granularity, i.e. wideband or subband
- CSI parameters to be reported such as RI, PMI, CQI, and CSI-RS resource indicator (CRI) in case of multiple CSI-RS resources configured in a resource set
- Codebook types, i.e. type I or II, and codebook subset restriction
- Measurement restriction
- Subband size. One out of two possible subband sizes is indicated, the value range depends on the bandwidth of the BWP. One CQI/PMI (if configured for subband reporting) is fed back per subband).

DFT-Based Precoders

A common type of precoders are Discrete Fourier Transform (DFT) based precoders, where the precoding vector used to precode each MIMO layer is a DFT vector. For a single-polarized Uniform Linear Array (ULA) with N antennas, a DFT based precoder is defined as $$w_{1D}(k) = u_k = \frac{1}{\sqrt{N}} \begin{bmatrix} e^{j2\pi \cdot 0 \cdot \frac{k}{ON}} \\ e^{j2\pi \cdot 1 \cdot \frac{k}{ON}} \\ \vdots \\ e^{j2\pi \cdot (N-1) \cdot \frac{k}{ON}} \end{bmatrix},$$

where k=0,1, ... ON−1 is the precoder index and O is an integer oversampling factor. $u_k$ is also referred to as a one dimension (1-D) DFT beam with beam index k. If ULA is along the horizontal dimension, each DFT beam points to an azimuth direction. If ULA is along the vertical dimension, each DFT beam points to an elevation direction. Each precoder corresponds to a DFT beam.

For a two-dimensional Uniform Planar Array (UPA) with $N_1$ antenna ports in one dimension and $N_2$ antenna ports in another dimension, a DFT based precoder can be created by taking the Kronecker product of two DFT precoder vectors, one in each dimension, as $$w_{2D}(k, l) = v_{k,l} = u_{k,1} \otimes u_{l,2},$$

$$\text{where } u_{k,1} = \frac{1}{\sqrt{N_1}} \begin{bmatrix} e^{j2\pi \cdot 0 \cdot \frac{k}{O_1 N_1}} \\ e^{j2\pi \cdot 1 \cdot \frac{k}{O_1 N_1}} \\ \vdots \\ e^{j2\pi \cdot (N_1-1) \cdot \frac{k}{O_1 N_1}} \end{bmatrix} \text{ and } u_{l,2} = \frac{1}{\sqrt{N_2}} \begin{bmatrix} e^{j2\pi \cdot 0 \cdot \frac{l}{O_2 N_2}} \\ e^{j2\pi \cdot 1 \cdot \frac{l}{O_2 N_2}} \\ \vdots \\ e^{j2\pi \cdot (N_2-1) \cdot \frac{l}{O_2 N_2}} \end{bmatrix}$$

are 1-D DFT beams in each of the two dimensions, and $O_1$ and $O_2$ are the over sampling factors in the two dimensions associated with $N_1$ and $N_2$, respectively. $v_{k,l}$ is also referred to a two dimensional (2-D) DFT beam characterized by two beam indices (k, l), one in each dimension. Each precoder corresponds to a 2D DFT beam.

Extending the DFT precoder for a dual-polarized UPA can then be done as $$w_{2D,DP}(k, l, \phi) = \begin{bmatrix} 1 \\ e^{j\phi} \end{bmatrix} \otimes w_{2D}(k, l) = \begin{bmatrix} w_{2D}(k, l) \\ e^{j\phi} w_{2D}(k, l) \end{bmatrix} = \begin{bmatrix} w_{2D}(k, l) & 0 \\ 0 & w_{2D}(k, l) \end{bmatrix} \begin{bmatrix} 1 \\ e^{j\phi} \end{bmatrix},$$

where $e^{j\phi}$ is a co-phasing factor that may be selected from M-Phase Shift Keying (PSK) alphabet such as Quadrature Phase Shift Keying (QPSK) with $$\phi \in \left\{0, \frac{\pi}{2}, \pi, \frac{3\pi}{2}\right\}.$$

The above assumes that the same DFT beam is used for both polarizations.

A precoding matrix $W_{2D,DP}$ for multi-layer transmission may be created by appending columns of DFT precoder vectors as $$W_{2D,DP} = [w_{2D,DP}(k_1, l_1, \phi_1) w_{2D,DP}(k_2, l_2, \phi_2) \ldots w_{2D,DP}(k_r, l_r, \phi_r)],$$

where r is the number of transmission layers. Such DFT-based precoders are used for instance in NR Type I CSI feedback, where each layer is associated with one 2D DFT beam.

MU-MIMO

With Multi-User MIMO (MU-MIMO), two or more users in the same cell are co-scheduled on a same time-frequency resource. That is, multiple data streams are transmitted to different User Equipments (UEs) at the same time-frequency resource and each UE may be allocated with one or more layers. By transmitting several streams simultaneously, the capacity of the system can be increased.

To avoid across UE or layer interference, Zero-Forcing (ZF) type of precoders may be used in which the feedback precoders associated with all co-scheduled UEs in a same time frequency resource are used together to generate a set of new orthogonal precoders. This requires each of the feedback precoders to be a good representation of the underlying channel.

However, a single DFT beam is generally not a good representation of a MIMO layer under multipath channel as each layer may be transmitted over multiple paths each corresponding to a DFT beam.

To improve the above single DFT beam based precoder, type II codebook based CSI feedback was introduced in NR Rel-15 and further enhanced in NR Rel-16 and Rel-17. The basic concept is that due to multipath propagation, each layer may contain more than one DFT beam. Hence, a better precoder may be created by combining multiple DFT beams for each layer and the UE feeds back both the multiple DFT beams and the combining coefficients.

NR Rel-15 Type II Codebook

In NR Rel-15, a type II codebook was introduced in which a precoder is a combination of multiple DFT beams. For each precoder, the UE feeds back the corresponding selected multiple DFT beams and the combination coefficients. A precoder may be reported for each layer and each subband. A common set of DFT beams are selected for all subbands and all layers. The number of DFT beams to be selected is Radio Resource Control (RRC) configured.

For a given 2D cross-polarized antenna array with $N_1$ antenna ports in one dimension and $N_2$ antenna ports in another dimension at each polarization, a precoding vector for each layer $l \in \{1,2\}$ in NR Rel-15 type codebook can be expressed as $$w_l = W_1 w_{2,l}$$

where $$W_1 = \begin{bmatrix} v_{m_1^{(0)}, m_2^{(0)}}, \ldots, v_{m_1^{(L-1)}, m_2^{(L-1)}} & 0 \\ 0 & v_{m_1^{(0)}, m_2^{(0)}}, \ldots, v_{m_1^{(L-1)}, m_2^{(L-1)}} \end{bmatrix},$$

$\{v_{m_1^{(0)}, m_2^{(0)}}, \ldots, v_{m_1^{(L-1)}, m_2^{(L-1)}}\}$ is a set of size $P_{CSI-RS}/2 \times 1$ selected 2-D DFT beams, $P_{CSI-RS} = 2N_1 N_2$, $m_1^{(i)} \in \{0,1,\ldots,O_1 N_1 - 1\}$ and $m_2^{(i)} \in \{0,1,\ldots,O_2 N_2 - 1\}$ are the beam indices in each dimension for the ith selected DFT beam. $L \in \{2,3,4\}$ is configured by RRC. $W_1$ is common to all layers.

$w_{2,l} = [w_{2,l,0}, w_{2,l,1}, \ldots, w_{2,l,2L-1}]^T$, where $w_{2,l,i} = p_{l,i}^{(1)} p_{l,i}^{(2)} \varphi_{l,i}$ is the combining coefficient associated with the ith beam, and $p_{l,i}^{(1)} p_{l,i}^{(2)} \varphi_{l,i}$ are the wideband amplitude, subband amplitude, and phase of $w_{2,l,i}$, respectively.

$w_l$ is expressed in section 5.2.2.2.3 of 3GPP Technical Specification (TS) 38.214 V15.16.0 as:

$$W^l_{q_1, q_2, n_1, n_2, p_l^{(1)}, p_l^{(2)}, c_l} = \frac{1}{\sqrt{N_1 N_2 \sum_{i=0}^{2L-1} (p_{l,i}^{(1)} p_{l,i}^{(2)})^2}} \begin{bmatrix} \sum_{i=0}^{L-1} v_{m_1^{(i)}, m_2^{(i)}} p_{l,i}^{(1)} p_{l,i}^{(2)} \varphi_{l,i} \\ \sum_{i=0}^{L-1} v_{m_1^{(i)}, m_2^{(i)}} p_{l,i+L}^{(1)} p_{l,i+L}^{(2)} \varphi_{l,i+L} \end{bmatrix}, l = 1, 2$$

where $m_1^{(i)} = O_1 n_1^{(i)} + q_1$, $m_2^{(i)} = O_2 n_2^{(i)} + q_2$, $q_1 \in \{0, 1, \ldots, O_1 - 1\}$, $q_2 \in \{0, 1, \ldots, O_2 - 1\}$, $n_1 = [n_1^{(0)}, \ldots, n_1^{(L-1)}]$, $n_2 = [n_2^{(0)}, \ldots, n_2^{(L-1)}]$, $n_1^{(i)} \in \{0, 1, \ldots, N_1 - 1\}$, $n_2^{(i)} \in \{0, 1, \ldots, N_2 - 1\}$, $i = 0, 1, \ldots, L - 1$. $p_l^{(p)} = [p_{l,0}^{(p)} \ldots p_{l,2L-1}^{(p)}]$, $p = 1, 2$.

NR Rel-16 Enhanced Type II Codebook

The Rel-15 type II codebook is enhanced in NR rel-16 in which instead of reporting separate precoders for different subbands, the precoders for all subbands are reported together by using a so called Frequency Domain (FD) basis. It takes advantage of frequency domain channel correlations by representing the precoder changes in frequency domain with a set of frequency domain DFT basis vectors (which will be simply referred to herein as frequency domain basis vectors). Due to channel correlation in frequency, only a few DFT basis vectors may be used to represent the precoder changes over all the subbands. By doing so, the feedback overhead can be reduced or performance can be improved for the same feedback overhead.

For a given CSI-RS resource with $N_1$ CSI-RS antenna ports in one dimension and $N_2$ CSI-RS antenna ports in another dimension, and with two polarizations, the Rel-16 type II precoding vectors for each layer $l(l=1, \ldots, v)$ and across all subbands can be expressed as:

$$W_l = \begin{bmatrix} w_l^{(0)} \ldots w_l^{(N_3-1)} \end{bmatrix} = W_1 \tilde{W}_{2,l} W_{f,l}^H,$$

where:

$w_l^{(t)}$ is a $P_{CSI-RS} \times 1$ precoding vector at a PMI subband with subband index $t \in \{0, 1, \ldots, N_3-1\}$ for layer l, where $P_{CSI-RS} = 2N_1 N_2$ is the number of CSI-RS ports in a configured NZP CSI-RS resource;

$N_3 = N_{SB} \times R$ is the number of subbands for PMI, where $N_{SB}$ is the number of CQI subbands and $R \in \{1,2\}$ is a scaling factor. Both $N_{SB}$ and R are RRC configured $W_1$ is the same as in Rel-15 type II codebook $W_{f,l} = [y_l^{(0)}, y_l^{(1)}, \ldots, y_l^{(M_v-1)}]$ is a size $N_3 \times M_v$ frequency domain (FD) compression matrix for layer l comprising $M_v$ selected FD basis vectors and $$y_l^{(f)} = [y_{0,l}^{(f)}, y_{1,l}^{(f)}, \ldots, y_{N_3-1,l}^{(f)}]^T$$

and $y_{t,l}^{(f)} = e^{-j2\pi_{3,l}^{(f)}/N_3}$, $t = 0, 1, \ldots, N_3 - 1$, and $$n_{3,l}^{(f)} \in \{0, 1, \ldots, N_3 - 1\} \cdot M_v = \left\lceil p_v \frac{N_3}{R} \right\rceil$$

is the number of selected FD basis vectors, which depends on the RRC configured parameter $p_v$ and can be different for different ranks'. Supported values of $p_v$ can be found in Table 1. Note that $y_l^{(0)}$ always corresponds to $n_{3,l}^{(f)} = 0$.

For $N_3 \leq 19$, a one-step free selection is used.

For each layer, the selected FD basis vectors are indicated with a $$\left\lceil \log_2 \binom{N_3 - 1}{M_v - 1} \right\rceil$$

bit combinatorial indicator. In TS 38.214, the combinatorial indicator is given by the index $i_{1,6,l}$, which is reported by UE to the gNB.

For $N_3 > 19$, a two-step selection with layer-common intermediary subset (IntS) is used.

In the first step, a window-based layer-common IntS selection is used, which is parameterized by $M_{initial}$. The IntS consists of FD basis vectors $\{\text{mod } (M_{initial} + n, N_3), n = 0, 1, \ldots, 2M_v - 1\}$. In TS 38.214, the selected IntS is reported by the UE to the gNB via the parameter $i_{1,5}$, which is reported per layer as part of the PMI reported.

In the second step, the selected FD basis vectors are indicated with an $$\left\lceil \log_2 \binom{2M_v - 1}{M_v - 1} \right\rceil - \text{bit}$$

combinatorial indicator for each layer. In TS 38.214, the combinatorial indicator is given by the index $i_{1,6,l}$, which is reported by UE to the gNB.

$\tilde{W}_{2,l} = [\tilde{w}_{l,i,f}, i=0,1, \ldots, 2L-1, f=0,1, \ldots, M_v-1]$ is a size $2L \times M_v$ coefficient matrix. For layer l, only a subset of $K_l^{NZ} \leq K_0$ coefficients are non-zero and reported by the UE. The remaining $2LM_v - K_l^{NZ}$ non-reported coefficients are considered zero.

$K_0 = [\beta \times 2LM_1]$ is the maximum number of non-zero coefficients per layer, where $\beta$ is a RRC configured parameter. Supported $\beta$ values are shown in Table 1. For $v \in \{2, 3, 4\}$, the total number of non-zero coefficients summed across all layers, $K_{tot}^{NZ} = \sum_{l=1}^{v} K_l^{NZ}$, shall satisfy $K_{tot}^{NZ} \leq 2K_0$.

Selected coefficient subset for each layer is indicated with $K_l^{NZ}$ 1's (ones) in a size $2LM_v$ bitmap, $i_{1,7,l}$.

The strongest coefficient of layer l (whose amplitude and phase are not reported) is identified by $i_{1,8,l}$, $\in \{0,1, \ldots, 2L-1\}$. The amplitude of the strongest coefficient is set to 1 and the phase to zero. The strongest coefficient is the amplitude and phase reference for rest of the coefficients The amplitude coefficients in $W_{2,l}$ are indicated by $i_{2,3,l}$ (wideband) and $i_{2,4,l}$ (subband), and the phase coefficients in $W_{2,l}$ are indicated by $i_{2,5,l}$.

Note that $W_1$ is a matrix containing all selected Spatial Domain (SD) basis vectors and is common to all layers. $W_{f,l}$ is a matrix containing all selected Frequency Domain (FD) basis vectors for layer l. $W_{2,l}$ is a matrix containing all the complex combining coefficients each for a SD basis vector in $W_1$ and a FD basis vector in $W_{f,l}$.

The above is described in 3GPP TS 38.214, section 5.2.2.2.5, where $w_l^{(t)}$ is expressed as follows $$w_{q_1,q_2,n_1,n_2,n_{3,l},p_l^{(1)},p_l^{(2)},i_{2,5,l}}^l =$$

$$\frac{1}{\sqrt{N_1 N_2 \gamma_{t,l}}} \begin{bmatrix} \sum_{i=0}^{L-1} v_{m_1^{(i)},m_2^{(i)}} p_{l,0}^{(1)} \sum_{f=0}^{M_v-1} y_{t,l}^{(f)} p_{l,i,f}^{(2)} \varphi_{l,i,f} \\ \sum_{i=0}^{L-1} v_{m_1^{(i)},m_2^{(i)}} p_{l,1}^{(1)} \sum_{f=0}^{M_v-1} y_{t,l}^{(f)} p_{l,i+L,f}^{(2)} \varphi_{l,i+L,f} \end{bmatrix}, l = 1, 2, 3, 4$$

$$\gamma_{t,l} = \sum_{i=0}^{2L-1} \left( p_{l,\lfloor \frac{i}{L} \rfloor}^{(i)} \right)^2 \left| \sum_{f=0}^{M_v-1} y_{t,l}^{(f)} p_{l,i,f}^{(2)} \varphi_{l,i,f} \right|^2$$

where $\{q_1, q_2, n_1, n_2, n_{3,l}, p_l^{(1)}, p_l^{(2)}, i_{2,5,l}\}$ are quantities reported by a UE and $\{q_1, q_2\}$ are reported via the parameter $i_{1,1}$ while $\{n_1, n_2\}$ are reported via the parameter $i_{1,2}$.

$n_{3,l} = [n_{3,l}^{(0)}, \ldots, n_{3,l}^{(M_v-1)}]$, $n_{3,l}^{(f)} \in \{0,1, \ldots, N_3-1\}$, are the indices of the $M_v$ FD basis vectors $\{y_l^{(0)}, y_l^{(1)}, \ldots y_l^{(M_v-1)}\}$ and are reported via parameter $i_{1,6,l}$ and $i_{1,5}$ (if $N_3 > 19$)

$p_l^{(1)} = [p_{l,0}^{(1)} p_{l,1}^{(1)}]$ are the wideband amplitudes of the coefficients $\{\tilde{w}_{l,i,f}\}$ at two polarizations, reported by $i_{2,3,l}$, and $p_{l,i,f}^{(2)}$ is the subband amplitude of the coefficient $\tilde{w}_{l,i,f}$, where $p_{l,i,f}^{(2)}$ is part of $p_l^{(2)} = [p_{l,0}^{(2)} \ldots p_{l,m_v-1}^{(2)}]$, $p_{l,f}^{(2)} = [p_{l,0,f}^{(2)} \ldots p_{l,2L-1,f}^{(2)}]$, and is reported via $i_{2,4,l}$.

$$\varphi_{l,i,f} = e^{j\frac{2\pi c_{l,i,f}}{16}}$$

is the phase of the coefficient $\tilde{w}_{l,i,f}$, where $c_{l,i,f} \in \{0, \ldots, 15\}$ is reported via $i_{2,5,l} = [c_{l,0} \ldots c_{l,M_v-1}]$, where $c_{l,f} = [c_{l,0,f} \ldots c_{l,2L-1,f}]$

TABLE 1

Codebook parameter configurations for L, β and $p_v$ for Rel-16 enhanced type II codebook

| paramCombination-r16 | L | $p_v$ $v \in \{1, 2\}$ | $p_v$ $v \in \{3, 4\}$ | β |
|---|---|---|---|---|
| 1 | 2 | ¼ | ⅛ | ¼ |
| 2 | 2 | ¼ | ⅛ | ½ |
| 3 | 4 | ¼ | ⅛ | ¼ |
| 4 | 4 | ¼ | ⅛ | ½ |
| 5 | 4 | ¼ | ¼ | ¾ |
| 6 | 4 | ½ | ¼ | ½ |
| 7 | 6 | ¼ | — | ½ |
| 8 | 6 | ¼ | — | ¾ |

NR Rel-16 Enhanced Type II Port Selection Codebook

The enhanced Type II (eType II) Port Selection (PS) codebook was also introduced in Rel-16, which is intended to be used for beamformed CSI-RS, i.e., each CSI-RS port corresponds a 2D spatial beam. Based on the measurement, the UE selects L CSI-RS ports as well as a rank, a precoding matrix, and a CQI conditioned on the rank and the precoding matrix to the gNB.

The precoding matrix comprises linear combinations of the selected CSI-RS ports. For a given transmission layer l, with $l \in \{1, \ldots, v\}$ and v being the rank indicated by the RI, the precoder matrix has the same form as Rel-16 enhanced Type II codebook, i.e.

$$W_l = \begin{bmatrix} w_l^{(0)} & \ldots & w_l^{(N_3-1)} \end{bmatrix} = W_1 \tilde{W}_{2,l} W_{f,l}^H,$$

$\tilde{W}_{2,l}$ and $W_{f,l}$ are the same as in Rel-16 enhanced Type II codebook. The main difference is on $W_1$, which is a size $P_{CSI-RS} \times 2L$ port selection matrix given by $$W_1 = \begin{bmatrix} e_{m(0)}, \ldots, e_{m(L-1)} & 0 \\ 0 & e_{m(0)}, \ldots, e_{m(L-1)} \end{bmatrix},$$

where $e_{m^{(i)}} = [0, \ldots, 0,1,0, \ldots, 0]^T$, $i=0,1, \ldots, L-1$, is a port selection vector of size $$\frac{P_{CSI-RS}}{2} \times 1$$

and contains one element with value of one at locations $$m^{(i)} \in \left\{0, 1, \ldots, \left\lceil \frac{P_{CSI-RS}}{2d} \right\rceil - 1\right\}$$

indicating the selected CSI-RS port while all the other elements are with values of zeros, e.g., $e_0=[1,0,\ldots,0]^T$ and $e_{P_{CSI-RS/2}}=[0,0,\ldots,0,1]^T$. L is the number of selected CSI-RS ports from each polarization and the same ports are selected for both polarizations. Supported L values can be found in Table 2. The value of d is configured with the higher layer parameter portSelectionSamplingSize, where $d \in \{1, 2, 3, 4\}$ and $$d < \min\left(\frac{P_{CSI-RS}}{2}, L\right).$$

Selected CSI-RS ports are indicated by $$i_{1,1} \in \left\{0, 1, \ldots, \left\lceil \frac{P_{CSI-RS}}{2d} \right\rceil - 1\right\},$$

which is reported by the UE to gNB. $i_{1,2}$ is irrelevant and thus is not reported.

TABLE 2

Table 5.2.2.2.6-1: Codebook parameter configurations for L, β and $p_v$ for Rel-16 enhanced port selection type II codebook

| paramCombination-r16 | L | $v \in \{1, 2\}$ | $v \in \{3, 4\}$ | β |
|---|---|---|---|---|
| 1 | 2 | ¼ | ⅛ | ¼ |
| 2 | 2 | ¼ | ⅛ | ½ |
| 3 | 4 | ¼ | ⅛ | ¼ |
| 4 | 4 | ¼ | ⅛ | ½ |
| 5 | 4 | ¼ | ¼ | ¾ |
| 6 | 4 | ½ | ¼ | ½ |

For Rel-16 Enhanced Type II CSI feedback, a CSI report comprises of two parts. Part 1 has a fixed payload size and is used to identify the number of information bits in Part 2. Part 1 contains RI, CQI, and an indication of the overall number of non-zero amplitude coefficients across layers, i.e., $K_{tot}^{NZ} \in \{1,2,\ldots,2K_0\}$. Part 2 contains the PMI. Part 1 and 2 are separately encoded.

NR Rel-17 Further Enhanced Type II Port Selection Codebook

The Rel-16 port selection codebook is further enhanced in Rel-17, in which it is assumed that some channel delay associated to each CSI-RS port have been pre-compensated before being transmitted and thus, only one or two frequency domain basis vectors may be selected by a UE, i.e., $M_v \in \{1, 2\}$. The one or two FD basis vectors are the same for all layers, therefore M is used instead of $M_v$.

The number, L, of CSI-RS ports or beams at each polarization to be selected is indirectly configured as $L=\alpha P_{CSI-RS}/2$, where parameter α is configured by RRC as shown in Table 3. The 2L total CSI-RS ports are selected from $P_{CSI-RS}$ ports based on L port selection vectors, $e_{m^{(i)}}$, i=0,1, ..., L−1, which are identified by $$m = [m^{(0)} \ldots m^{(L-1)}]$$

$$m^{(i)} \in \left\{0, 1, \ldots, \frac{P_{CSI-RS}}{2} - 1\right\}$$

which are indicated by the index $i_{1,2}$, where $$i_{1,2} \in \left\{0, 1, \ldots, \binom{P_{CSI-RS}/2}{L} - 1\right\}.$$

The M selected FD basis vectors, $$[y_0^{(f)}, y_1^{(f)}, \ldots, y_{N_3-1}^{(f)}]^T, f \in \{0, \ldots, M-1\},$$

are identified by $n_3$, and where $$n_3 = [n_3^{(0)} \ldots n_3^{(M-1)}]$$

$$n_3^{(f)} \in \begin{Bmatrix} \{0\} & M=1 \\ [0, 1, \ldots, \min(N, N_3)-1] & M=2 \end{Bmatrix}$$

with the indices $f \in \{0, \ldots, M-1\}$ assigned such that $n_3^{(f)}$ increases with f. Note that $n_3^{(0)}=0$ for both M=1 and M=2. The parameter $N \in \{2,4\}$ is configured with the higher-layer parameter valueOfN, when M=2. $n_3$ is indicated by the index $i_{1,6}$ for N=4.

TABLE 3

Codebook parameter configurations for α, M and β for Rel-17 further enhanced type II port selection codebook

| paramCombination-r17 | M | α | β |
|---|---|---|---|
| 1 | 1 | ¾ | ½ |
| 2 | 1 | 1 | ½ |
| 3 | 1 | 1 | ¾ |
| 4 | 1 | 1 | 1 |
| 5 | 2 | ½ | ½ |
| 6 | 2 | ¾ | ½ |
| 7 | 2 | 1 | ½ |
| 8 | 2 | 1 | ¾ |

Priority Rules for Type II CSI Report

For Type II CSI report on Physical Uplink Shared Channel (PUSCH), a CSI report comprises of two parts. Part 1 has a fixed payload size and is used to identify the number of information bits in Part 2. Part 1 shall be transmitted in its entirety before Part 2.

For Rel-16 Enhanced Type II CSI feedback (see Clause 5.2.2.2.5 of 3GPP TS 38.214 V17.2.0) and Rel-17 Further Enhanced Type II Port Selection CSI feedback (see Clause 5.2.2.2.7 of 3GPP TS 38.214 V17.2.0), Part 1 contains
  RI (if reported)
  CQI, and
  an indication of the overall number of non-zero amplitude coefficients across all layers The fields of Part 1-RI (if reported), CQI, and the indication of the overall number of non-zero amplitude coefficients across layers—are separately encoded. Part 2 contains the PMI of the Rel-16 Enhanced Type II or Rel-17 Further Enhanced Type II Port Selection CSI. Part 1 and 2 are separately encoded.

When the Uplink Control Information (UCI) code rate on PUSCH is too high due to for example small PUSCH resource allocation and/or large CSI payload size, the UE may omit a portion of the Part 2 to reduce the code rate to below a threshold, whereby the CSI payload will "fit" on the PUSCH allocation. Omission of Part 2 CSI is according to the priority order shown in Table 5.2.3-1 (copied below) of 3GPP TS 38.214 v17.2.0, where $N_{Rep}$ is the number of CSI reports configured to be carried on the PUSCH. Priority 0 is the highest priority and priority $2N_{Rep}$ is the lowest priority and the CSI report n corresponds to the CSI report with the nth smallest $Pri_{i,CSI}(y,k,c,s)$ value among the $N_{Rep}$ CSI reports as defined in Clause 5.2.5 of 3GPP TS 38.214 V17.2.0. The subbands for a given CSI report n are numbered continuously in increasing order with the lowest subband as subband 0.

When omitting Part 2 CSI information for a particular priority level, the UE shall omit all of the information at that priority level.

For Rel-16 Enhanced Type II reports, for a given CSI report n, each reported element of indices $i_{2,4,l}$ $i_{2,5,l}$ and $i_{1,7,l}$, indexed by l, i and f, is associated with a priority value $Pri(l, i, f)=2 \cdot L \cdot \upsilon \cdot \pi(f) + \upsilon \cdot i + l$, with $\pi(f)=\min(2 \cdot n_{3,l}^{(f)}, 2 \cdot (N_3 - n_{3,l}^{(f)}) - 1)$ with $l=1,2,\ldots,\upsilon$, $i=0,1,\ldots,2L-1$, and $f=0,1,\ldots,M_\upsilon-1$, and where $n_{3,l}^{(f)}$ is the index of the $f_{th}$ selected FD basis vector. The element with the highest priority has the lowest associated value $Pri(l, i, f)$. Omission of Part 2 CSI is according to the priority order shown in Table 5.2.3-1, where Group 0 includes indices $i_{1,1}$ (if reported), $i_{1,2}$ (if reported) and $i_{1,8,l}$ ($l=1,\ldots,\upsilon$), i.e., $W_1$ and the index of the beam and polarization associated to the strongest coefficient in $\tilde{W}_2$.

Group 1 includes indices $i_{1,5}$ (if reported), $i_{1,6,l}$ (if reported), the $\upsilon 2LM_\upsilon - \lfloor K^{NZ}/2 \rfloor$ highest priority elements of $i_{1,7,l}$, $i_{2,3,l}$, the max $$\left(0, \left\lceil \frac{K^{NZ}}{2} \right\rceil - \upsilon\right)$$

highest priority elements of $i_{2,4,l}$ and the max $$\left(0, \left\lceil \frac{K^{NZ}}{2} \right\rceil - \upsilon\right)$$

highest priority elements of $i_{2,5,l}$ ($l=1,\ldots,\upsilon$). In other words, Group 1 includes $W_f$, wideband amplitudes, part of the higher priority NZC bitmap, and part of the higher priority amplitude and phase coefficients of $\tilde{W}_2$ Group 2 includes the $\lfloor K^{NZ}/2 \rfloor$ lowest priority elements of $i_{1,7,l}$, the min $$\left(K^{NZ} - \upsilon, \left\lfloor \frac{K^{NZ}}{2} \right\rfloor\right)$$

lowest priority elements of $i_{2,4,l}$ and the min $$\left(K^{NZ} - \upsilon, \left\lfloor \frac{K^{NZ}}{2} \right\rfloor\right)$$

lowest priority elements of $i_{2,5,l}$ ($l=1,\ldots,\upsilon$). In other words, Group 2 includes the remaining low priority part of the NZC bitmap, the amplitude and phase coefficients of $\tilde{W}_2$ Similarly, for Rel-17 Further Enhanced Type II Port Selection reports, for a given CSI report n, each reported element of $i_{2,4,l}$ $i_{2,5,l}$ and $i_{1,7,l}$, indexed by l, i and f, is associated with a priority value $Pri(l, i, f)=K_1 \cdot \upsilon \cdot f + \upsilon \cdot i + l$, with $l=1,2,\ldots,\upsilon$, $i=0,1,\ldots,K_1-1$ and $f=0,\ldots,M-1$. The element with the highest priority has the lowest associated value $Pri(l, i, f)$. Omission of Part 2 CSI is according to the priority order shown in Table 4 below (which is a reproduction of Table 5.2.3-1 of 3GPP TS 38.214 V17.2.0), where:

Group 0 includes $i_{1,2}$ (if reported), $i_{1,8,l}$ ($l=1,\ldots,\upsilon$) and $i_{1,6}$ (if reported), i.e., the indices of the selected CSI-RS ports, the port and polarization associated to the strongest coefficient of $\tilde{W}_2$, and the index of the second FD basis vector if configured Group 1 includes the $\upsilon K_1 M - \lfloor K^{NZ}/2 \rfloor$ highest priority elements of $i_{1,7,l}$ (if reported), $i_{2,3,l}$, the max $$\left(0, \left\lceil \frac{K^{NZ}}{2} \right\rceil - \upsilon\right)$$

highest priority elements of $i_{2,4,l}$ and the max $$\left(0, \left\lceil \frac{K^{NZ}}{2} \right\rceil - \upsilon\right)$$

highest priority elements of $i_{2,5,l}$ ($l=1,\ldots,\upsilon$). In other words, Group 1 includes wideband amplitudes, part of the higher priority NZC bitmap, and part of the higher priority amplitude and phase coefficients of $\tilde{W}_2$ Group 2 includes the $\lfloor K^{NZ}/2 \rfloor$ lowest priority elements of $i_{1,7,l}$ (if reported), the min $$\left(K^{NZ} - \upsilon, \left\lfloor \frac{K^{NZ}}{2} \right\rfloor\right)$$

lowest priority elements of $i_{2,4,l}$ and the min $$\left(K^{NZ} - \upsilon, \left\lfloor \frac{K^{NZ}}{2} \right\rfloor\right)$$

lowest priority elements of $i_{2,5,l}$ ($l=1,\ldots,\upsilon$). In other words, Group 2 includes the remaining low priority part of the NZC bitmap, the amplitude and phase coefficients of $\tilde{W}_2$

TABLE 4

(Table 5.2.3-1: Priority reporting levels for Part 2 CSI)

Priority 0:
For CSI reports 1 to $N_{Rep}$, Group 0 CSI for CSI reports configured as 'typeII-r16', 'typeII-PortSelection-r16' or 'typeII-PortSelection-r17';

TABLE 4-continued (Table 5.2.3-1: Priority reporting levels for Part 2 CSI)

Part 2 wideband CSI for CSI reports configured otherwise
Priority 1:
Group 1 CSI for CSI report 1, if configured as 'typeII-r16', 'typeII-PortSelection-r16' or 'typeII-PortSelection-r17'; Part 2 subband CSI of even subbands for CSI report 1, if configured otherwise
Priority 2:
Group 2 CSI for CSI report 1, if configured as 'typeII-r16', 'typeII-PortSelection-r16' or 'typeII-PortSelection-r17'; Part 2 subband CSI of odd subbands for CSI report 1, if configured otherwise
Priority 3:
Group 1 CSI for CSI report 2, if configured as 'typeII-r16', 'typeII-PortSelection-r16' or 'typeII-PortSelection-r17'; Part 2 subband CSI of even subbands for CSI report 2, if configured otherwise
Priority 4:
Group 2 CSI for CSI report 2, if configured as 'typeII-r16', 'typeII-PortSelection-r16' or 'typeII-PortSelection-r17'. Part 2 subband CSI of odd subbands for CSI report 2, if configured otherwise
.
.
.
Priority $2N_{Rep} - 1$:
Group 1 CSI for CSI report $N_{Rep}$, if configured as 'typeII-r16', 'typeII-PortSelection-r16' or 'typeII-PortSelection-r17'; Part 2 subband CSI of even subbands for CSI report $N_{Rep}$, if configured otherwise
Priority $2N_{Rep}$:
Group 2 CSI for CSI report $N_{Rep}$, if configured as 'typeII-r16', 'typeII-PortSelection-r16' or 'typeII-PortSelection-r17'; Part 2 subband CSI of odd subbands for CSI report $N_{Rep}$, if configured otherwise Coherent Joint PDSCH Transmission from Multiple TRPs In NR Rel-18, it has been agreed to support downlink Coherent Joint Transmission (CJT) from multiple Transmission and Reception Points (TRPs) by extending Rel-16 and Rel-17 enhanced type II codebook across multiple TRPs (mTRP for short). In case of CJT, each layer of a Physical Downlink Shared Channel (PDSCH) is transmitted from multiple TRPs. An example is shown in FIG. 4, where a PDSCH with two layers are transmitted from two TRPs by applying two different precoding matrices to the PDSCH at TRP1 and TRP2. The two precoders are designed such that for each layer, the signals received from the two TRPs are phase aligned at the UE and, thus, are coherently combined at the UE.

Extension of NR Rel-16 type II codebook to CJT has been discussed in some publications such as in R1-2203229, "On CSI enhancements for Rel-18 NR MIMO evolution", Ericsson, 3GPP RAN1 #109e e-meeting, May 9th-20th,2022 and R1-2204540, "CSI enhancement for high/medium UE velocities and CJT", Nokia, Nokia Shanghai Bell, 3GPP RAN1 #109e e-meeting, May 9th-20th,2022. A few options have been agreed in 3GPP RAN1 #119-e as follows (see section 9.1.2 of Chairman notes, RAN1 #109e, v19, May 9th-20th, 2022):

Agreement

The work scope of Type-II codebook refinement for CJT mTRP includes down-selecting at least one or merging from the following codebook structures:

Alt1A. Per-TRP/TRP group (port-group or resource) SD/FD basis selection+relative co-phasing/amplitude (including WB and/or SB). Example formulation (N=number of TRPs or TRP groups):

$$\begin{bmatrix} (a_1 p_1) \times W_{1,1} \tilde{W}_{2,1} W_{f,1}^H \\ \vdots \\ (a_N p_N) \times W_{1,N} \tilde{W}_{2,N} W_{f,N}^H \end{bmatrix}$$

$a_r$=co-amplitude and
$p_r$=co-phase
Including special case of $a_r=p_r=1$ (no co-scaling) or $a_r=0$ Alt1B. Per-TRP/TRP group (port-group or resource) joint SD-FD basis selection+relative co-phasing/amplitude (including WB and/or SB). Example formulation (N=number of TRPs or TRP groups):

$$\begin{bmatrix} (a_1 p_1) \times W_{SF,1} \tilde{W}_{2,1} \\ \vdots \\ (a_N p_N) \times W_{SF,N} \tilde{W}_{2,N} \end{bmatrix}$$

$a_r$=co-amplitude and
$p_r$=co-phase
Including special case of $a_r=p_r=1$ (no co-scaling) or $a_r=0$ Alt2. Per-TRP/TRP group (port-group or resource) SD basis selection and joint (across N TRPs) FD basis selection. Example formulation (N=number of TRPs or TRP groups):

$$\begin{bmatrix} W_{1,1} & 0 & 0 & 0 \\ 0 & \ddots & 0 & 0 \\ 0 & 0 & W_{1,N} & \\ 0 & 0 & & \end{bmatrix} \tilde{W}_2 W_f^H$$

SUMMARY

Systems and methods related to prioritization of non-zero coefficients for Channel State Information (CSI) for Coherent Joint Transmission (CJT) are disclosed. In one embodiment, a method performed by a UE for CSI feedback comprises receiving, from a network node, a CSI report configuration that configures the UE for CJT CSI reporting. The CSI report configuration comprises an indication of $N_{RS}>1$ CSI Reference Signal (CSI-RS) resources indexed by s (s=1,2, . . . , NRS) for channel measurement and a codebook configuration corresponding to a number of antenna ports. The method further comprises measuring channels based on the $N_{RS}>1$ CSI-RS resources and determining, based on the measured channels, a number, $v \geq 1$, of layers indexed by l (l=1,2, . . . , v), a number, $2L_s$ (where $L_s \geq 0$ is an integer), of spatial beams or CSI-RS ports indexed by is ($i_s=0,1, \ldots, 2L_s-1$) for each s-th CSI-RS resource of the $N_{RS}$ CSI-RS resources, and a number, $M_v \geq 1$, of frequency domain (FD) basis vectors indexed by f (f=0,1, . . . , $M_v-1$) for each of the v layers. The method further comprises computing CSI based on the determined spatial beams or CSI-RS ports and FD basis vectors, wherein the CSI comprises a precoding matrix indicator (PMI) indicating a precoding matrix comprising a set of coefficients, wherein each of the set of coefficients is associated to one of the determined layers, one of the $N_{RS}$ CSI-RS resources having at least one determined spatial beam or port (i.e., $L_s>0$), one of the determined spatial beams or ports and one of the determined FD basis vectors associated to the one CSI-RS resource, and is indexed by l, $i_s$, s, and f. The PMI further comprises a non-zero coefficients (NZC) bit map wherein each bit in the bitmap is associated to one of the set of coefficients and indicates whether an associated coefficient is zero or non-zero, wherein only non-zero coefficients are reported. The method further comprises assigning a priority index to each of the set of coefficients, wherein a different priority index is assigned to different coefficients and wherein the priority indices are allocated from low index value to high index value to the coefficients in an increasing order of l first, then $i_s$, then s, and then a permutated FD basis vector index $\pi$ (f) ($\pi$ (f)=0,1, ..., $M_{v,s}-1$), wherein the lowest priority index is allocated to one of the set of coefficients associated to {l=1, $i_s$=0, s=1, $\pi$ (f)=0} and the highest priority index is allocated to one of the set of coefficients associated to {l=v, $i_s$=2$L_s$−1, s=$N_{TRS}$, $\pi$ (f)=$M_v$−1}.

The method further comprises transmitting, to the network node, a CSI report comprising the non-zero coefficient bitmap and non-zero coefficients in the set of coefficients indicated by the non-zero coefficient bitmap, wherein a first number of the lowest priority bits in the non-zero coefficient bitmap and a second number of the lowest priority non-zero coefficients in the set of coefficients are placed in a first group and the remaining bits in the non-zero coefficient bitmap and the remaining non-zero coefficients in the set of coefficients are placed in a second group in the CSI report.

In one embodiment, in case that some part of the CSI needs to be dropped, the first group is dropped first.

In one embodiment, the permutated FD basis vector index $\pi$ (f) is given by $$\pi(f) = \min(2 \cdot n_{3,l}^{(f)}, 2 \cdot (N_3 - n_{3,l}^{(f)}) - 1$$

where $N_3$ is a length of the FD basis vectors and $n_{3,l}^{(f)} \in (0, 1, \ldots, N_3-1)$ is a FD basis vector index associated to the determined FD basis vector index f at layer l.

In one embodiment, the priority index, Pri(l, is, f, s), for each of the non-zero coefficients indexed by s, l, $i_s$, and f in the set of coefficients is given according to:

$$Pri(l, i_s, f, s) = 2 \cdot \sum_{k=1}^{N_{RS}} L_k \cdot v \cdot \pi(f) + v \cdot \left(\sum_{k=1}^{s-1} 2L_k + i_s\right) + l.$$

In one embodiment, the determined spatial beams or CSI-RS ports are indexed by $j \in (0, 1, 2, \ldots, 2\sum_{s=1}^{N_{RS}} L_s - 1)$, across all the $N_{RS}$ CSI-RS resources in increasing order of s, where $j = (\sum_{k=1}^{s-1} 2L_k + i)$, and each non-zero coefficient in the set of coefficients is indexed by s, l, i, and f and is assigned with a priority index, Pri(l, i, f, s), given by:

$$Pri(l, i, f, s) = 2 \cdot \sum_{s=1}^{N_{RS}} L_s \cdot v \cdot \pi(f) + v \cdot j + l = 2 \cdot \sum_{k=1}^{N_{RS}} L_k \cdot v \cdot \pi(f) + v\left(\sum_{k=1}^{s-1} 2L_k + i\right) + l.$$

In one embodiment, the CSI further comprises information that indicates the number of determined spatial beams or ports for each of the $N_{RS}$ CSI-RS resources.

In one embodiment, the CSI report configuration further comprises an indication of a maximum total number, $K^{NZ}$, of non-zero coefficients to be reported in the CSI. In one embodiment, the first number of the lowest priority bits in the non-zero coefficient bitmap is given by $\lfloor K^{NZ}/2 \rfloor$, i.e., a largest integer smaller than or equal to $K^{NZ}/2$. In one embodiment, the second number of the lowest priority non-coefficients is given by min $$\left(K^{NZ} - v, \left\lfloor \frac{K^{NZ}}{2} \right\rfloor\right).$$

In one embodiment, each of the non-zero coefficients comprises an amplitude and a phase factor.

In one embodiment, the $N_{RS}$ CSI-RS resources are associated to $N_{RS}$ Transmission and Reception Points (TRPs).

In one embodiment, the CSI report comprises a first part and a second part, and wherein the first part comprises information indicating one or more of: the determined number of layers or rank v, the determined number of spatial beams or ports for each of the $N_{RS}$ CSI-RS resources, or a total number of reported non-zero coefficients. In one embodiment, the second part comprises the first group and the second group.

In one embodiment, the $N_{RS}$ CSI-RS resources are ordered according to their order of presence in the CSI report configuration.

In one embodiment, each of the $N_{RS}$ CSI-RS resources is associated a resource index and the $N_{RS}$ CSI-RS resources are indexed in increasing order of the CSI-RS resource indices.

In one embodiment, the $N_{RS}$ CSI-RS resources are ordered in increasing order of their received power at the UE and the order is also reported in the CSI report.

Corresponding embodiment of a UE are also disclosed.

In one embodiment, a a UE for CSI feedback comprises processing circuitry configured to cause the UE to receive, from a network node, a CSI report configuration that configures the UE for CJT CSI reporting. The CSI report configuration comprises an indication of $N_{RS}>1$ CSI Reference Signal (CSI-RS) resources indexed by s (s=1,2, ..., $N_{RS}$) for channel measurement and a codebook configuration corresponding to a number of antenna ports. The processing circuitry is further configured to cause the UE to measure channels based on the $N_{RS}>1$ CSI-RS resources and determining, based on the measured channels, a number, v≥1, of layers indexed by l (l=1,2, ..., v), a number, $2L_s$ (where $L_s \geq 0$ is an integer), of spatial beams or CSI-RS ports indexed by is ($i_s$=0,1, ..., $2L_s-1$) for each s-th CSI-RS resource of the $N_{RS}$ CSI-RS resources, and a number, $M_v \geq 1$, of frequency domain (FD) basis vectors indexed by f (f=0,1, ..., $M_v \geq 1$) for each of the v layers. The processing circuitry is further configured to cause the UE to compute CSI based on the determined spatial beams or CSI-RS ports and FD basis vectors, wherein the CSI comprises a precoding matrix indicator (PMI) indicating a precoding matrix comprising a set of coefficients, wherein each of the set of coefficients is associated to one of the determined layers, one of the $N_{RS}$ CSI-RS resources having at least one determined spatial beam or port (i.e., $L_s>0$), one of the determined spatial beams or ports and one of the determined FD basis vectors associated to the one CSI-RS resource, and is indexed by l, $i_s$, s, and f. The PMI further comprises a non-zero coefficients (NZC) bit map wherein each bit in the bitmap is associated to one of the set of coefficients and indicates whether an associated coefficient is zero or non-zero, wherein only non-zero coefficients are reported. The processing circuitry is further configured to cause the UE to assign a priority index to each of the set of coefficients, wherein a different priority index is assigned to different coefficients and wherein the priority indices are allocated from low index value to high index value to the coefficients in an increasing order of l first, then $i_s$, then s, and then a permutated FD basis vector index $\pi$ (f) ($\pi$ (f)=0,1, ..., $M_{v,s}$-1), wherein the lowest priority index is allocated to one of the set of coefficients associated to {l=1, $i_s$=0, s=1, $\pi$ (f)=0} and the highest priority index is allocated to one of the set of coefficients associated to {l=v, $i_s$=2$L_s$-1, s=$N_{TRS}$, $\pi$ (f)=$M_v$31 1}. The processing circuitry is further configured to cause the UE to transmit, to the network node, a CSI report comprising the non-zero coefficient bitmap and non-zero coefficients in the set of coefficients indicated by the non-zero coefficient bitmap, wherein a first number of the lowest priority bits in the non-zero coefficient bitmap and a second number of the lowest priority non-zero coefficients in the set of coefficients are placed in a first group and the remaining bits in the non-zero coefficient bitmap and the remaining non-zero coefficients in the set of coefficients are placed in a second group in the CSI report.

Embodiments of a method performed by a network node for CSI feedback are also disclosed. In one embodiment, a method performed by a network node for CSI feedback comprises sending, to a UE, a CSI report configuration that configures the UE for CJT CSI reporting. The CSI report configuration comprises an indication of $N_{RS}$>1 CSI-RS resources indexed by s (s=1,2, ..., $N_{RS}$) for channel measurement and a codebook configuration corresponding to a number of antenna ports. The method further comprises receiving, from the UE, a CSI report comprising a non-zero coefficient bitmap and non-zero coefficients in a set of coefficients indicated by the non-zero coefficient bitmap. A different priority index is assigned to different coefficients in the set of coefficients and wherein the priority indices are allocated from low index value to high index value to the coefficients in an increasing order of layer index l (l=1, 2, ..., v) first, then spatial beam or CSI-RS port index is ($i_s$=0,1, ..., 2$L_s$-1), then s, and then a permutated FD basis vector index $\pi$ (f) ($\pi$ (f)=0,1, ..., $M_{v,s}$-1), wherein the lowest priority index is allocated to one of the set of coefficients associated to {l=1, $i_s$=0, s=1, $\pi$ (f)=0} and the highest priority index is allocated to one of the set of coefficients associated to {l=v, $i_s$=2$L_s$-1, s=$N_{TRS}$, $\pi$ (f)=$M_v$-1}. A first number of the lowest priority bits in the non-zero coefficient bitmap and a second number of the lowest priority non-zero coefficients in the set of coefficients are placed in a first group and the remaining bits in the non-zero coefficient bitmap and the remaining non-zero coefficients in the set of coefficients are placed in a second group in the CSI report.

Corresponding embodiments of a network node for CSI feedback are also disclosed. In one embodiment, a network node for CSI feedback comprises processing circuitry configured to cause the network node to send, to a UE, a CSI report configuration that configures the UE for CJT CSI reporting. The CSI report configuration comprises an indication of $N_{RS}$>1 CSI-RS resources indexed by s (s=1, 2, ..., $N_{RS}$) for channel measurement and a codebook configuration corresponding to a number of antenna ports. The processing circuitry is further configured to cause the network node to receive, from the UE, a CSI report comprising a non-zero coefficient bitmap and non-zero coefficients in a set of coefficients indicated by the non-zero coefficient bitmap. A different priority index is assigned to different coefficients in the set of coefficients and wherein the priority indices are allocated from low index value to high index value to the coefficients in an increasing order of layer index l (l=1,2, ..., v) first, then spatial beam or CSI-RS port index is ($i_s$=0,1, ..., 2$L_s$-1), then s, and then a permutated FD basis vector index $\pi$ (f) ($\pi$ (f)=0,1, ..., $M_{v,s}$-1), wherein the lowest priority index is allocated to one of the set of coefficients associated to {l=1, $i_s$=0, s=1,$\pi$ (f)=0} and the highest priority index is allocated to one of the set of coefficients associated to {l=v, $i_s$=2$L_s$-1, s=$N_{TRS}$, $\pi$(f)=$M_v$-1}. A first number of the lowest priority bits in the non-zero coefficient bitmap and a second number of the lowest priority non-zero coefficients in the set of coefficients are placed in a first group and the remaining bits in the non-zero coefficient bitmap and the remaining non-zero coefficients in the set of coefficients are placed in a second group in the CSI report.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 7 illustrates an example of priority allocation based on Pri(l, i, f, s) for two CSI-RS resources with rank 4 and $L_s$=2 for both resources, in accordance with an example embodiment of the present disclosure;

DETAILED DESCRIPTION

Figure 1:
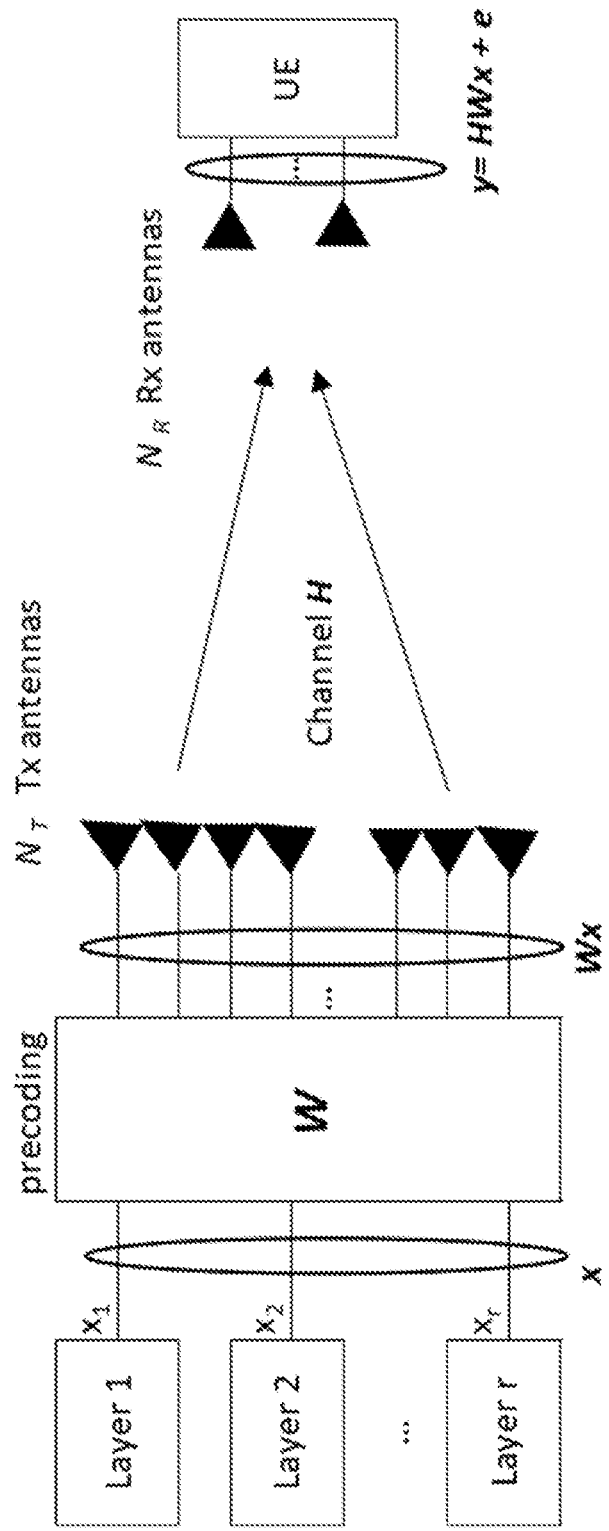
FIG. 1 shows an example of spatial multiplexing.
Figure 2:
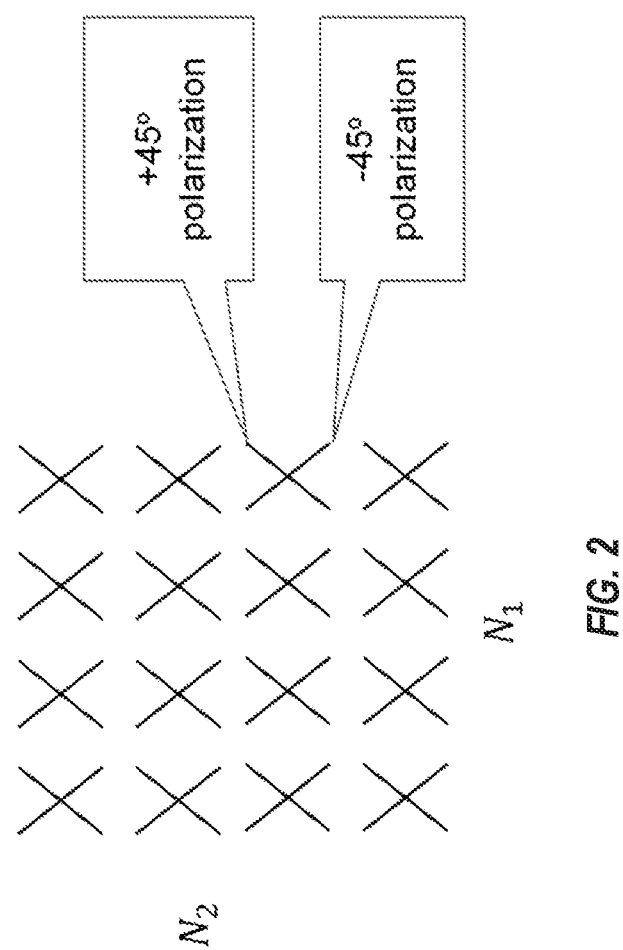
FIG. 2 illustrates an example of a 4×4 (i.e., $N_1 \times N_2$,) array with dual-polarized antenna elements (i.e., $N_p$=2)
Figure 3:
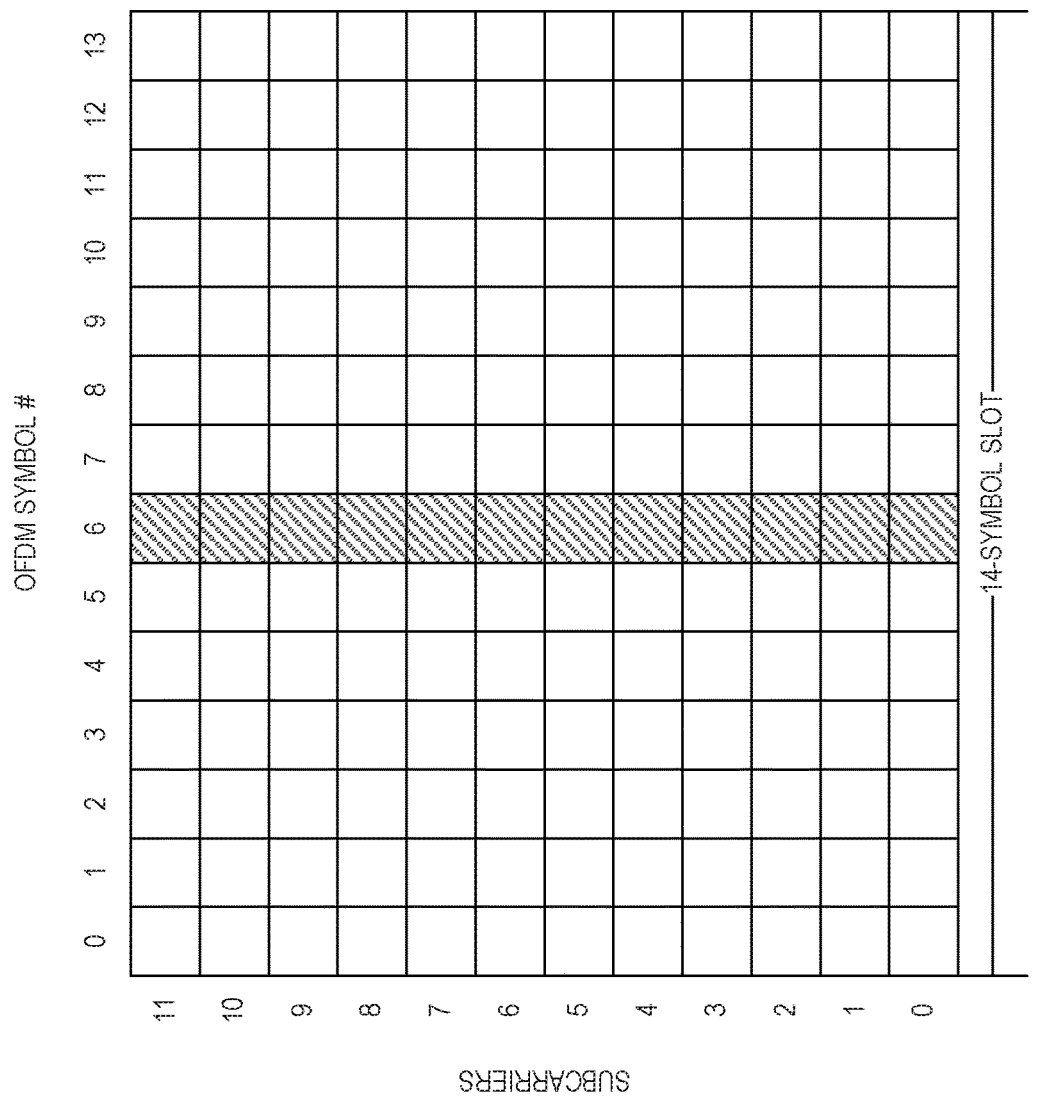
FIG. 3 shows an example of Channel State Information Reference Signal (CSI-RS) Resource Elements (REs) for 12 antenna ports in one Resource Block (RB), where each CSI-RS port is transmitted in one RE per RB.
Figure 4:
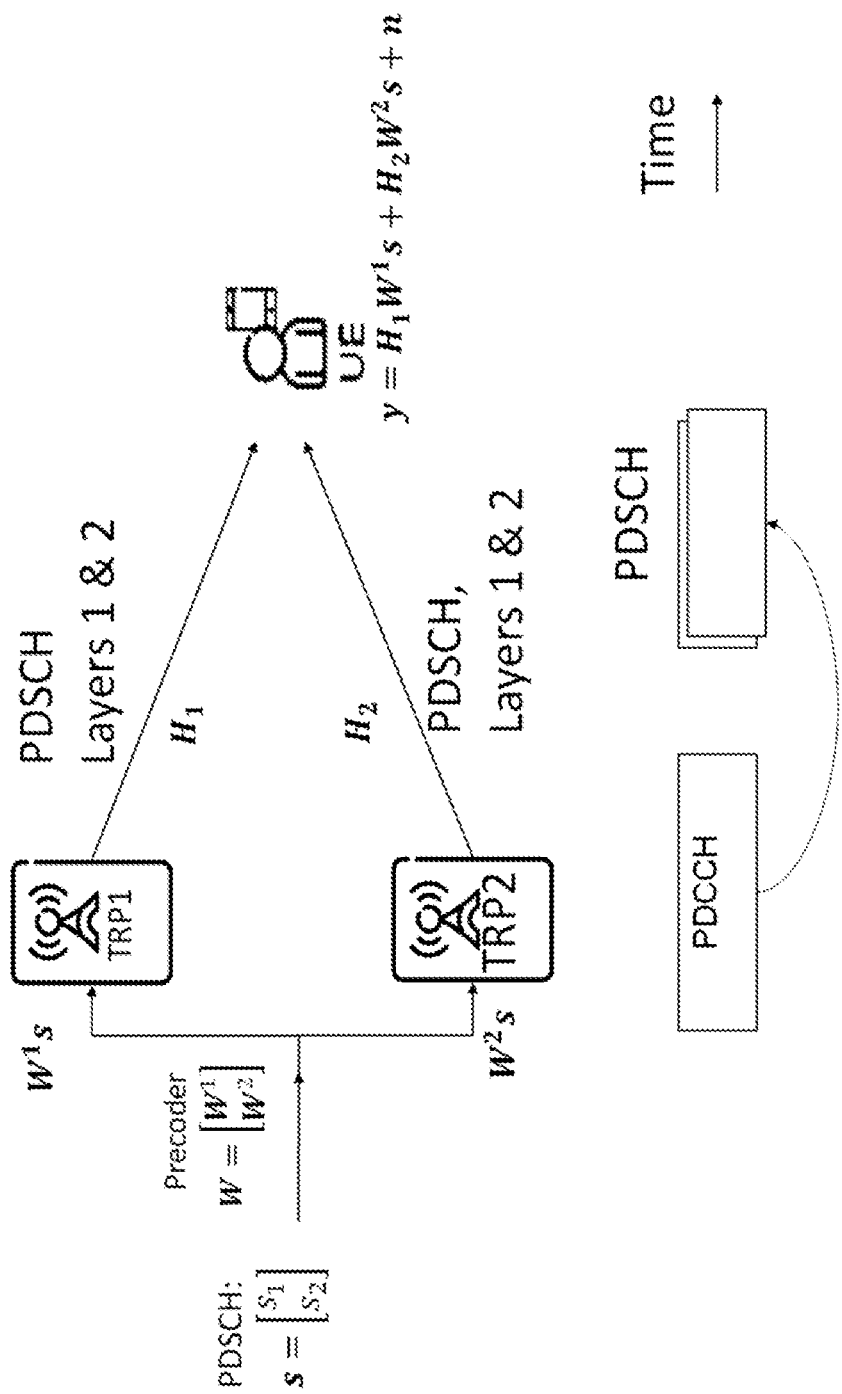
FIG. 4 illustrates an example of Coherent Joint Transmission (CJT)

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

There currently exist certain challenge(s). When Alt2 of the codebook structure defined in the 3rd Generation Partnership Project (3GPP) agreement from section 9.1.2 of Chairman notes, RAN1 #109e, v19, May 9th-20th, 2022, which is reproduced above in the Background section) is used to extend Rel-16 or Rel-17 Type II codebook to Coherent Joint Transmission (CJT) over multiple Transmission and Reception Points (TRPs), the codebook structure is very similar to the legacy Rel-16 and Rel-17 Type II codebook, i.e., with a single layer common $W_1$, a single $W_2$ per layer, and a single $W_f$ per layer over all TRPs. However, as beams would be indexed per TRP, how to order the selected beams across TRPs and allocate the associated coefficients in different Channel State Information (CSI) groups in Part 2 of the CJT CSI report is an issue.

If Alt1A or Alt1B of the codebook structure defined in the aforementioned 3GPP agreement is used to extend Rel-16 or Rel-17 Type II codebook to CJT, a precoding matrix would be computed per TRP based on legacy Rel-16 or rel-17 Type II codebook and co-phase/co-amplitude would be determined for each TRP. The per TRP precoder structure is essentially the same as Rel-16 and Rel-17 type II codebook. However, there are multiple $W_1$, $W_2$, and $W_f$, one for each TRP, and how to allocate Precoding Matrix Indicator (PMI) parameters in different CSI groups in Part 2 of the CSI is an issue.

Certain aspects of the disclosure and their embodiments may provide solutions to these or other challenges. In one embodiment, a method is proposed on CSI reporting for CJT from multiple TRPs. The method comprises one or more of the following:

- A network node configures a User Equipment (UE) with multiple CSI Reference Signal (CSI-RS) resources or CSI-RS port groups, each transmitted from a TRP, for channel measurement, and a set of parameters including a number of spatial beams and number of Frequency Domain (FD) basis vectors, either for each TRP or across TRPs, for CJT CSI report.
- The UE measures channels associated with each TRP based on the CSI-RS resources.
- The UE determines a number of spatial beams per TRP and a number of FD basis vectors either per TRP or across all TRPs.
- The UE computes a precoding matrix for each Multiple-Input Multiple-Output (MIMO) layer, comprising a set of non-zero coefficients (NZCs) associated with each TRP, based on the determined beams and FD basis vectors, where the NZCs may be determined per TRP or across all TRPs.
- The UE indicates the associated beams and FD basis vectors of the non-zero coefficients with a bitmap, either one per TRP or one across all TRPs, where each bit in the bitmap is associated to a beam and FD basis vector pair and, if a bit is set to 1, the corresponding coefficient associated to the beam and FD basis vector pair is a non-zero coefficient.
- The UE assigns a priority level to the coefficients according to an order of the associated TRP/CSI-RS resource, where coefficients associated to different TRPs are assigned with different priority levels.
- The order of the TRP/CSI-RS resources may be according to the order that the CSI-RS resources present in a CSI-RS resource set configured in the CSI report configuration, or it may be determined and reported by the UE based certain criteria such as the received CSI-RS power.
- The coefficients and the bitmap are ordered according to their priority levels into different groups and a group with lower priority level is dropped first if needed.

Embodiments of the present disclosure may include one or more of the following aspects:

- For CJT CSI report comprising multiple TRPs, ordering coefficients of the precoding matrix based on certain criteria such as the received powers of the associated CSI-RS resources and assigning a higher priority to the coefficients associated with a TRP/CSI-RS resource with a higher received power. Report the order of the TRPs/CSI-RS resources as part of a CJT CSI report.
- In priority assignment, for amplitude and phase coefficients of $W_2$ (matrix of combining coefficients) in per TRP type II based CJT PMI report (i.e., alt.1A/1B), coefficients associated to a TRP or CSI-RS resource with the lower index are assigned with higher priority.
  - Option 1: The TRP/CSI-RS resource index is assigned according to the order configured in the CSI report configuration.
  - Option 2: The TRP/CSI-RS resource index is assigned according to co-amplitude value, from high to low co-amplitude.
  - Option 3: An order is reported by the UE.
  - Option 4: Both options 2 and 3.
- In per TRP type II based CJT PMI report (i.e., alt.1A/1B), non-zero $W_2$ coefficients for each layer and across all layers are determined globally across all TRPs/CSI-RS resources.
- Allocating NZC coefficients to Group 1 and Group 2 of Part 2 of the CSI according to the priority assignment.

Certain embodiments may provide one or more of the following technical advantage(s). Embodiments of the present disclosure may provide better CJT performance in case of omission and when the channels of different TRPs are imbalanced, i.e., one TRP is stronger than another.

Embodiments for Codebook Structures Alt1A or Alt1B

Figure 5:
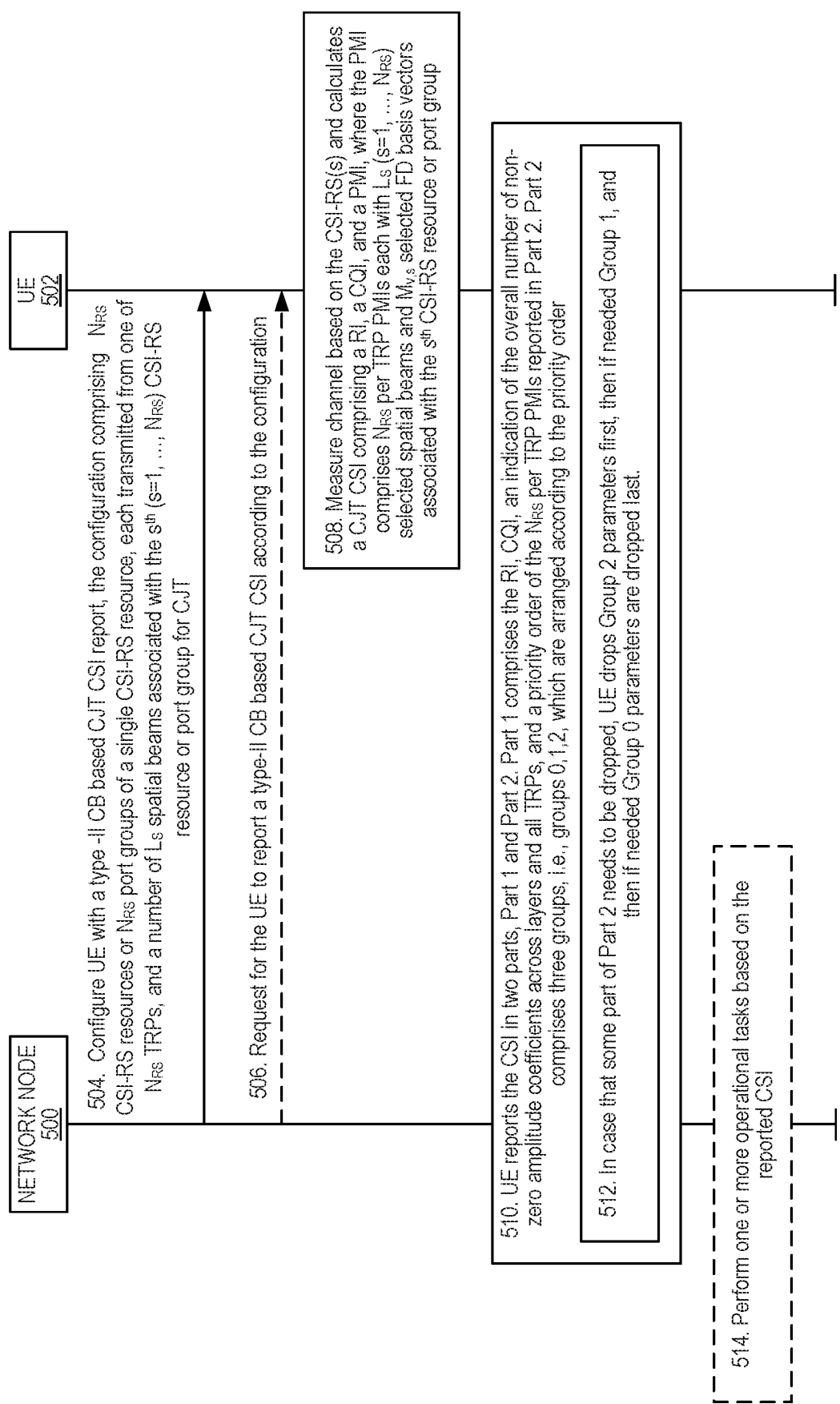
FIG. 5 illustrates the operation of a network node and a User Equipment (UE) in accordance with some embodiments of the present disclosure to provide Type II Channel State Information (CSI) reporting enhancement for multi-Transmission and Reception Point (TRP) CJT.

FIG. 5 illustrates the operation of a network node 500 and a UE 502 in accordance with embodiments of the present disclosure that provides Type II CSI reporting enhancement for multi-TRP coherent joint transmission assuming Alt1A or Alt1B (i.e., per TRP type II precoding matrix with co-phase/amplitude) of the codebook structure defined above. Each of the steps of the procedure of FIG. 5 are described below.

In Step 504, the network node 502 configures the UE 502 with a Rel-16 or Rel-17 type-II codebook (CB) refinement for CJT CSI report, the configuration comprising $N_{RS}$ CSI-RS resources for channel measurement. More specifically, the configuration comprises $N_{RS}$ CSI-RS resources or $N_{RS}$ port groups of a single CSI-RS resource, each transmitted from one of $N_{RS}$ TRPs, and a number of $L_S$ spatial beams associated with the $s^{th}$ (s=1, ..., $N_{RS}$) CSI-RS resource or port group for CJT.

Figure 6:
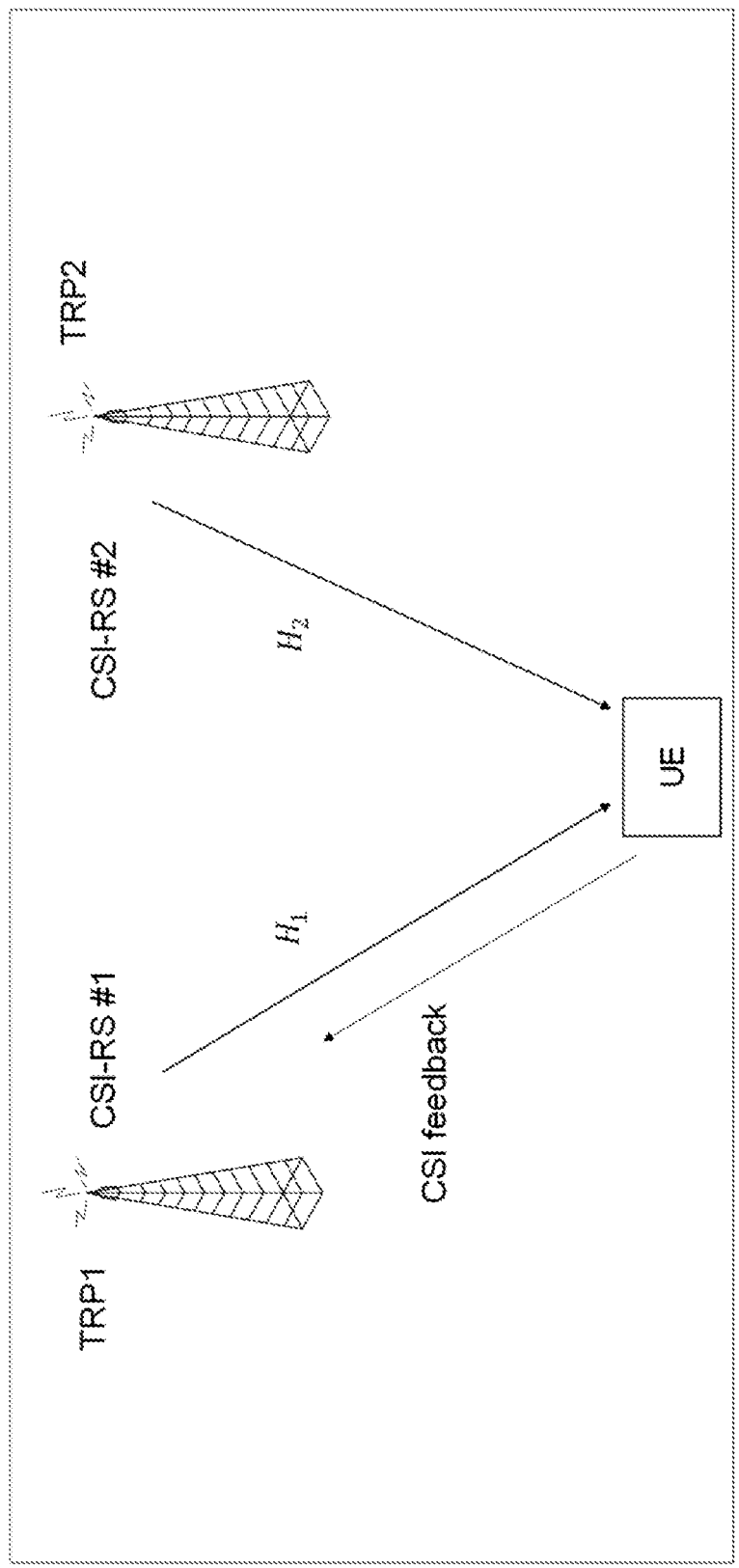
FIG. 6 illustrates an example of configuring a type II CSI report with two CSI-RS resources, each associated with one TRP, in accordance with an example embodiment of the present disclosure.

An example of configuring a type II CSI report with two CSI-RS resources, each associated with one TRP is shown in FIG. 6, where two CSI-RS resources (i.e., $N_{RS}=2$), CSI-RS #1 and CSI-RS #2, each containing a number of CSI-RS ports, are configured and transmitted from two TRPs.

Note that in some alternative embodiments, a single CSI-RS resource may be configured with a first subset of CSI-RS ports (also referred to as a first CSI-RS port group or a first antenna port group) associated with a first TRP and a second subset of ports (also referred to as a second CSI-RS port group or a second antenna port group) associated with a second TRP. Even though the embodiments described henceforth in this disclosure cover the case of multiple CSI-RS resources, these embodiments are equally applicable to the case of a single CSI-RS resource with multiple CSI-RS port groups. To apply the embodiments to the single CSI-RS resource case, the $s^{th}$ CSI-RS resource in the description of the embodiments is replaced by the sth CSI-RS port group.

For the CJT CSI report, the UE 502 may be configured with CJT CSI report configuration comprising multiple CSI-RS resources for channel measurement and a set of legacy Rel-16 or Rel-17 type II CB parameters according to one of Table 1 to Table 3 for each of the CSI-RS resources. In one embodiment, a same parameter combination is applied to all the CSI-RS resources. In another embodiment, different parameter combinations may be configured to different CSI-RS resources. For example, for Rel-16 type II codebook refinement, for the $s^{th}$ ($s=1, \ldots, N_{RS}$) CSI-RS resource, the UE 502 may be configured with.

$L_s$: the number of spatial beams $p_{v,s}$: a parameter used to configure the number FD basis vectors for a given rank v, i.e., $$M_{v,s} = \left\lceil p_{v,s} \frac{N_3}{R} \right\rceil,$$

where $N_3 = N_{sb}R$ and $N_{sb}$ is a number of CQI subbands, and $R \in \{1,2\}$ is a scaling factor for PMI subband size $\beta_s$: a parameter used to configure the maximum number of non-zero coefficients (NZCs), i.e., $K_{0,s} = \lceil \beta_s 2L_s M_{1,s} \rceil$, for each layer. The total number of NZCs associated to the sth CSI-RS resource across all layers is $K_s^{NZ} \leq 2K_{0,s}$.

In another embodiment, instead of configuring number of spatial beams for each CSI-RS resource, the total number of spatial beams across all the CSI-RS resources may be configured.

In Step 506, the UE 502 receives a request from the network node 500 to measure and report CJT CSI based on the CSI report configuration and the multiple CSI-RS resources.

In Step 508, the UE 502 computes CSI. More specifically, the UE 502 obtains channel estimation $\hat{H}_s$ ($s=1, \ldots, N_{RS}$) (i.e., measures the channel) based on the $s^{th}$ CSI-RS resource. The UE 502 calculates a Rel-16 or Rel-17 Type II CSI for each of the CSI-RS resources based on the corresponding channel estimate.

The UE 502 determines the CJT CSI comprising a rank v, a precoding matrix $W_l$ for layer l ($l=1, \ldots, v$), and a CQI conditioned on the rank and the precoding matrices. For codebook structure Alt.1A, the precoding matrix $W_l$ for layer l is a size-$P_{CSI-RS} \times N_3$ matrix and is given by $$W_l = \begin{bmatrix} \alpha_1 p_1 W_{l,1} \\ \cdots \\ \alpha_{N_{RS}} p_{N_{RS}} W_{l,N_{RS}} \end{bmatrix} \quad \text{Eq. 1}$$

where $\alpha_s$, $p_s$, and $W_{l,s}$ ($s=1, \ldots, N_{RS}$) are, respectively, the co-phasing factor, co-amplitude, and precoding matrix associated to the $s^{th}$ CSI-RS resource or TRP. Using the Rel-16 type II codebook refinement as an example, $W_{l,s}$ is given by $$W_{l,s} = \begin{bmatrix} w_{l,s}^{(0)} & \cdots & w_{l,s}^{(N_3-1)} \end{bmatrix} = W_{1,s} \tilde{W}_{2,l,s} W_{f,l,s}^H \quad \text{Eq. 2}$$

where $w_{l,s}^{(t)}$ is a $P_{CSI-RS,s} \times 1$ precoding vector associated to the $s^{th}$ ($s=1, \ldots, N_{RS}$) CSI-RS resource for a subband with subband index $t \in \{0,1, \ldots, N_3-1\}$ and layer l, where $P_{CSI-RS,s} = 2N_{1,s}N_{2,s}$ is the number of CSI-RS ports in the $s^{th}$ NZP CSI-RS resource, where $N_{1,s}$ and $N_{2,s}$ are the number of antenna ports in a first and a second dimensions. Note that the number of CSI-RS ports in different NZP CSI-RS resources may be same or different.

$$W_{1,s} = \begin{bmatrix} v_{m_{1,s}^{(0)},m_{2,s}^{(0)}}^{(s)}, \cdots, v_{m_{1,s}^{(L_s-1)},m_{2,s}^{(L_s-1)}}^{(s)} & 0 \\ 0 & v_{m_{1,s}^{(0)},m_{2,s}^{(0)}}^{(s)}, \cdots, v_{m_{1,s}^{(L_s-1)},m_{2,s}^{(L_s-1)}}^{(s)} \end{bmatrix}$$

is a size $P_{CSI-RS,s} \times 2L_s$ precoding matrix associated with the $s^{th}$ ($s=1, \ldots, N_{RS}$) NZP CSI-RS resource.

$$\left\{ v_{m_{1,s}^{(0)},m_{2,s}^{(0)}}^{(s)}, \cdots, v_{m_{1,s}^{(L_s-1)},m_{2,s}^{(L_s-1)}}^{(s)} \right\}$$

is a set of size $P_{CSI-RS,s}/2 \times 1$ 2-D DFT beams $$v_{m_{1,s}^{(i)},m_{2,s}^{(i)}}^{(s)} = \left[ u_{m_{2,s}^{(i)}}^{(s)}, e^{j\frac{2\pi m_{1,s}^{(i)}}{O_{1,s}N_{1,s}}} u_{m_{2,s}^{(i)}}^{(s)}, \ldots, e^{j\frac{2\pi m_{1,s}^{(i)}(N_{1,s}-1)}{O_{1,s}N_{1,s}}} u_{m_{2,s}^{(i)}}^{(s)} \right]^T$$

$$u_{m_{2,s}^{(i)}}^{(s)} = \left[ 1, e^{j\frac{2\pi m_{2,s}^{(i)}}{O_{2,s}N_{2,s}}}, \ldots, e^{j\frac{2\pi m_{2,s}^{(i)}(N_{2,s}-1)}{O_{2,s}N_{2,s}}} \right]^T$$

if $N_{2,s} > 1$ and $u_{m_{2,s}^{(i)}}^{(s)} = 1$ if $N_{2,s} = 1$ $m_{1,s}^{(i)} = O_{1,s}n_{1,s}^{(i)} + q_{1,s}$, $m_{2,s}^{(i)} = O_{2,s}n_{2,s}^{(i)} + q_{2,s}$, $n_{1,s}^{(i)} \in \{0, 1, \ldots, N_{1,s}-1\}$, $n_{2,s}^{(i)} \in \{0, 1, \ldots, N_{2,s}-1\}$, $q_{1,s} \in \{0, 1, \ldots, O_{1,s}-1\}$, $q_{2,s} \in \{0, 1, \ldots, O_{2,s}-1\}$, $i = 0, 1, \ldots L_s - 1, O_{1,s}$ and $O_{2,s}$ are the oversampling factors along dimensions of $N_{1,s}$ and $N_{2,s}$, respectively.

If port selection type II CSI is configured, then each of the CSI-RS ports in all the CSI-RS resources corresponds to 2-D spatial beam and $$W_{1,s} = \begin{bmatrix} e^{(s)}_{m_s^{(0)}}, \ldots, e^{(s)}_{m_s^{(L_s-1)}} & 0 \\ 0 & e^{(s)}_{m_s^{(0)}}, \ldots, e^{(s)}_{m_s^{(L_s-1)}} \end{bmatrix},$$

where $e^{(s)}_{m_s^{(i)}}$ ($i = 0, 1, \ldots, L_s - 1$)

is a $P_{CSI-RS,s}/2 \times 1$ vector containing a value of 1 in the element of index $m_s^{(i)}$ and zeros elsewhere where the first element is the element of index 0, $$m_s^{(i)} \in \left\{0, 1, \ldots, \frac{P_{CSI-RS,s}}{2} - 1\right\}$$

$W_{f,l,s} = [y_{l,s}^{(0)}, y_{l,s}^{(1)}, \ldots, y_{l,s}^{(M_{v,s}-1)}]$ is a size-$N_3 \times M_{v,s}$ frequency domain (FD) compression matrix comprising $M_{v,s}$ selected FD basis vectors associated to the $s^{th}$ CSI-RS resource, where $y_{l,s}^{(f)} \in \{y_0 \ y_1 \ldots y_{N_3-1}\}$, and $y_k = [y_{k,0}, y_{k,1}, \ldots, y_{k,N_3-1}]^T$ and $y_{k,t} = e^{-j2\pi kt/N_3}$, $k, t = 0, 1, \ldots, N_3-1$.

$\tilde{W}_{2,1,s} = [c_{l,i,f,p,s}, i=0,1, \ldots, 2L'-1; f=0,1, \ldots, M_{v,s}-1; p=0,1]$ is a size $2L_s \times M_{v,s}$ coefficient matrix associated to the $s^{th}$ CSI-RS resource.

$N_3$ is the number of PMI subbands, common for all CSI-RS resources or TRPs

In an alternative expression, each of the precoding vectors $w_{l,s}^{(t)}$ can be expressed as follows:

$$w_{l,s}^{(t)} = \begin{bmatrix} w_{l,0,s}^{(t)} \\ w_{l,1,s}^{(t)} \end{bmatrix}, s = 1, \ldots, N_{RS}. \qquad \text{Eq. 3}$$

$$w_{l,p,s}^{(t)} = \sum_{i=0}^{L_s-1} v^{(s)}_{m_{1,s}^{(i)}, m_{2,s}^{(i)}} \sum_{f=0}^{M_{v,s}-1} c_{l,i,f,p,s} y_{t,l,s}^{(f)}, p = 0, 1 \qquad \text{Eq. 4}$$

$$y_{t,l,s}^{(f)} = e^{j\frac{2\pi t n_{3,l,s}^{(f)}}{N_3}}, \qquad \text{Eq. 5}$$

$$c_{l,i,f,p,s} = p_{l,p,s}^{(1)} p_{l,i,f,p,s}^{(2)} \varphi_{l,i,f,p,s} \qquad \text{Eq. 6}$$

where $w_{l,s}^{(t)}$ is the precoder associated with the $s^{th}$ CSI-RS resource or TRP and consists of two parts, $w_{l,0,s}^{(t)}$ for a first polarization and $w_{l,1,s}^{(t)}$ for a second polarization, $n_{3,l,s}^{(f)} \in \{0, 1, \ldots, N_3-1\}$ is a FD basis vector index of the $f^{th}$ selected FD basis vector associated to the $s^{th}$ CSI-RS resource, $c_{l,i,f,p,s} = p_{l,p,s}^{(1)} p_{l,i,f,p,s}^{(2)} \varphi_{l,i,f,p,s}$ is the coefficient of $\tilde{W}_{2,1,s}$ associated with layer l, the $i^{th}$ beam, the $f^{th}$ FD basis vector, the $p^{th}$ polarization, and the $s^{th}$ CSI-RS resource; $p_{l,p,s}^{(1)}$ is the wideband amplitude associated with layer l, polarization index p, and CSI-RS resource index s, and $p_{l,i,f,p,s}^{(2)}$ is the subband amplitude associated with layer l, the $i^{th}$ selected spatial beam, the $f^{th}$ selected FD basis vector, the $p^{th}$ polarization, and the $s^{th}$ CSI-RS resource.

In Step 510, the UE 502 reports information that indicates the computed CSI for CJT, where this reported information includes at least some of the aforementioned coefficients and where some of the coefficients may be omitted based on priority. More specifically, the UE 502 reports the CSI in two parts, Part 1 and Part 2. Part 1 comprises the RI, CQI, and an indication of the overall number of non-zero amplitude coefficients across layers and all TRPs, and an order of the $N_{RS}$ the CSI-RS resources and thus the per TRP or per CSI-RS resource precoding matrices reported in Part 2. Part 2 comprises three groups, i.e., groups 0, 1, and 2, each containing different parts of the CJT PMI. Note that, as discussed below in regard to Step 512, at least some of Part 2 may be dropped, if needed, in accordance with the priority order, i.e., group 0 has a higher priority than groups 1 and 2, group 1 has a higher priority than group 2.

The CJT PMI comprises $\{W_{l,s}, l=1, \ldots v, s=1, \ldots, N_{RS}\}$, where $W_{l,s}$ is reported as follows:

The beam indices $m_{1,s}^{(i)}$ and $m_{2,s}^{(i)}$ ($i=1, \ldots, L_s$) are indicated via $i_{1,1,s}$ and $i_{1,2,s}$ $n_{3,l,s}^{(f)}$ is indicated via indices $i_{1,5}$ (for $N_3 > 19$) and $i_{1,6,l,s}$ (for $M_{v,s} > 1$ and $l=1, \ldots, v$).

One of $\{p_{l,p,s}^{(1)}, p=0,1\}$ equals to 1 and is denoted as $p_{l,p*,s}^{(1)}$, which is associated to the strongest beam in one of the two polarizations. The strongest beam index and the polarization index are indicated via $i_{1,8,l,s}$. The other $p_{l,p,s}^{(1)}$ ($p \neq p*$) is indicated via $i_{2,3,l,s}$ $P_{l,i,f,p,s}^{(2)}$ is indicated via $i_{2,4,l,s}$ $\varphi_{l,i,f,p,s}$ is indicated via $i_{2,5,l,s}$ In one embodiment, the maximum number of non-zero (NZ) coefficients for each layer is determined per CSI-RS resource, i.e., $K_{l,s}^{NZ} \leq K_{0,s}$, where $K_{0,s} = \lceil \beta_s 2L_s M_{1,s} \rceil$, and the total number of NZ coefficients across all layers is $K_s^{NZ} \leq 2K_{0,s}$, $s=1, \ldots, N_{RS}$. The total number of non-zero coefficients across all CSI-RS resources is thus $K^{NZ} = \sum_{s=1}^{N_{RS}} K_s^{NZ} \leq 2\sum_{s=1}^{N_{RS}} K_{0,s}$. A NZC bitmap per CSI-RS resource is reported as $i_{1,7,l,s}$ ($s=1, \ldots, N_{RS}$). $i_{1,7,l,s}$ has a size of $2L_s M_{v,s}$ and indicates the beam indices and the FD basis vector indices of the non-zero coefficients of $c_{l,i,f,p,s}$. In case that a same set of parameters are configured for all CSI-RS resources, i.e., $L_s = L_1$, $p_{v,s} = p_{v,1}$, $\beta_s = \beta_1$ for $s = 1, \ldots, N_{RS}$, then $K^{NZ} \leq 2N_{RS} K_{0,1}$.

In another embodiment, the non-zero coefficients are selected together across all the CSI-RS resources for each layer for a given $K_l^{NZ}$ maximum number of non-zero coefficients and also for all layers for a given $K^{NZ}$ maximum number of non-zero coefficients, where $K_l^{NZ} \leq \mu \sum_{s=1}^{N_{RS}} K_{0,s}$ and $K^{NZ} \leq 2\mu \sum_{s=1}^{N_{RS}} K_{0,s}$, where $\mu \leq 1$ may be either predefined or configured. This is beneficial comparing to selecting the non-zero coefficients per CSI-RS resource because the best coefficients are selected globally across all CSI-RS resources. In this case, more non-zero coefficients associated to one CSI-RS resource may be selected than others even though they may have the same configuration parameters. In this case, either per CSI-RS resource NZC bitmap $i_{1,7,l,s}$ or a single NZC bitmap $i_{1,7,l}$ across all CSI-RS resources may be reported. $i_{1,7,l}$ has a size of ESS $2L_s$ $M_{y,s}$.

The UE reports the CJT CSI in two Parts, i.e., Part 1 and Part 2. In one embodiment, Part 1 contains the rank indicator RI (if reported), CQI, and an indication of the overall number of non-zero amplitude coefficients across layers and across all CSI-RS resources. The fields of Part 1-RI (if reported), CQI, and the indication of the overall number of non-zero amplitude coefficients across layers and CSI-RS resources—are separately encoded. Part 2 contains the PMI. Part 1 and 2 are separately encoded.

Part 2 consists of three group of parameters, i.e., Group 0, Group 1, and Group 2. Omission of Part 2 CJT CSI is according to the priority order shown in Table 5.2.3-1.

In one embodiment, each element of $i_{2,4,l,s}, i_{2,5,l,s}$ and $i_{1,7,l,s}$ indexed by s, l, i and f, is associated with a priority value Pri(l, i, f, s)=$2 \cdot \sum_{k=1}^{N_{RS}} L_k \cdot \upsilon \cdot \pi_s(f) + \upsilon \cdot (\sum_{k=1}^{s-1} 2L_k + i) + l$, with $\pi_s(f) = \min(2 \cdot n_{3,l,s}^{(f)}, 2 \cdot (N_3 - n_{3,l,s}^{(f)}) - 1)$ with $s = 1, \ldots, N_{RS}$, $l=1,2, \ldots, v$, $i=0,1, \ldots, 2L_s-1$, and $f=0,1, \ldots, M_{v,s}-1$, and where $n_{3,l,s}^{(f)} \in \{0, 1, \ldots, N_3-1\}$ is the index of the $f^{th}$ selected FD basis vector associated to the $s^{th}$ CSI-RS resource. An example of priority allocation based on $Pri(l, i, f, s)$ for two CSI-RS resources with rank 4 and $L_s=2$ for both resources is shown in FIG. 7. The element with the highest priority has the lowest associated value $Pri(l, i, f, s)$. In this example, the highest priority is assigned to the coefficients associated with s=1, i=0, l=1 and $n_{3,l,s}^{(f)}=0$, and the lowest priority is assigned to the coefficients associated with s=2, i=3, l=v and $n_{3,l,s}^{(f)}=N_3-1$. In this embodiment, the priority of coefficients are arranged according to FD basis vector index first, and then CSI-RS resource index, followed by beam index, and then layer index. Coefficients associated with a FD basis vector with a smaller $\pi_s(f)$ value have higher priority than coefficients associated with a FD basis vector with a larger $\pi_s(f)$ value, regardless the associated CSI-RS resource, beam and layer. The idea is that in case of CSI omission, coefficients are dropped starting from the ones associated with the FD basis vector with the lowest priority. For a given FD basis vector, coefficients associated with lower priority CSI-RS resources are dropped first, where a CSI-RS resource associated with a smaller index s has a higher priority than a CSI-RS resource with a larger index s value. For a given CSI-RS resource, coefficients associated with lower priority beams are dropped first, where a beam associated with a smaller index i has a higher priority than a beam with a larger index i value. For a given beam, coefficients associated with lower priority layers are dropped, where a layer associated with a smaller index l has a higher priority than a layer with a larger index (value. Thus, the priority of CSI-RS resources, beams and layers are according to their corresponding indices, i.e., lower index has a higher priority. For FD basis vectors, the ones associated with lower frequency component have higher priority, which is described by the function $\pi_s(f)$. The one associated with DC (i.e., no change across subband) has the highest priority, which is the FD basis vector with all 1's and associated with index $n_{3,l,s}^{(f)}=0$.

For CSI-RS resources, in one embodiment, $\{W_{l,s}\}$ are ordered according to the order of the corresponding CSI-RS resources configured in the CSI report configuration. For example, if three CSI-RS resources are configured as {CSI-RS resource ID #i, CSI-RS resource ID #j, CSI-RS resource ID #k}, then s=1 indicates CSI-RS resource ID #i, s=2 indicates CSI-RS resource ID #j, and s=3 indicates CSI-RS resource ID #k.

With the priority $Pri(l, i, f, s)$ specified above, it implies that the coefficients associated with a lower index s (e.g., s=1) have a higher priority than the coefficients associated with a higher index s (e.g., s=2). This may be a bit artificial as CSI-RS resource ID #i in the above example may not always be the strongest TRP for a UE and it may not be good to prioritize coefficients with CSI-RS resource ID #i over other TRPs.

Thus, in another embodiment, $\{W_{l,s}\}$ may be re-ordered by the UE according to, for example, the received signal power, and the coefficients associated with a CSI-RS resource having higher received power may be assigned with a higher priority than coefficients associated with a CSI-RS resource having a lower received power. Such a re-ordering needs to be reported to the network so that the reported CSI can be correctly interpreted by the network. Thus, in one embodiment, the CSI-RS resource order determined by the UE may be reported in Part 1 of the CJT CSI report. In another embodiment, the order determined by the UE may be reported in Group 0 of Part 2 of the CSI report. The order can be signaled explicitly as $\{CRI_1, CRI_2, \ldots, CRI_{N_{RS}}\}$, where $CRI_s \in (1,2,\ldots,N_{RS})$ is an CSI-RS resource indicator. $CRI_k$ indicates a CSI-RS resource associated with s=k. Using the previous example with {CSI-RS resource ID #i, CSI-RS resource ID #j, CSI-RS resource ID #k} configured, the corresponding $CRI_s$ are {1,2,3}, respectively. If the UE reports $\{CRI_1=3, CRI_2=2, CRI_3=1\}$, it means that s=1 refers to CSI-RS resource ID #k, s=2 refers to CSI-RS resource ID #j, and s=3 refers to CSI-RS resource ID #i.

In case of a per TRP NZC bitmap $i_{1,7,l,s}$ is reported and per TRP total number of non-zero coefficients, $K_s^{NZ}$, is defined per TRP, the parameters in Part 2 would be arranged in Groups 0 to 2 as follows:

Group 0 includes the beam indices $i_{1,1,s}$ (if reported), $i_{1,2,s}$ (if reported) and the index $i_{1,8,l,s}$ (l=1, ..., υ, s=1, ..., $N_{RS}$) for the strongest beam associated to the $s^{th}$ (s=1, ..., $N_{RS}$) CSI-RS resource, quantized co-phase and co-amplitude of $\alpha_s, p_s$ (s=1, ..., $N_{RS}$), and $\{CRI_1, CRI_2, \ldots, CRI_{N_{RS}}\}$ if reported.

Group 1 includes indices $i_{1,5}$ (if reported), $i_{1,6,l,s}$ (if reported), the $υ2L_s M_{v,s} - \lfloor K^{NZ}/2 \rfloor$ highest priority elements of $i_{1,7,l,s}$, $i_{2,3,l,s}$, the max $$\left(0, \left\lceil \frac{K_s^{NZ}}{2} \right\rceil - \upsilon \right)$$

highest priority elements of $i_{2,4,l,s}$ and the max $$\left(0, \left\lceil \frac{K_s^{NZ}}{2} \right\rceil - \upsilon \right)$$

higjest priority elements of $i_{2,5,l,s}$ (l=1, ..., υ, s=1, ..., $N_{RS}$). In other words, Group 1 includes indicators for $W_{f,l,s}$, wideband amplitudes, part of the higher priority NZC bitmap per CSI-RS resource, and part of the higher priority amplitude and phase coefficients of $\tilde{W}_{2,1,s}$ Group 2 includes the $\lfloor K^{NZ}/2 \rfloor$ lowest priority elements of $i_{1,7,l,s}$, the min $$\left(K_s^{NZ} - v, \left\lfloor \frac{K_s^{NZ}}{2} \right\rfloor \right)$$

lowest priority elements of $i_{2,4,l,s}$ and the min $$\left(K_s^{NZ} - v, \left\lfloor \frac{K_s^{NZ}}{2} \right\rfloor \right)$$

lowest priority elements of $i_{2,5,l,s}$ (l=1, ..., υ, s=1, ..., $N_{RS}$). In other words, Group 2 includes indicators for the remaining low priority part of the NZC bitmaps, the amplitude and phase coefficients of $\tilde{W}_{2,1,s}$ In case that the total number of non-zero coefficients across all layers and all TRPs, $K^{NZ}$, is configured or pre-defined, the parameters in Groups 1 and 2 of Part 2 would be arranged as follows:

Group 1 includes indices $i_{1,5}$ (if reported), $i_{1,6,l,s}$ (if reported), the $υ\Sigma_{s=1}^{N_{RS}} 2L_s M_{v,s} - \lfloor K^{NZ}/2 \rfloor$ highest priority elements of $i_{1,7,l,s}$ or $i_{1,7,l}$ (if a single bitmap is used), $i_{2,3,l,s}$, the max $$\left(0, \left\lceil \frac{K^{NZ}}{2} \right\rceil - \upsilon N_{RS} \right)$$

highest priority elements of $i_{2,4,l,s}$ and the max $$\left(0, \left\lceil \frac{K^{NZ}}{2} \right\rceil - \upsilon N_{RS}\right)$$

highest priority elements of $i_{2,5,l,s}$ (l=1, ..., $\upsilon$, s=1, ..., $N_{RS}$).

Group 2 includes the $\lfloor K^{NZ}/2 \rfloor$ lowest priority elements of $i_{1,7,l,s}$ or $i_{1,7,l}$ if a single bitmap is used, the min $$\left(K^{NZ} - \upsilon N_{RS}, \left\lfloor \frac{K^{NZ}}{2} \right\rfloor\right)$$

lowest priority elements of $i_{2,4,l,s}$ and the min $$\left(K^{NZ} - \upsilon N_{RS}, \left\lfloor \frac{K^{NZ}}{2} \right\rfloor\right)$$

lowest priority elements of $i_{2,5,l,s}$ (l=1, ..., $\upsilon$, s=1, ..., $N_{RS}$).

In Step 512, in case that some part of Part 2 need to be dropped, the UE 502 drops Group 2 parameters first, then parameters in Group 1. Group 0 parameters are dropped last. Parameters that are dropped are not included in the report of step 510.

In Step 514, the network node 500 uses the reported CSI for one or more operational tasks, as will be appreciated by those of ordinary skill in the art.

Embodiments for Codebook Structures Alt2

Figure 8:
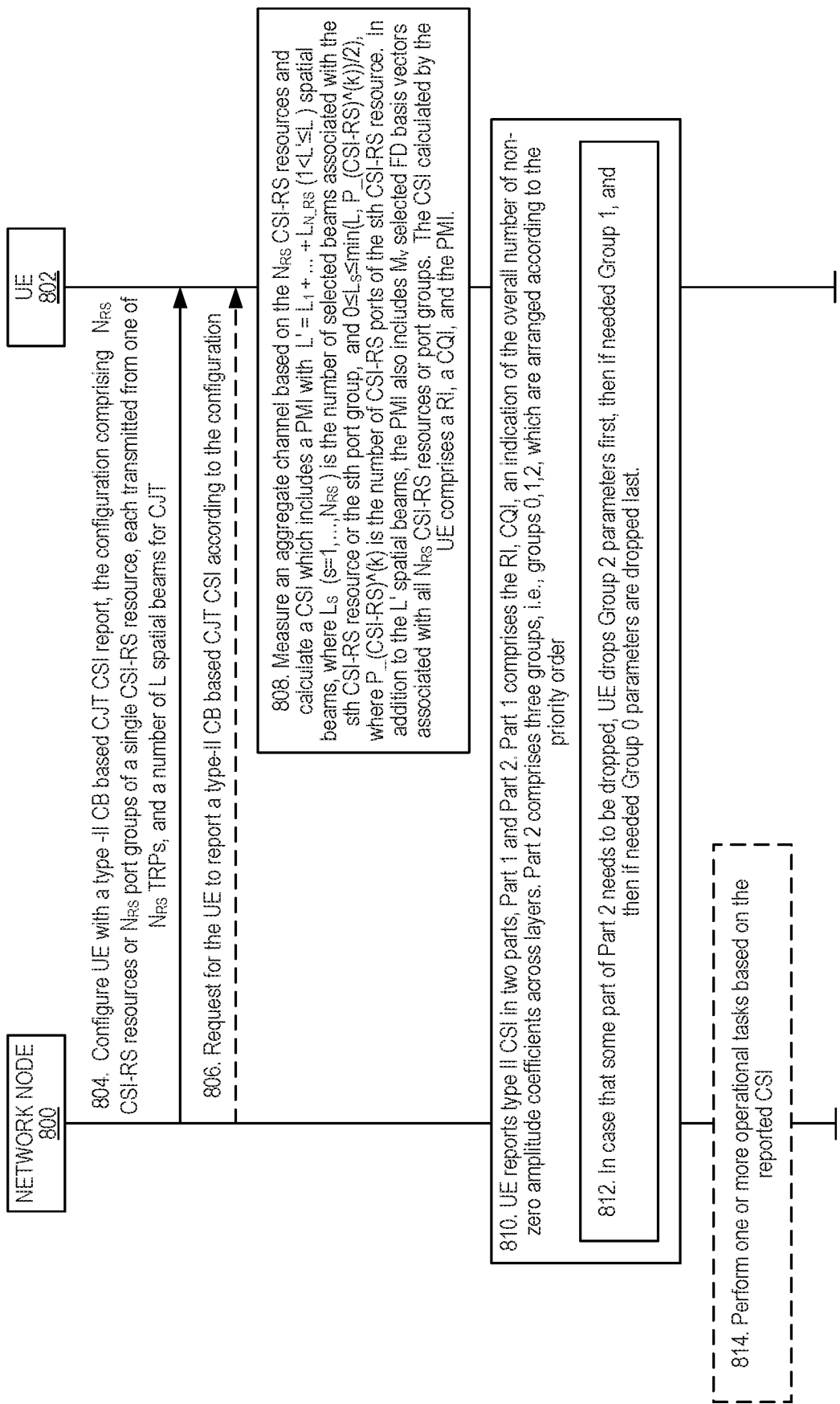
FIG. 8 illustrates the operation of a network node and a UE in accordance with some other embodiments of the present disclosure to provide Type II CSI reporting enhancement for multi-TRP CJT.

FIG. 8 illustrates the operation of a network node 800 and a UE 802 in accordance with some other embodiments of the present disclosure that provide Type II CSI reporting enhancement for multi-TRP coherent joint transmission assuming Alt2 of the codebook structure with details defined below. The steps of the procedure are described in detail below.

Step 804 of FIG. 8 is similar to that of Step 504 in FIG. 5. The one difference in Step 804 of FIG. 8 is that the number of spatial beams may be commonly configured for all $N_{RS}$ CSI-RS resources or port groups. For instance, a single parameter may be configured from the network node 800 to the UE 802 for the number of spatial beams. Alternatively, L may be configured as $L=N_{RS}L_0$, where $L_0$ is number of spatial beams per CSI-RS resource or port group.

Step 806 of FIG. 8 is similar to that of Step 506 in FIG. 5.

In Step 808, the UE 802 computes CSI. More specifically, the UE 802 obtains an aggregated downlink (DL) channel $\tilde{H}=[\tilde{H}_1, ..., \tilde{H}_{N_{RS}}]$ from the individual per TRP channel estimation, $\tilde{H}_s$, based on the $s^{th}$ CSI-RS resource. The UE calculates a Type II PMI based on the aggregated DL channel $\tilde{H}$. It is assumed that the UE is configured with a set of parameters for CJT CSI report as follows if Rel-16 Type II codebook is extended for the purpose:

L: the total number of spatial beams across all CSI-RS resources or port groups

R ∈ {1,2}: a scaling factor for PMI subband size $P_\upsilon$: a parameter used to configure the number of FD basis vectors for a given rank $\upsilon$, i.e., $$M_\upsilon = \left\lceil p_\upsilon \frac{N_3}{R} \right\rceil,$$

where $N_3 = N_{CQI}R$ and $N_{CQI}$ is a number of CQI subbands

β: a parameter used to configure the maximum number of non-zero coefficients (NZCs), i.e., $K_0 = \lceil \beta 2LM_1 \rceil$, for each layer. The total number of NZCs across all layers, $K^{NZ} \leq 2K_0$ For MIMO layer l, the precoder matrix $W_l$ across all TRPs is given by a size-$P_{CSI-RS} \times N_3$ matrix $$W_l = \left[w_l^{(0)} \; ... \; w_l^{(N_3-1)}\right] = W_1 \tilde{W}_{2,l} W_{f,l}^H, \quad \text{Eq. 8}$$

where
- $w_l^{(t)}$ is a $P_{CSI-RS} \times 1$ precoding vector at a subband with subband index $t \in \{0,1, ..., N_3-1\}$ for layer l, where $P_{CSI-RS} = \Sigma_{s=1}^{N_{RS}} P_{CSI-RS,s}$ is the total number of CSI-RS ports in all the $N_{RS}$ NZP CSI-RS resources, $P^{CSI-RS,s} = 2N_{1,s}N_{2,s}$ is the number of CSI-RS ports in the $s^{th}$ NZP CSI-RS resource, where $N_{1,s}$ and $N_{2,s}$ are the number of antenna ports in a first and a second dimensions. Note that the number of CSI-RS ports in different NZP CSI-RS resources may be same or different.
- $W_1 = \text{diag}(W_1^{(1)}, ..., W_1^{(N_{RS})})$ is a size-$P_{CSI-RS} \times 2L'$ block diagonal spatial matrix, where L' is the total number of selected spatial beams associated with all the $N_{RS}$ NZP CSI-RS resources $$W_1^{(s)} = \begin{bmatrix} v_{m_1^{(0)}, m_2^{(0)}}^{(s)}, ..., v_{m_1^{(L_s-1)}, m_2^{(L_s-1)}}^{(s)} & 0 \\ 0 & v_{m_1^{(0)}, m_2^{(0)}}^{(s)}, ..., v_{m_1^{(L_s-1)}, m_2^{(L_s-1)}}^{(s)} \end{bmatrix}$$

is a size $P_{CSI-RS,s} \times 2L_s$ precoding matrix associated with the $s^{th}$ NZP CSI-RS resource, s=1, ..., $N_{RS}$ and $L'=\Sigma_{s=1}^{N_{RS}}L_s$.

$$\left\{v_{m_{1,s}^{(0)}, m_{2,s}^{(0)}}^{(s)}, ..., v_{m_{1,s}^{(L_s-1)}, m_{2,s}^{(L_s-1)}}^{(s)}\right\}$$

is a set of size $P_{CSI-RS,s}/2 \times 1$ selected 2-D DFT beams $$v_{m_{1,s}^{(i)}, m_{2,s}^{(i)}}^{(s)} = \left[u_{m_2^{(i)}}^{(s)}, e^{j\frac{2\pi m_{1,s}^{(i)}}{O_{1,s}N_{1,s}}} u_{m_2^{(i)}}^{(s)}, ..., e^{j\frac{2\pi m_{1,s}^{(i)}(N_{1,s}-1)}{O_{1,s}N_{1,s}}} u_{m_2^{(i)}}^{(s)}\right]^T$$

$$u_{m_2^{(i)}}^{(s)} = \left[1 \; e^{j\frac{2\pi m_2^{(i)}}{O_{2,s}N_{2,s}}} \; ... \; e^{j\frac{2\pi m_2^{(i)}(N_{2,s}-1)}{O_{2,s}N_{2,s}}}\right]^T \text{ if } N_{2,s} > 1 \text{ and } u_{m_2^{(i)}}^{(s)} = 1 \text{ if } N_{2,s} = 1$$

$$m_{1,s}^{(i)} = O_{1,s}n_{1,s}^{(i)} + q_{1,s},$$

$$m_{2,s}^{(i)} = O_{2,s}n_{2,s}^{(i)} + q_{2,s}, \; n_{1,s}^{(i)} \in \{0, 1, ..., N_{1,s}-1\}, n_{2,s}^{(i)} \in$$

$$\{0, 1, ..., N_{2,s}-1\}, q_{1,s} \in \{0, 1, ..., O_{1,s}-1\}, q_{2,s} \in \{0, 1, ..., O_{2,s}-1\},$$

$$i = 0, 1, ... L_s - 1,$$

and $O_{1,s}$ and $O_{2,s}$ are the oversampling factors along dimensions of $N_{1,s}$ and $N_{2,s}$, respectively.

If port selection type II CSI is configured, then each of the CSI-RS ports in all the CSI-RS resources corresponds to 2-D spatial beam and $$W_1^s = \begin{bmatrix} e_{m_s^{(s)}(0)}^{(s)}, \cdots, e_{m_s^{(s)}(L_s-1)}^{(s)} & 0 \\ 0 & e_{m_s^{(s)}(0)}^{(s)}, \cdots, e_{m_s^{(s)}(L_s-1)}^{(s)} \end{bmatrix},$$

where $e_{m_s^{(s)}(i)}^{(s)}$ ($i = 0, 1, \ldots, L_s - 1$) is a $P_{CSI-RS,s}/2 \times 1$ vector containing a value of 1 in the element of index $m_s^{(i)}$ and zeros elsewhere where the first element is the element of index 0, $$m_s^{(i)} \in \left\{ 0, 1, \ldots, \frac{P_{CSI-RS,s}}{2} - 1 \right\}$$

$W_{f,l} = [y_l^{(0)}, y_l^{(1)}, \ldots, y_l^{M_v-1}]$ is a size-$N_3 \times M_v$ frequency domain (FD) compression matrix comprising $M_v$ selected FD basis vectors, where $y_l^{(f)} \in \{y_0 y_1 \ldots y_{N_3-1}\}$, and $y_k = [y_{k,0} y_{k,1} \ldots y_{k,N_3-1}]^T$ and $y_{k,t} = e^{-j2\pi kt/N_3}$, $k$, $t=0,1,\ldots,N_3-1$. $W_{f,l}$ is common for all CSI-RS resources or TRPs $$\tilde{W}_{2,l} = \begin{bmatrix} \tilde{W}_{2,l,1} \\ \cdots \\ \tilde{W}_{2,l,N_{RS}} \end{bmatrix} = [c_{l,i,f}, i = 0, 1, \ldots, 2L'-1, f = 0, 1, \ldots, M_v - 1]$$

is a size $2L' \times M_v$ coefficient matrix $N_3$ is the number of PMI subbands, common for all CSI-RS resources or TRPs In an alternative expression, each of the precoding vector $w_l^{(f)}$ can be expressed as follows:

$$w_l^{(t)} = \gamma_l \begin{bmatrix} w_{1,l}^{(t)} \\ \cdots \\ w_{N_{RS},l}^{(t)} \end{bmatrix}, l = 1, \ldots, v,$$  Eq. 9

$$w_{s,l}^{(t)} = \begin{bmatrix} w_{s,l,0}^{(t)} \\ w_{s,l,1}^{(t)} \end{bmatrix}, s = 1, \ldots, N_{RS}.$$  Eq. 10

$$w_{s,l,p}^{(t)} = \sum_{i=0}^{L_s-1} v_{m_{1,s}^{(i)},m_{2,s}^{(i)}}^{(s)} \sum_{f=0}^{M_v-1} c_{l,i,f,p,s} y_{t,l}^{(f)}, p = 0, 1$$  Eq. 11

$$y_{t,l}^{(f)} = e^{j\frac{2\pi t m_{3,l}^{(f)}}{N_3}},$$  Eq. 12

$$c_{l,i,f,p,s} = p_{l,i,f,p,s}^{(1)} p_{l,i,f,p,s}^{(2)} \varphi_{l,i,f,p,s}$$  Eq. 13 where $\gamma_l$ is a scaling factor such that $$\left( w_l^{(t)} \right)^H w_l^{(t)} = \frac{1}{v}$$  Eq. 14

$v$ is the number of layers, $w_{s,l}^{(t)}$ is the precoder associated with the $s^{th}$ CSI-RS resource or TRP and consists of two parts, $w_{s,l,0}^{(t)}$ for a first polarization and $w_{s,l,1}^{(t)}$ for a second polarization, $n_{3,l}^{(f)} \in \{0,1,\ldots,N_3-1\}$ is a FD basis vector index of the $f^{th}$ selected FD basis vector, $c_{l,i,f,p,s} = p_{l,p,s}^{(1)}$ $p_{l,i,f,p,s}^{(2)} \varphi_{l,i,f,p,s}$ is the coefficient $c_{l,i,f}$ associated with polarization index p and CSI-RS (1)-(2) resource index s, and $p_{l,p,s}^{(1)}$ is the wideband amplitude associated with layer l, polarization index p, and CSI-RS resource index s, and $p_{l,i,f,p,s}^{(2)}$ is the subband amplitude associated with layer l, the $i^{th}$ selected spatial beam, the $f^{th}$ selected FD basis vector, polarization index p, and CSI-RS resource index s.

In one embodiment, the total number of selected beams, L', by the UE can be smaller than the number of configured beams, i.e., $L' = \sum_{s=1}^{N_{RS}} L_s < L$. This is useful since the actual useful beams seen by the UE may be less than the configured beams and the feedback overhead can be reduced when L'<L.

In some scenarios, not all the configured TRPs are suitable for CJT for a UE, and the UE may determine that a subset of the TRPs or CSI-RS resources may be suitable for participating in CJT. When a TRP is not selected for CJT by the UE, there is no selected beam associated with the TRP or CSI-RS resource. Thus, in one embodiment, the number of selected beams for each of the configured CSI-RS resources is also reported as part of the CSI, i.e., $\{L_1, \ldots, L_{N_{RS}}\}$ are reported, where $L_s = 0$, $s \in (1, \ldots, N_{RS})$ means that the $s^{th}$ CSI-RS resource or port group is not selected for CJT.

In Step 810, the UE 802 reports information that indicates the computed CSI for CJT, where this reported information includes at least some of the aforementioned coefficients and where some of the coefficients may be omitted based on priority. More specifically, the UE 802 reports a type II CSI comprising a number of parameters. When L'<L is supported, the CSI payload size can vary depending on L'. To help the network to determine the payload size for proper decoding, in one embodiment, L' is reported in Part 1 of the CSI report. Part 1 has a fixed payload size and, after decoding part 1 of the CSI report, gNB should know L' and thus can determine the payload size of Part 2 of the CSI. Alternatively, the number of selected beams associated with each CSI-RS resource, i.e., $\{L_1, \ldots, L_{N_{RS}}\}$, are reported in Part 1. Part 1 of the CSI contains information necessary to determine the payload size of the Part 2 of the CSI.

In one embodiment, $\{W_1^{(s)}\}$ are ordered according to the order of the corresponding CSI-RS resources configured in the CSI report configuration. For example, if three CSI-RS resources are configured as {CSI-RS resource #i, CSI-RS resource #j, CSI-RS resource #k}, then s=1 is associated with CSI-RS resource #i, s=2 with CSI-RS resource #j, and s=3 with CSI-RS resource #k.

In another embodiment, $\{W_1^{(s)}\}$ are ordered according to, for example, the received signal power, from the corresponding CSI-RS resources or TRPs, where s=1 is associated with the CSI-RS resource or TRP with the highest received power while s=$N_{RS}$ is associated with the CSI-RS resource or TRP with the lowest received power. Such an ordering of CSI-RS resources is reported to the network so that the reported CSI can be correctly interpreted by the network. The CSI-RS resource order may be reported in Part 1 of the CJT CSI report as $\{CRI_1, CRI_2, \ldots, CRI_{N_{RS}}\}$, where $CRI_s \in (1,2, \ldots, N_{RS})$ is an CSI-RS resource indicator. $CRI_k$ indicates the CSI-RS resource associated with s=k. For example, three CSI-RS resources are configured as {CSI-RS resource #i, CSI-RS resource #j, CSI-RS resource #k} and the received powers associated to the resources are $\{P_1, P_2, P_3\}$. If $P_2 > P_3 > P_1$, then the reported $\{CRI_1, CRI_2, \ldots, CRI_{N_{RS}}\} = \{CRI_1, CRI_2, \ldots, CRI_3\} = \{2, 3, 1\}$, where CRI=k indicates the $k^{th}$ CSI-RS resource in the CSI-RS resource list. In this example, s=1 is associated to CSI-RS resource #j, s=2 is associated to CSI-RS resource #k, and s=3 is associated to CSI-RS resource #i.

Alternatively, $\{CRI_1, CRI_2, \ldots, CRI_{N_{RS}}\}$ may be reported in Part 2 of the CSI report.

Part 2 of the reported CSI would comprise:

Number of selected beams associated with each CSI-RS resource or port group: $\{L_1, \ldots, L_{N_{RS}}\}$ if they are not reported in Part 1.

spatial beam indices $m_{1,s}^{(i)}$ and $m_{2,s}^{(i)}$ (i=1, ..., $L_s$) are indicated via $i_{1,1,s}$ and $i_{1,2,s}$ Indices of selected FD basis vectors $\{y_l^{(0)}, y_l^{(1)}, \ldots, y_l^{(M_v-1)}\}$ for each layer indicated by means of indices $i_{1,5}$ (for $N_3>19$) and $i_{1,6,l}$ (for $M_v>1$ and l=1, ..., $\upsilon$). Note that a common set of FD basis vectors may be selected for all $N_{RS}$ CSI-RS resources or port groups.

One of $\{p_{l,p,s}^{(1)}, p=0,1\}$ (which is the wideband amplitude per layer l, per polarization p, and per CSI-RS resource or port group s) equals to 1 and is denoted as $p_{l,p^*,s}^{(1)}$, which is associated to the strongest beam in one of the two polarizations. The strongest beam index and the polarization index are indicated via $i_{1,8,l,s}$. The other $p_{l,p,s}^{(1)}(p \neq p^*)$ are indicated via $i_{2,3,l,s}$ $P_{l,i,f,p,s}^{(2)}$ is indicated via $i_{2,4,l,s}$ $\varphi_{l,i,f,p,s}$ is indicated via $i_{2,5,l,s}$ In one embodiment, the bitmap used to indicate the non-zero coefficients is given by $i_{1,7,l}$ for each layer. Each reported element of index $i_{1,7,l}$ is indexed by l, i and f and associated with a priority value Pri(l, i, f)=$2 \cdot L' \cdot \upsilon \cdot \pi(f) + \upsilon \cdot i + l$, where with l=1,2, ..., $\upsilon$, i=0,1, ..., 2L'−1, and f=0,1, ..., $M_\upsilon$−1 $\pi(f)=\min(2 \cdot n_{3,l}^{(f)}, 2 \cdot (N_3-n_{3,l}^{(f)})-1)$, where $n_{3,l}^{(f)}$ is the index of the $f^{th}$ selected FD basis vector Similarly, the subband amplitudes of combining coefficients given by $i_{2,4,l}$ and phase information of combining coefficients given by $i_{2,5,l}$ are also indexed by l, i and f. Each reported element of $i_{2,4,l}$ and $i_{2,5,l}$ is associated with a same priority value Pri(l, i, f) defined above for $i_{1,7,l}$.

In one embodiment, the wideband amplitudes may be reported per layer, per polarization, and per CSI-RS resource or port group. Hence, $2N_{RS}-1$ wideband amplitudes may be reported by the UE (except the strongest beam+polarization indicated by $i_{1,8,l}$. The wideband amplitudes are indicated by $i_{2,3,l,s}$ where s is the CSI-RS resource or port group index.

For CSI omission, the element with the highest priority has the lowest associated value Pri(l, i, f). Omission of Part 2 CSI is according to the priority order shown in Table 5.2.3-1, where Group 0 includes {CRIs} (if reported), $\{L_s\}$ (if not reported in Part 1), indices $i_{1,1,s}$ (if reported), $i_{1,2,s}$ (if reported) and $i_{1,8,l}$ (l=1, ..., $\upsilon$, s=1,2, ..., $N_{RS}$). Thus, Group 0 comprises indicators for $W_1$, TRP/CSI-RS resource order, and the index of the beam and polarization associated to the strongest $\tilde{W}_2$ coefficient.

Group 1 includes indices $i_{1,5}$ (if reported), $i_{1,6,l}$ (if reported), the $\upsilon 2L'M_\upsilon - \lfloor K^{NZ}/2 \rfloor$ highest priority elements of $i_{1,7,l}$, the wideband amplitudes given by $i_{2,3,l,s}$ (l=1, ..., $\upsilon$, s=1,2, ..., $N_{RS}$), the max $$\left(0, \left\lceil \frac{K^{NZ}}{2} \right\rceil - \upsilon \right)$$

highest priority elements of $i_{2,4,l}$ and the max $$\left(0, \left\lceil \frac{K^{NZ}}{2} \right\rceil - \upsilon \right)$$

highest priority elements of $i_{2,5,l}$ (l=1, ..., $\upsilon$). In other words, Group 1 includes $W_f$, the per CSI-RS resource or port group wideband amplitudes, part of the higher priority NZC bitmap, and part of the higher priority amplitude and phase coefficients of $\tilde{W}_2$ Group 2 includes the $\lfloor K^{NZ}/2 \rfloor$ lowest priority elements of $i_{1,7,l}$, the min $$\left(K^{NZ} - \upsilon, \left\lfloor \frac{K^{NZ}}{2} \right\rfloor \right)$$

lowest priority elements of $i_{2,4,l}$ and the min $$\left(K^{NZ} - \upsilon, \left\lfloor \frac{K^{NZ}}{2} \right\rfloor \right)$$

lowest priority elements of $i_{2,5,l}$ (l=1, ..., $\upsilon$). In other words, Group 2 includes the remaining low priority part of the NZC bitmap, the amplitude and phase coefficients of $\tilde{W}_2$ In Step 812, in case that some part of Part 2 need to be dropped, the UE 502 drops Group 2 parameters first, then parameters in Group 1 if need. Group 0 parameters are dropped last if needed. Dropped parameters are not reported in step 810.

In Step 814, the network node 500 uses the reported CSI for one or more operational tasks, as will be appreciated by those of ordinary skill in the art.

Further Details

Figure 9:
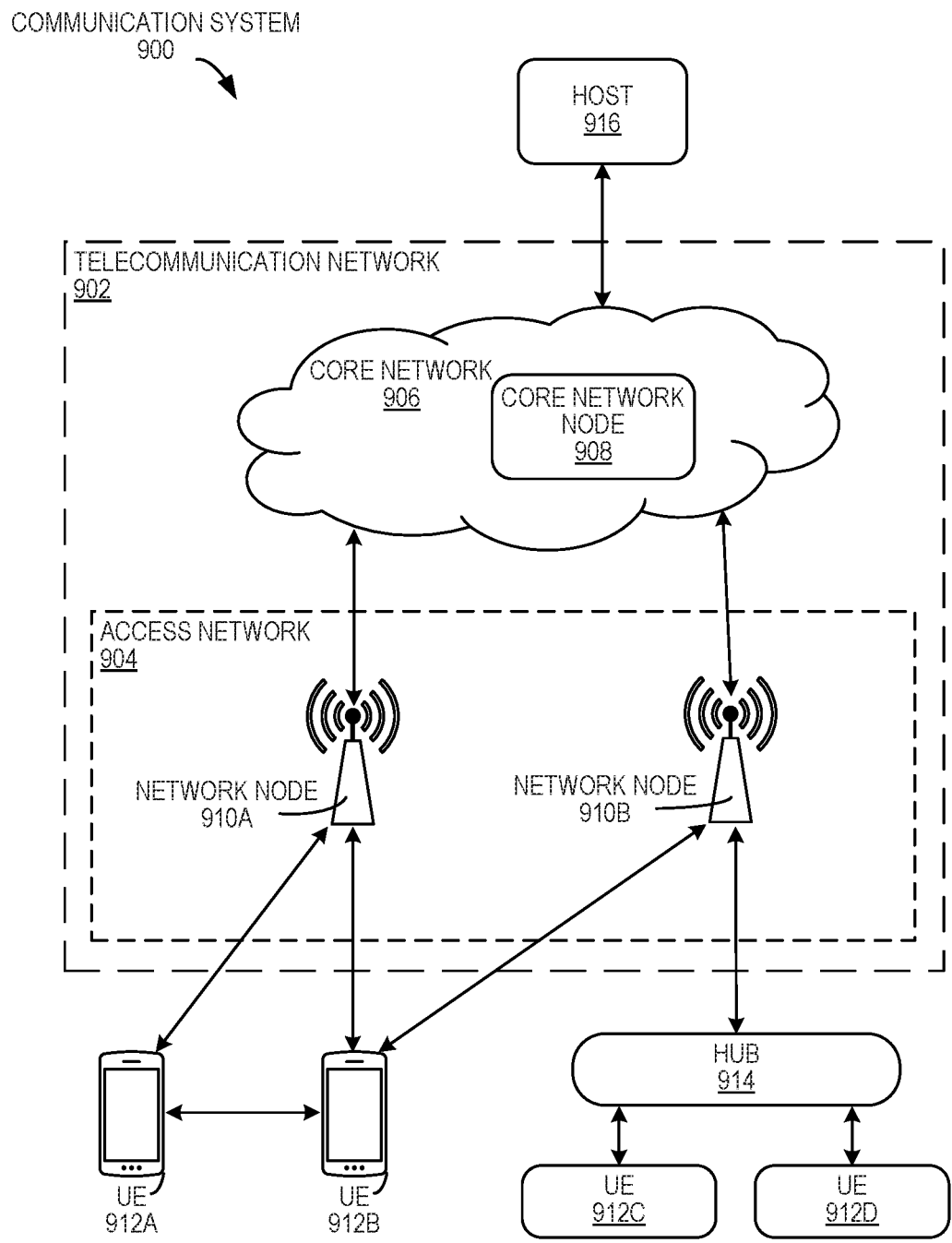
FIG. 9 shows an example of a communication system in which embodiments of the present disclosure may be implemented.

FIG. 9 shows an example of a communication system 900 in which embodiments of the present disclosure may be implemented.

In the example, the communication system 900 includes a telecommunication network 902 that includes an access network 904, such as a Radio Access Network (RAN), and a core network 906, which includes one or more core network nodes 908. The access network 904 includes one or more access network nodes, such as network nodes 910A and 910B (one or more of which may be generally referred to as network nodes 910), or any other similar Third Generation Partnership Project (3GPP) access node or non-3GPP Access Point (AP). The network nodes 910 facilitate direct or indirect connection of User Equipment (UE), such as by connecting UEs 912A, 912B, 912C, and 912D (one or more of which may be generally referred to as UEs 912) to the core network 906 over one or more wireless connections. Network nodes 500 and 800 of FIGS. 5 and 8 are examples of the network nodes 910. Likewise, the UEs 502 and 802 of FIGS. 5 and 8 are examples of the UEs 912.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 900 may include any number of wired or wireless networks, network nodes, UEs, and/or any other components or systems that may facilitate or participate in the communication of data and/or signals whether via wired or wireless connections. The communication system 900 may include and/or interface with any type of communication, telecommunication, data, cellular, radio network, and/or other similar type of system.

The UEs 912 may be any of a wide variety of communication devices, including wireless devices arranged, configured, and/or operable to communicate wirelessly with the network nodes 910 and other communication devices. Similarly, the network nodes 910 are arranged, capable, configured, and/or operable to communicate directly or indirectly with the UEs 912 and/or with other network nodes or equipment in the telecommunication network 902 to enable and/or provide network access, such as wireless network access, and/or to perform other functions, such as administration in the telecommunication network 902.

In the depicted example, the core network 906 connects the network nodes 910 to one or more hosts, such as host 916. These connections may be direct or indirect via one or more intermediary networks or devices. In other examples, network nodes may be directly coupled to hosts. The core network 906 includes one more core network nodes (e.g., core network node 908) that are structured with hardware and software components. Features of these components may be substantially similar to those described with respect to the UEs, network nodes, and/or hosts, such that the descriptions thereof are generally applicable to the corresponding components of the core network node 908. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-Concealing Function (SIDF), Unified Data Management (UDM), Security Edge Protection Proxy (SEPP), Network Exposure Function (NEF), and/or a User Plane Function (UPF).

The host 916 may be under the ownership or control of a service provider other than an operator or provider of the access network 904 and/or the telecommunication network 902, and may be operated by the service provider or on behalf of the service provider. The host 916 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 900 of FIG. 9 enables connectivity between the UEs, network nodes, and hosts. In that sense, the communication system 900 may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable Second, Third, Fourth, or Fifth Generation (2G, 3G, 4G, or 5G) standards, or any applicable future generation standard (e.g., Sixth Generation (6G)); Wireless Local Area Network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any Low Power Wide Area Network (LPWAN) standards such as LoRa and Sigfox.

In some examples, the telecommunication network 902 is a cellular network that implements 3GPP standardized features. Accordingly, the telecommunication network 902 may support network slicing to provide different logical networks to different devices that are connected to the telecommunication network 902. For example, the telecommunication network 902 may provide Ultra Reliable Low Latency Communication (URLLC) services to some UEs, while providing enhanced Mobile Broadband (eMBB) services to other UEs, and/or massive Machine Type Communication (mMTC)/massive Internet of Things (IOT) services to yet further UEs.

In some examples, the UEs 912 are configured to transmit and/or receive information without direct human interaction. For instance, a UE may be designed to transmit information to the access network 904 on a predetermined schedule, when triggered by an internal or external event, or in response to requests from the access network 904. Additionally, a UE may be configured for operating in single- or multi-Radio Access Technology (RAT) or multi-standard mode. For example, a UE may operate with any one or combination of WiFi, New Radio (NR), and LTE, i.e. be configured for Multi-Radio Dual Connectivity (MR-DC), such as Evolved UMTS Terrestrial RAN (E-UTRAN) NR-Dual Connectivity (EN-DC).

In the example, a hub 914 communicates with the access network 904 to facilitate indirect communication between one or more UEs (e.g., UE 912C and/or 912D) and network nodes (e.g., network node 910B). In some examples, the hub 914 may be a controller, router, content source and analytics, or any of the other communication devices described herein regarding UEs. For example, the hub 914 may be a broadband router enabling access to the core network 906 for the UEs. As another example, the hub 914 may be a controller that sends commands or instructions to one or more actuators in the UEs. Commands or instructions may be received from the UEs, network nodes 910, or by executable code, script, process, or other instructions in the hub 914. As another example, the hub 914 may be a data collector that acts as temporary storage for UE data and, in some embodiments, may perform analysis or other processing of the data. As another example, the hub 914 may be a content source. For example, for a UE that is a Virtual Reality (VR) headset, display, loudspeaker or other media delivery device, the hub 914 may retrieve VR assets, video, audio, or other media or data related to sensory information via a network node, which the hub 914 then provides to the UE either directly, after performing local processing, and/or after adding additional local content. In still another example, the hub 914 acts as a proxy server or orchestrator for the UEs, in particular in if one or more of the UEs are low energy IoT devices.

The hub 914 may have a constant/persistent or intermittent connection to the network node 910B. The hub 914 may also allow for a different communication scheme and/or schedule between the hub 914 and UEs (e.g., UE 912C and/or 912D), and between the hub 914 and the core network 906. In other examples, the hub 914 is connected to the core network 906 and/or one or more UEs via a wired connection. Moreover, the hub 914 may be configured to connect to a Machine-to-Machine (M2M) service provider over the access network 904 and/or to another UE over a direct connection. In some scenarios, UEs may establish a wireless connection with the network nodes 910 while still connected via the hub 914 via a wired or wireless connection. In some embodiments, the hub 914 may be a dedicated hub—that is, a hub whose primary function is to route communications to/from the UEs from/to the network node 910B. In other embodiments, the hub 914 may be a non-dedicated hub—that is, a device which is capable of operating to route communications between the UEs and the network node 910B, but which is additionally capable of operating as a communication start and/or end point for certain data channels.

Figure 10:
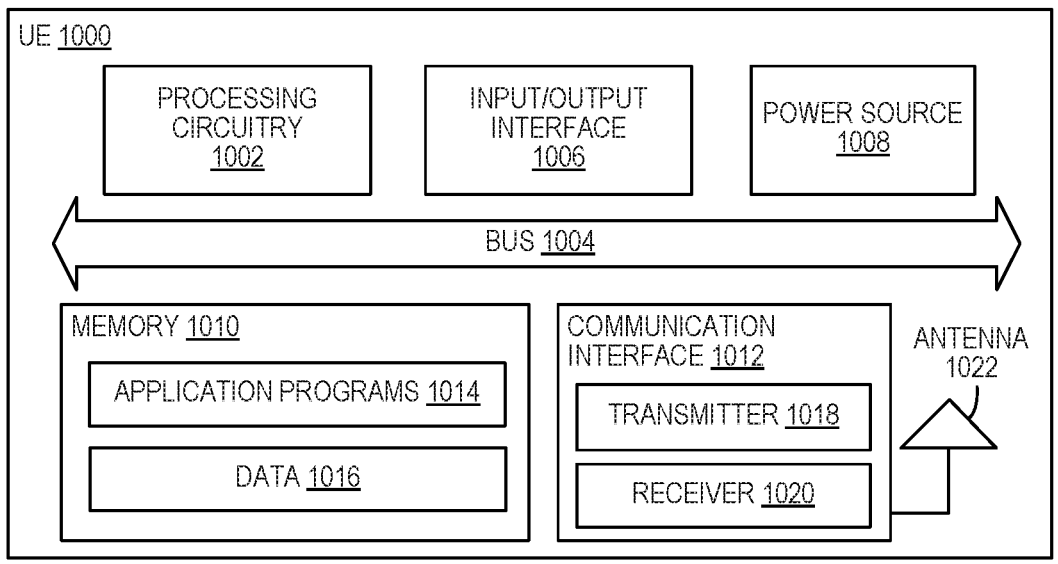
FIG. 10 shows a UE in accordance with some embodiments.

FIG. 10 shows a UE 1000 in accordance with some embodiments. As used herein, a UE refers to a device capable, configured, arranged, and/or operable to communicate wirelessly with network nodes and/or other UEs. Examples of a UE include, but are not limited to, a smart phone, mobile phone, cell phone, Voice over Internet Protocol (VOIP) phone, wireless local loop phone, desktop computer, Personal Digital Assistant (PDA), wireless camera, gaming console or device, music storage device, playback appliance, wearable terminal device, wireless endpoint, mobile station, tablet, laptop, Laptop Embedded Equipment (LEE), Laptop Mounted Equipment (LME), smart device, wireless Customer Premise Equipment (CPE), vehicle-mounted or vehicle embedded/integrated wireless device, etc. Other examples include any UE identified by the 3GPP, including a Narrowband Internet of Things (NB-IoT) UE, a Machine Type Communication (MTC) UE, and/or an enhanced MTC (eMTC) UE.

A UE may support Device-to-Device (D2D) communication, for example by implementing a 3GPP standard for sidelink communication, Dedicated Short-Range Communication (DSRC), Vehicle-to-Vehicle (V2V), Vehicle-to-Infrastructure (V2I), or Vehicle-to-Everything (V2X). In other examples, a UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter).

The UE 1000 includes processing circuitry 1002 that is operatively coupled via a bus 1004 to an input/output interface 1006, a power source 1008, memory 1010, a communication interface 1012, and/or any other component, or any combination thereof. Certain UEs may utilize all or a subset of the components shown in FIG. 10. The level of integration between the components may vary from one UE to another UE. Further, certain UEs may contain multiple instances of a component, such as multiple processors, memories, transceivers, transmitters, receivers, etc.

The processing circuitry 1002 is configured to process instructions and data and may be configured to implement any sequential state machine operative to execute instructions stored as machine-readable computer programs in the memory 1010. The processing circuitry 1002 may be implemented as one or more hardware-implemented state machines (e.g., in discrete logic, Field Programmable Gate Arrays (FPGAs), Application Specific Integrated Circuits (ASICs), etc.); programmable logic together with appropriate firmware; one or more stored computer programs, general purpose processors, such as a microprocessor or Digital Signal Processor (DSP), together with appropriate software; or any combination of the above. For example, the processing circuitry 1002 may include multiple Central Processing Units (CPUs).

In the example, the input/output interface 1006 may be configured to provide an interface or interfaces to an input device, output device, or one or more input and/or output devices. Examples of an output device include a speaker, a sound card, a video card, a display, a monitor, a printer, an actuator, an emitter, a smartcard, another output device, or any combination thereof. An input device may allow a user to capture information into the UE 1000. Examples of an input device include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, a biometric sensor, etc., or any combination thereof. An output device may use the same type of interface port as an input device. For example, a Universal Serial Bus (USB) port may be used to provide an input device and an output device.

In some embodiments, the power source 1008 is structured as a battery or battery pack. Other types of power sources, such as an external power source (e.g., an electricity outlet), photovoltaic device, or power cell, may be used. The power source 1008 may further include power circuitry for delivering power from the power source 1008 itself, and/or an external power source, to the various parts of the UE 1000 via input circuitry or an interface such as an electrical power cable. Delivering power may be, for example, for charging the power source 1008. Power circuitry may perform any formatting, converting, or other modification to the power from the power source 1008 to make the power suitable for the respective components of the UE 1000 to which power is supplied.

The memory 1010 may be or be configured to include memory such as Random Access Memory (RAM), Read Only Memory (ROM), Programmable ROM (PROM), Erasable PROM (EPROM), Electrically EPROM (EEPROM), magnetic disks, optical disks, hard disks, removable cartridges, flash drives, and so forth. In one example, the memory 1010 includes one or more application programs 1014, such as an operating system, web browser application, a widget, gadget engine, or other application, and corresponding data 1016. The memory 1010 may store, for use by the UE 1000, any of a variety of various operating systems or combinations of operating systems.

The memory 1010 may be configured to include a number of physical drive units, such as Redundant Array of Independent Disks (RAID), flash memory, USB flash drive, external hard disk drive, thumb drive, pen drive, key drive, High Density Digital Versatile Disc (HD-DVD) optical disc drive, internal hard disk drive, Blu-Ray optical disc drive, Holographic Digital Data Storage (HDDS) optical disc drive, external mini Dual In-line Memory Module (DIMM), Synchronous Dynamic RAM (SDRAM), external micro-DIMM SDRAM, smartcard memory such as a tamper resistant module in the form of a Universal Integrated Circuit Card (UICC) including one or more Subscriber Identity Modules (SIMs), such as a Universal SIM (USIM) and/or Internet Protocol Multimedia Services Identity Module (ISIM), other memory, or any combination thereof. The UICC may for example be an embedded UICC (eUICC), integrated UICC (iUICC) or a removable UICC commonly known as a 'SIM card.' The memory 1010 may allow the UE 1000 to access instructions, application programs, and the like stored on transitory or non-transitory memory media, to off-load data, or to upload data. An article of manufacture, such as one utilizing a communication system, may be tangibly embodied as or in the memory 1010, which may be or comprise a device-readable storage medium.

The processing circuitry 1002 may be configured to communicate with an access network or other network using the communication interface 1012. The communication interface 1012 may comprise one or more communication subsystems and may include or be communicatively coupled to an antenna 1022. The communication interface 1012 may include one or more transceivers used to communicate, such as by communicating with one or more remote transceivers of another device capable of wireless communication (e.g., another UE or a network node in an access network). Each transceiver may include a transmitter 1018 and/or a receiver 1020 appropriate to provide network communications (e.g., optical, electrical, frequency allocations, and so forth). Moreover, the transmitter 1018 and receiver 1020 may be coupled to one or more antennas (e.g., the antenna 1022) and may share circuit components, software, or firmware, or alternatively be implemented separately.

In the illustrated embodiment, communication functions of the communication interface 1012 may include cellular communication, WiFi communication, LPWAN communication, data communication, voice communication, multimedia communication, short-range communications such as Bluetooth, NFC, location-based communication such as the use of the Global Positioning System (GPS) to determine a location, another like communication function, or any combination thereof. Communications may be implemented according to one or more communication protocols and/or standards, such as IEEE 802.11, Code Division Multiplexing Access (CDMA), Wideband CDMA (WCDMA), GSM, LTE, NR, UMTS, WiMax, Ethernet, Transmission Control Protocol/Internet Protocol (TCP/IP), Synchronous Optical Networking (SONET), Asynchronous Transfer Mode (ATM), Quick User Datagram Protocol Internet Connection (QUIC), Hypertext Transfer Protocol (HTTP), and so forth.

Regardless of the type of sensor, a UE may provide an output of data captured by its sensors, through its communication interface 1012, or via a wireless connection to a network node. Data captured by sensors of a UE can be communicated through a wireless connection to a network node via another UE. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, a UE comprises an actuator, a motor, or a switch related to a communication interface configured to receive wireless input from a network node via a wireless connection. In response to the received wireless input the states of the actuator, the motor, or the switch may change. For example, the UE may comprise a motor that adjusts the control surfaces or rotors of a drone in flight according to the received input or to a robotic arm performing a medical procedure according to the received input.

A UE, when in the form of an IoT device, may be a device for use in one or more application domains, these domains comprising, but not limited to, city wearable technology, extended industrial application, and healthcare. Non-limiting examples of such an IoT device are a device which is or which is embedded in: a connected refrigerator or freezer, a television, a connected lighting device, an electricity meter, a robot vacuum cleaner, a voice controlled smart speaker, a home security camera, a motion detector, a thermostat, a smoke detector, a door/window sensor, a flood/moisture sensor, an electrical door lock, a connected doorbell, an air conditioning system like a heat pump, an autonomous vehicle, a surveillance system, a weather monitoring device, a vehicle parking monitoring device, an electric vehicle charging station, a smart watch, a fitness tracker, a head-mounted display for Augmented Reality (AR) or VR, a wearable for tactile augmentation or sensory enhancement, a water sprinkler, an animal- or item-tracking device, a sensor for monitoring a plant or animal, an industrial robot, an Unmanned Aerial Vehicle (UAV), and any kind of medical device, like a heart rate monitor or a remote controlled surgical robot. A UE in the form of an IoT device comprises circuitry and/or software in dependence of the intended application of the IoT device in addition to other components as described in relation to the UE 1000 shown in FIG. 10.

As yet another specific example, in an IoT scenario, a UE may represent a machine or other device that performs monitoring and/or measurements and transmits the results of such monitoring and/or measurements to another UE and/or a network node. The UE may in this case be an M2M device, which may in a 3GPP context be referred to as an MTC device. As one particular example, the UE may implement the 3GPP NB-IoT standard. In other scenarios, a UE may represent a vehicle, such as a car, a bus, a truck, a ship, an airplane, or other equipment that is capable of monitoring and/or reporting on its operational status or other functions associated with its operation.

In practice, any number of UEs may be used together with respect to a single use case. For example, a first UE might be or be integrated in a drone and provide the drone's speed information (obtained through a speed sensor) to a second UE that is a remote controller operating the drone. When the user makes changes from the remote controller, the first UE may adjust the throttle on the drone (e.g., by controlling an actuator) to increase or decrease the drone's speed. The first and/or the second UE can also include more than one of the functionalities described above. For example, a UE might comprise the sensor and the actuator and handle communication of data for both the speed sensor and the actuators.

Figure 11:
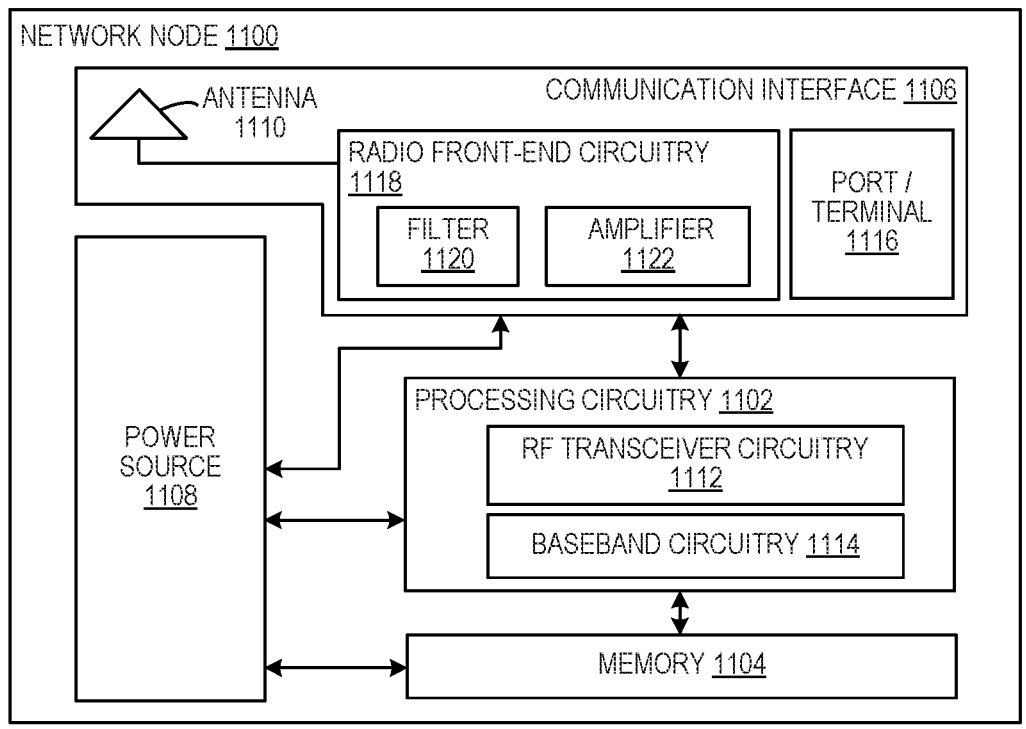
FIG. 11 shows a network node in accordance with some embodiments.

FIG. 11 shows a network node 1100 in accordance with some embodiments. As used herein, network node refers to equipment capable, configured, arranged, and/or operable to communicate directly or indirectly with a UE and/or with other network nodes or equipment in a telecommunication network. Examples of network nodes include, but are not limited to, APs (e.g., radio APs), Base Stations (BSs) (e.g., radio BSs, Node Bs, evolved Node Bs (eNBs), and NR Node Bs (gNBs)).

BSs may be categorized based on the amount of coverage they provide (or, stated differently, their transmit power level) and so, depending on the provided amount of coverage, may be referred to as femto BSs, pico BSs, micro BSs, or macro BSs. A BS may be a relay node or a relay donor node controlling a relay. A network node may also include one or more (or all) parts of a distributed radio BS such as centralized digital units and/or Remote Radio Units (RRUs), sometimes referred to as Remote Radio Heads (RRHs). Such RRUs may or may not be integrated with an antenna as an antenna integrated radio. Parts of a distributed radio BS may also be referred to as nodes in a Distributed Antenna System (DAS).

Other examples of network nodes include multiple Transmission Point (multi-TRP) 5G access nodes, Multi-Standard Radio (MSR) equipment such as MSR BSs, network controllers such as Radio Network Controllers (RNCs) or BS Controllers (BSCs), Base Transceiver Stations (BTSs), transmission points, transmission nodes, Multi-Cell/Multicast Coordination Entities (MCEs), Operation and Maintenance (O&M) nodes, Operations Support System (OSS) nodes, Self-Organizing Network (SON) nodes, positioning nodes (e.g., Evolved Serving Mobile Location Centers (E-SMLCs)), and/or Minimization of Drive Tests (MDTs).

The network node 1100 includes processing circuitry 1102, memory 1104, a communication interface 1106, and a power source 1108. The network node 1100 may be composed of multiple physically separate components (e.g., a Node B component and an RNC component, or a BTS component and a BSC component, etc.), which may each have their own respective components. In certain scenarios in which the network node 1100 comprises multiple separate components (e.g., BTS and BSC components), one or more of the separate components may be shared among several network nodes. For example, a single RNC may control multiple Node Bs. In such a scenario, each unique Node B and RNC pair may in some instances be considered a single separate network node. In some embodiments, the network node 1100 may be configured to support multiple RATs. In such embodiments, some components may be duplicated (e.g., separate memory 1104 for different RATs) and some components may be reused (e.g., an antenna 1110 may be shared by different RATs). The network node 1100 may also include multiple sets of the various illustrated components for different wireless technologies integrated into network node 1100, for example GSM, WCDMA, LTE, NR, WiFi, Zigbee, Z-wave, Long Range Wide Area Network (LoRaWAN), Radio Frequency Identification (RFID), or Bluetooth wireless technologies. These wireless technologies may be integrated into the same or different chip or set of chips and other components within the network node 1100.

The processing circuitry 1102 may comprise a combination of one or more of a microprocessor, controller, microcontroller, CPU, DSP, ASIC, FPGA, or any other suitable computing device, resource, or combination of hardware, software, and/or encoded logic operable to provide, either alone or in conjunction with other network node 1100 components, such as the memory 1104, to provide network node 1100 functionality.

In some embodiments, the processing circuitry 1102 includes a System on a Chip (SOC). In some embodiments, the processing circuitry 1102 includes one or more of Radio Frequency (RF) transceiver circuitry 1112 and baseband processing circuitry 1114. In some embodiments, the RF transceiver circuitry 1112 and the baseband processing circuitry 1114 may be on separate chips (or sets of chips), boards, or units, such as radio units and digital units. In alternative embodiments, part or all of the RF transceiver circuitry 1112 and the baseband processing circuitry 1114 may be on the same chip or set of chips, boards, or units.

The memory 1104 may comprise any form of volatile or non-volatile computer-readable memory including, without limitation, persistent storage, solid state memory, remotely mounted memory, magnetic media, optical media, RAM, ROM, mass storage media (for example, a hard disk), removable storage media (for example, a flash drive, a Compact Disk (CD), or a Digital Video Disk (DVD)), and/or any other volatile or non-volatile, non-transitory device-readable, and/or computer-executable memory devices that store information, data, and/or instructions that may be used by the processing circuitry 1102. The memory 1104 may store any suitable instructions, data, or information, including a computer program, software, an application including one or more of logic, rules, code, tables, and/or other instructions capable of being executed by the processing circuitry 1102 and utilized by the network node 1100. The memory 1104 may be used to store any calculations made by the processing circuitry 1102 and/or any data received via the communication interface 1106. In some embodiments, the processing circuitry 1102 and the memory 1104 are integrated.

The communication interface 1106 is used in wired or wireless communication of signaling and/or data between a network node, access network, and/or UE. As illustrated, the communication interface 1106 comprises port(s)/terminal(s) 1116 to send and receive data, for example to and from a network over a wired connection. The communication interface 1106 also includes radio front-end circuitry 1118 that may be coupled to, or in certain embodiments a part of, the antenna 1110. The radio front-end circuitry 1118 comprises filters 1120 and amplifiers 1122. The radio front-end circuitry 1118 may be connected to the antenna 1110 and the processing circuitry 1102. The radio front-end circuitry 1118 may be configured to condition signals communicated between the antenna 1110 and the processing circuitry 1102. The radio front-end circuitry 1118 may receive digital data that is to be sent out to other network nodes or UEs via a wireless connection. The radio front-end circuitry 1118 may convert the digital data into a radio signal having the appropriate channel and bandwidth parameters using a combination of the filters 1120 and/or the amplifiers 1122. The radio signal may then be transmitted via the antenna 1110. Similarly, when receiving data, the antenna 1110 may collect radio signals which are then converted into digital data by the radio front-end circuitry 1118. The digital data may be passed to the processing circuitry 1102. In other embodiments, the communication interface 1106 may comprise different components and/or different combinations of components.

In certain alternative embodiments, the network node 1100 does not include separate radio front-end circuitry 1118; instead, the processing circuitry 1102 includes radio front-end circuitry and is connected to the antenna 1110. Similarly, in some embodiments, all or some of the RF transceiver circuitry 1112 is part of the communication interface 1106. In still other embodiments, the communication interface 1106 includes the one or more ports or terminals 1116, the radio front-end circuitry 1118, and the RF transceiver circuitry 1112 as part of a radio unit (not shown), and the communication interface 1106 communicates with the baseband processing circuitry 1114, which is part of a digital unit (not shown).

The antenna 1110 may include one or more antennas, or antenna arrays, configured to send and/or receive wireless signals. The antenna 1110 may be coupled to the radio front-end circuitry 1118 and may be any type of antenna capable of transmitting and receiving data and/or signals wirelessly. In certain embodiments, the antenna 1110 is separate from the network node 1100 and connectable to the network node 1100 through an interface or port.

The antenna 1110, the communication interface 1106, and/or the processing circuitry 1102 may be configured to perform any receiving operations and/or certain obtaining operations described herein as being performed by the network node 1100. Any information, data, and/or signals may be received from a UE, another network node, and/or any other network equipment. Similarly, the antenna 1110, the communication interface 1106, and/or the processing circuitry 1102 may be configured to perform any transmitting operations described herein as being performed by the network node 1100. Any information, data, and/or signals may be transmitted to a UE, another network node, and/or any other network equipment.

The power source 1108 provides power to the various components of the network node 1100 in a form suitable for the respective components (e.g., at a voltage and current level needed for each respective component). The power source 1108 may further comprise, or be coupled to, power management circuitry to supply the components of the network node 1100 with power for performing the functionality described herein. For example, the network node 1100 may be connectable to an external power source (e.g., the power grid or an electricity outlet) via input circuitry or an interface such as an electrical cable, whereby the external power source supplies power to power circuitry of the power source 1108. As a further example, the power source 1108 may comprise a source of power in the form of a battery or battery pack which is connected to, or integrated in, power circuitry. The battery may provide backup power should the external power source fail.

Embodiments of the network node 1100 may include additional components beyond those shown in FIG. 11 for providing certain aspects of the network node's functionality, including any of the functionality described herein and/or any functionality necessary to support the subject matter described herein. For example, the network node 1100 may include user interface equipment to allow input of information into the network node 1100 and to allow output of information from the network node 1100. This may allow a user to perform diagnostic, maintenance, repair, and other administrative functions for the network node 1100.

Figure 12:
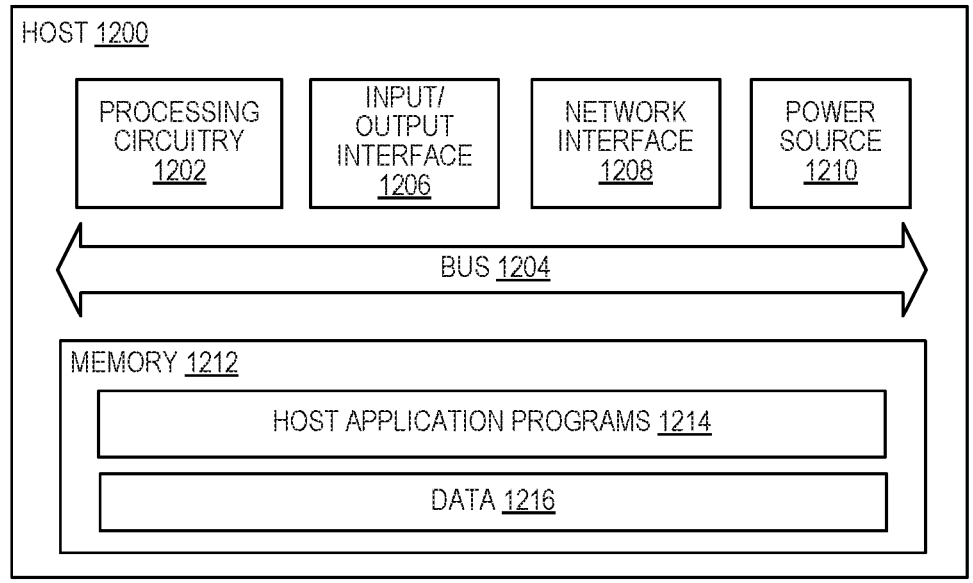
FIG. 12 is a block diagram of a host, which may be an embodiment of the host 916 of FIG. 9, in accordance with various aspects described herein.

FIG. 12 is a block diagram of a host 1200, which may be an embodiment of the host 916 of FIG. 9, in accordance with various aspects described herein. As used herein, the host 1200 may be or comprise various combinations of hardware and/or software including a standalone server, a blade server, a cloud-implemented server, a distributed server, a virtual machine, container, or processing resources in a server farm. The host 1200 may provide one or more services to one or more UEs.

The host 1200 includes processing circuitry 1202 that is operatively coupled via a bus 1204 to an input/output interface 1206, a network interface 1208, a power source 1210, and memory 1212. Other components may be included in other embodiments. Features of these components may be substantially similar to those described with respect to the devices of previous figures, such as FIGS. 10 and 11, such that the descriptions thereof are generally applicable to the corresponding components of the host 1200.

The memory 1212 may include one or more computer programs including one or more host application programs 1214 and data 1216, which may include user data, e.g. data generated by a UE for the host 1200 or data generated by the host 1200 for a UE. Embodiments of the host 1200 may utilize only a subset or all of the components shown. The host application programs 1214 may be implemented in a container-based architecture and may provide support for video codecs (e.g., Versatile Video Coding (VVC), High Efficiency Video Coding (HEVC), Advanced Video Coding (AVC), Moving Picture Experts Group (MPEG), VP9) and audio codecs (e.g., Free Lossless Audio Codec (FLAC), Advanced Audio Coding (AAC), MPEG, G.711), including transcoding for multiple different classes, types, or implementations of UEs (e.g., handsets, desktop computers, wearable display systems, and heads-up display systems). The host application programs 1214 may also provide for user authentication and licensing checks and may periodically report health, routes, and content availability to a central node, such as a device in or on the edge of a core network. Accordingly, the host 1200 may select and/or indicate a different host for Over-The-Top (OTT) services for a UE. The host application programs 1214 may support various protocols, such as the HTTP Live Streaming (HLS) protocol, Real-Time Messaging Protocol (RTMP), Real-Time Streaming Protocol (RTSP), Dynamic Adaptive Streaming over HTTP (DASH or MPEG-DASH), etc.

Figure 13:
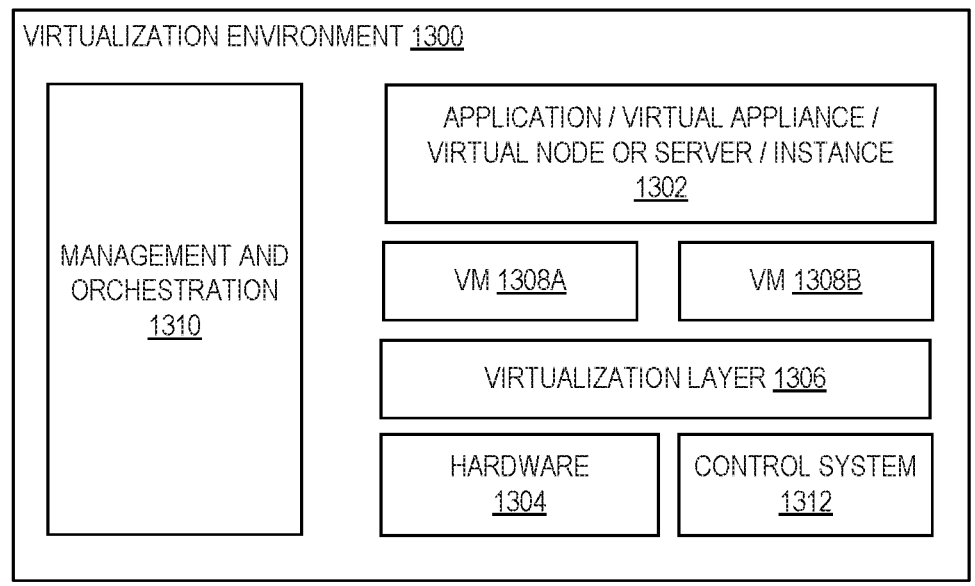
FIG. 13 is a block diagram illustrating a virtualization environment in which functions implemented by some embodiments may be virtualized.

FIG. 13 is a block diagram illustrating a virtualization environment 1300 in which functions implemented by some embodiments may be virtualized. In the present context, virtualizing means creating virtual versions of apparatuses or devices which may include virtualizing hardware platforms, storage devices, and networking resources. As used herein, virtualization can be applied to any device described herein, or components thereof, and relates to an implementation in which at least a portion of the functionality is implemented as one or more virtual components. Some or all of the functions described herein may be implemented as virtual components executed by one or more Virtual Machines (VMs) implemented in one or more virtual environments 1300 hosted by one or more of hardware nodes, such as a hardware computing device that operates as a network node, UE, core network node, or host. Further, in embodiments in which the virtual node does not require radio connectivity (e.g., a core network node or host), then the node may be entirely virtualized.

Applications 1302 (which may alternatively be called software instances, virtual appliances, network functions, virtual nodes, virtual network functions, etc.) are run in the virtualization environment 1200 to implement some of the features, functions, and/or benefits of some of the embodiments disclosed herein.

Hardware 1304 includes processing circuitry, memory that stores software and/or instructions executable by hardware processing circuitry, and/or other hardware devices as described herein, such as a network interface, input/output interface, and so forth. Software may be executed by the processing circuitry to instantiate one or more virtualization layers 1306 (also referred to as hypervisors or VM Monitors (VMMs)), provide VMs 1308A and 1308B (one or more of which may be generally referred to as VMs 1308), and/or perform any of the functions, features, and/or benefits described in relation with some embodiments described herein. The virtualization layer 1306 may present a virtual operating platform that appears like networking hardware to the VMs 1308.

The VMs 1308 comprise virtual processing, virtual memory, virtual networking or interface and virtual storage, and may be run by a corresponding virtualization layer 1306. Different embodiments of the instance of a virtual appliance 1302 may be implemented on one or more of the VMs 1308, and the implementations may be made in different ways. Virtualization of the hardware is in some contexts referred to as Network Function Virtualization (NFV). NFV may be used to consolidate many network equipment types onto industry standard high volume server hardware, physical switches, and physical storage, which can be located in data centers and customer premise equipment.

In the context of NFV, a VM 1308 may be a software implementation of a physical machine that runs programs as if they were executing on a physical, non-virtualized machine. Each of the VMs 1308, and that part of the hardware 1304 that executes that VM, be it hardware dedicated to that VM and/or hardware shared by that VM with others of the VMs 1308, forms separate virtual network elements. Still in the context of NFV, a virtual network function is responsible for handling specific network functions that run in one or more VMs 1308 on top of the hardware 1304 and corresponds to the application 1302.

The hardware 1304 may be implemented in a standalone network node with generic or specific components. The hardware 1304 may implement some functions via virtualization. Alternatively, the hardware 1304 may be part of a larger cluster of hardware (e.g., such as in a data center or CPE) where many hardware nodes work together and are managed via management and orchestration 1310, which, among others, oversees lifecycle management of the applications 1302. In some embodiments, the hardware 1304 is coupled to one or more radio units that each include one or more transmitters and one or more receivers that may be coupled to one or more antennas. Radio units may communicate directly with other hardware nodes via one or more appropriate network interfaces and may be used in combination with the virtual components to provide a virtual node with radio capabilities, such as a RAN or a BS. In some embodiments, some signaling can be provided with the use of a control system 1312 which may alternatively be used for communication between hardware nodes and radio units.

Figure 14:
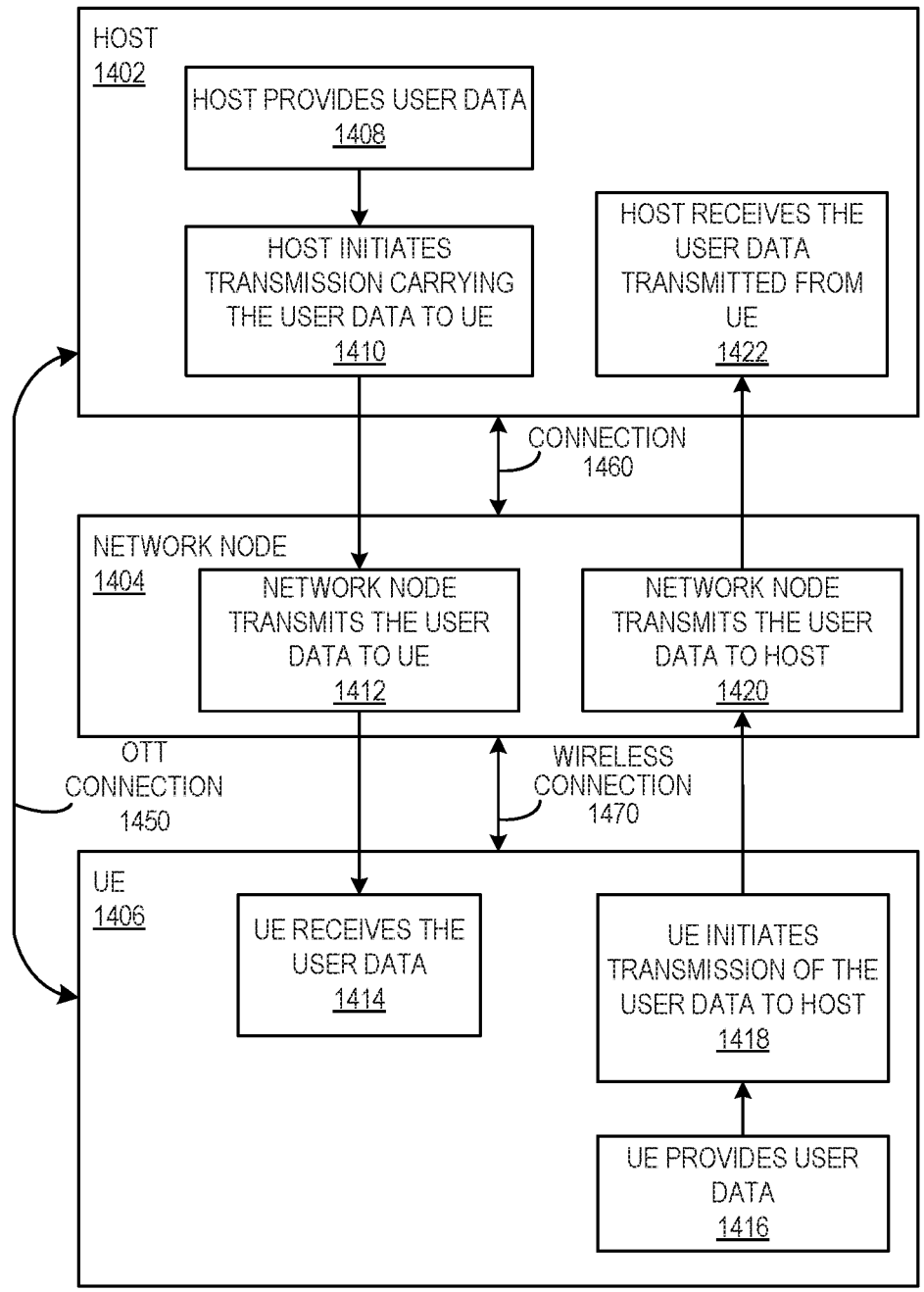
FIG. 14 shows a communication diagram of a host communicating via a network node with a UE over a partially wireless connection in accordance with some embodiments.

FIG. 14 shows a communication diagram of a host 1402 communicating via a network node 1404 with a UE 1406 over a partially wireless connection in accordance with some embodiments. Example implementations, in accordance with various embodiments, of the UE (such as the UE 912A of FIG. 9 and/or the UE 1000 of FIG. 10), the network node (such as the network node 910A of FIG. 9 and/or the network node 1100 of FIG. 11), and the host (such as the host 916 of FIG. 9 and/or the host 1200 of FIG. 12) discussed in the preceding paragraphs will now be described with reference to FIG. 14.

Like the host 1200, embodiments of the host 1402 include hardware, such as a communication interface, processing circuitry, and memory. The host 1402 also includes software, which is stored in or is accessible by the host 1402 and executable by the processing circuitry. The software includes a host application that may be operable to provide a service to a remote user, such as the UE 1406 connecting via an OTT connection 1450 extending between the UE 1406 and the host 1402. In providing the service to the remote user, a host application may provide user data which is transmitted using the OTT connection 1450.

The network node 1404 includes hardware enabling it to communicate with the host 1402 and the UE 1406 via a connection 1460. The connection 1460 may be direct or pass through a core network (like the core network 906 of FIG. 9) and/or one or more other intermediate networks, such as one or more public, private, or hosted networks. For example, an intermediate network may be a backbone network or the Internet.

The UE 1406 includes hardware and software, which is stored in or accessible by the UE 1406 and executable by the UE's processing circuitry. The software includes a client application, such as a web browser or operator-specific "app" that may be operable to provide a service to a human or non-human user via the UE 1406 with the support of the host 1402. In the host 1402, an executing host application may communicate with the executing client application via the OTT connection 1450 terminating at the UE 1406 and the host 1402. In providing the service to the user, the UE's client application may receive request data from the host's host application and provide user data in response to the request data. The OTT connection 1450 may transfer both the request data and the user data. The UE's client application may interact with the user to generate the user data that it provides to the host application through the OTT connection 1450.

The OTT connection 1450 may extend via the connection 1460 between the host 1402 and the network node 1404 and via a wireless connection 1470 between the network node 1404 and the UE 1406 to provide the connection between the host 1402 and the UE 1406. The connection 1460 and the wireless connection 1470, over which the OTT connection 1450 may be provided, have been drawn abstractly to illustrate the communication between the host 1402 and the UE 1406 via the network node 1404, without explicit reference to any intermediary devices and the precise routing of messages via these devices.

As an example of transmitting data via the OTT connection 1450, in step 1408, the host 1402 provides user data, which may be performed by executing a host application. In some embodiments, the user data is associated with a particular human user interacting with the UE 1406. In other embodiments, the user data is associated with a UE 1406 that shares data with the host 1402 without explicit human interaction. In step 1410, the host 1402 initiates a transmission carrying the user data towards the UE 1406. The host 1402 may initiate the transmission responsive to a request transmitted by the UE 1406. The request may be caused by human interaction with the UE 1406 or by operation of the client application executing on the UE 1406. The transmission may pass via the network node 1404 in accordance with the teachings of the embodiments described throughout this disclosure. Accordingly, in step 1412, the network node 1404 transmits to the UE 1406 the user data that was carried in the transmission that the host 1402 initiated, in accordance with the teachings of the embodiments described throughout this disclosure. In step 1414, the UE 1406 receives the user data carried in the transmission, which may be performed by a client application executed on the UE 1406 associated with the host application executed by the host 1402.

In some examples, the UE 1406 executes a client application which provides user data to the host 1402. The user data may be provided in reaction or response to the data received from the host 1402. Accordingly, in step 1416, the UE 1406 may provide user data, which may be performed by executing the client application. In providing the user data, the client application may further consider user input received from the user via an input/output interface of the UE 1406. Regardless of the specific manner in which the user data was provided, the UE 1406 initiates, in step 1418, transmission of the user data towards the host 1402 via the network node 1404. In step 1420, in accordance with the teachings of the embodiments described throughout this disclosure, the network node 1404 receives user data from the UE 1406 and initiates transmission of the received user data towards the host 1402. In step 1422, the host 1402 receives the user data carried in the transmission initiated by the UE 1406.

One or more of the various embodiments improve the performance of OTT services provided to the UE 1406 using the OTT connection 1450, in which the wireless connection 1470 forms the last segment.

In an example scenario, factory status information may be collected and analyzed by the host 1402. As another example, the host 1402 may process audio and video data which may have been retrieved from a UE for use in creating maps. As another example, the host 1402 may collect and analyze real-time data to assist in controlling vehicle congestion (e.g., controlling traffic lights). As another example, the host 1402 may store surveillance video uploaded by a UE. As another example, the host 1402 may store or control access to media content such as video, audio, VR, or AR which it can broadcast, multicast, or unicast to UEs. As other examples, the host 1402 may be used for energy pricing, remote control of non-time critical electrical load to balance power generation needs, location services, presentation services (such as compiling diagrams etc. from data collected from remote devices), or any other function of collecting, retrieving, storing, analyzing, and/or transmitting data.

In some examples, a measurement procedure may be provided for the purpose of monitoring data rate, latency, and other factors on which the one or more embodiments improve. There may further be an optional network functionality for reconfiguring the OTT connection 1450 between the host 1402 and the UE 1406 in response to variations in the measurement results. The measurement procedure and/or the network functionality for reconfiguring the OTT connection 1450 may be implemented in software and hardware of the host 1402 and/or the UE 1406. In some embodiments, sensors (not shown) may be deployed in or in association with other devices through which the OTT connection 1450 passes; the sensors may participate in the measurement procedure by supplying values of the monitored quantities exemplified above, or by supplying values of other physical quantities from which software may compute or estimate the monitored quantities. The reconfiguring of the OTT connection 1450 may include message format, retransmission settings, preferred routing, etc.; the reconfiguring need not directly alter the operation of the network node 1404. Such procedures and functionalities may be known and practiced in the art. In certain embodiments, measurements may involve proprietary UE signaling that facilitates measurements of throughput, propagation times, latency, and the like by the host 1402. The measurements may be implemented in that software causes messages to be transmitted, in particular empty or 'dummy' messages, using the OTT connection 1450 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions, and methods disclosed herein. Determining, calculating, obtaining, or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box or nested within multiple boxes, in practice computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hardwired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole and/or by end users and a wireless network generally.

Some example embodiments of the present disclosure are as follows:

Group A Embodiments

Embodiment 1: A method performed by a User Equipment, UE, the method comprising one or more of the following:
  receiving, from a network node, information that, for a CJT CSI report, configures the UE with:
    two or more CSI-RS resources or two or more CSI-RS ports groups for a single CSI-RS resource, each transmitted from one of two or more TRPs; and
    a set of parameters comprising a number of spatial beams and a number of frequency domain, FD, basis vectors, either for each TRP or across TRPs;
  measuring channels associated with each TRP based on the two or more CSI-RS resources or the two or more CSI-RS port groups;
  determining a number of spatial beams per TRP and a number of FD basis vectors either per TRP or across all TRPs;
  computing a precoding matrix for each MIMO layer, comprising a set of non-zero coefficients associated with each TRP, based on the determined beams and FD basis vectors, where the non-zero coefficients are determined per TRP or across all TRPs.
  indicating the associated beams and FD basis vectors of the non-zero coefficients with a bitmap, either one per TRP or one across all TRPs, where each bit in the bitmap is associated to a beam and FD basis vector pair and if a bit is set to 1, the corresponding coefficient associated to the beam and FD basis vector pair is a non-zero coefficient; and
  assigning a priority level to each of the non-zero coefficients and the corresponding bit in the bitmap according to an order of the associated TRP or CSI-RS resource or CSI-RS port groups, where coefficients associated to different TRPs are assigned different priority levels;
  wherein the non-zero coefficients and the bitmap are ordered according to their priority levels into different groups, and, when reporting CSI, the UE drops lower priority groups first, if needed.

Embodiment 2: The method of embodiment 1 wherein the order of the associated TRP or CSI-RS resource or CSI-RS port groups is according to an order that the CSI-RS resources present in a CSI-RS resource set configured for the CJT CSI report.

Embodiment 3: The method of embodiment 1 wherein the order of the associated TRP or CSI-RS resource or CSI-RS port groups is determined by the UE based on one or more predefined or configured criteria (e.g., received CSI-RS power) and reported to the network node (e.g., as part of the CSI report).

Embodiment 4: A method performed by a User Equipment, UE, (502), the method comprising:
- receiving (504), from a network node (500), a type II codebook, CB, refinement based CJT CSI report configuration, the configuration comprising information that configures the UE with:
  - $N_{RS}$ CSI-RS resources or $N_{RS}$ port groups of a single CSI-RS resource, each transmitted from one of $N_{RS}$ TRPs; and
  - a number $L_S$ of spatial beams associated with the $s^{th}$ (s=1, ..., $N_{RS}$) CSI-RS resource or port group for CJT; and
- measuring (508) channels associated with the TRPs based on the $N_{RS}$ CSI-RS resources or $N_{RS}$ port groups;
- computing (508), based on the measured channels, CJT CSI comprising a rank indicator, a channel quality indicator, and a precoding matrix indicator, wherein the precoding matrix indicator comprises $N_{RS}$ per TRP PMIs each with Ls (s=1, ..., $N_{RS}$) selected spatial beams and $M_{v,s}$ selected frequency domain, FD, basis vectors associated with the $s^{th}$ CSI-RS resource or port group;
- reporting (510) the CJT CSI in a first part and a second part, wherein:
  - the first part of the CJT CSI comprises one or more of:
    - the rank indicator (if reported);
    - the channel quality indicator;
    - an indication of an overall number of non-zero amplitude coefficients across layers and all TRPs; and
    - a priority order of the $N_{RS}$ per TRP PMIs reported in the second part of the CJT CSI; and
  - the second part of the CJT CSI comprises three groups of parameters (Group 0, Group 1, and Group 2) arranged according to priority, wherein one or more of the groups of parameters are omitted, or dropped, if needed.

Embodiment 5: The method of embodiment 4 wherein reporting (510) the CJT CSI comprises omitting, or dropping, at least one of the three groups of parameters comprised in the second part of the CJT CSI, wherein Group 2 is dropped first, Group 1 is dropped next if needed, and Group 0 is dropped last if needed.

Embodiment 6: A method performed by a User Equipment, UE, (802), the method comprising:
- receiving (804), from a network node (800), a type II codebook, CB, refinement based CJT CSI report configuration, the configuration comprising information that configures the UE with:
  - $N_{RS}$ CSI-RS resources or $N_{RS}$ port groups of a single CSI-RS resource, each transmitted from one of $N_{RS}$ TRPs; and
  - a number L of spatial beams for CJT; and
- measuring (808) an aggregate channel based on the $N_{RS}$ CSI-RS resources or $N_{RS}$ port groups;
- computing (808), based on the aggregate channel, CJT CSI comprising:
  - a rank indicator (if reported);
  - a channel quality indicator; and
  - a precoding matrix indicator comprising:
    - $L'=L_1+ \ldots +L_{N_{RS}}$ (1<L'≤L) spatial beams, where $L_s$ (s=1, $N_{RS}$) is the number of selected beams associated with the $s^{th}$ CSI-RS resource or the $s^{th}$ port group, and $0 \le L_s \le \min(L, P_{CSI-RS}^{(k)}/2)$, where $P_{CSI-RS}^{(k)}$ is the number of CSI-RS ports of the $s^{th}$ CSI-RS resource; and FCSI-RS
  - My selected FD basis vectors associated with all $N_{RS}$ CSI-RS resources or $N_{RS}$ port groups;
- reporting (810) the CJT CSI in a first part and a second part, wherein:
  - the first part of the CJT CSI comprises one or more of:
    - the rank indicator (if reported);
    - the channel quality indicator;
    - an indication of an overall number of non-zero amplitude coefficients across layers and all TRPs; and
    - an order of the $N_{RS}$ CSI-RS resources used in the precoding matrix; and
  - the second part of the CJT CSI comprises three groups of parameters (Group 0, Group 1, and Group 2) arranged according to priority, wherein Group 0 comprising one or more of indictors of selected beams, the strongest beam, wideband amplitudes per TRP, and Group 1 comprising higher priority non-zero coefficients and non-zero coefficient bit maps, and Group 2 comprising lower priority coefficients and non-zero coefficient bit maps, wherein coefficients associated with a CSI-RS with a lower index has a higher priority, and wherein one or more of the groups of parameters are omitted, or dropped, if needed.

Embodiment 7: The method of embodiment 6 wherein reporting (810) the CJT CSI comprises omitting, or dropping, at least one of the three groups of parameters comprised in the second part of the CJT CSI, wherein Group 2 is dropped first, Group 1 is dropped next if needed, and Group 0 is dropped last if needed.

Embodiment 8: The method of any of the previous embodiments, further comprising: providing user data; and forwarding the user data to a host via the transmission to the network node.

Group B Embodiments

Embodiment 9: A method performed by a network node (500), the method comprising:
- sending (504), to a User Equipment, UE, (502), a type II codebook, CB, based CJT CSI report configuration, the configuration comprising information that configures the UE with:
  - $N_{RS}$ CSI-RS resources or $N_{RS}$ port groups of a single CSI-RS resource, each transmitted from one of $N_{RS}$ TRPs; and
  - a number $L_S$ of spatial beams associated with the $s^{th}$ (s=1, ..., $N_{RS}$) CSI-RS resource or port group for CJT; and
- computing (508), based on the measured channels, CJT CSI comprising a rank indicator, a channel quality indicator, and a precoding matrix indicator, wherein the precoding matrix indicator comprises $N_{RS}$ per TRP PMIs each with $L_S$ (s=1, ..., $N_{RS}$) selected spatial beams and $M_{v,s}$ selected frequency domain, FD, basis vectors associated with the $s^{th}$ CSI-RS resource or port group;

receiving (510), from the UE (502), a report of CJT CSI comprising a first part and a second part, wherein:
the first part of the CJT CSI comprises:
a rank indicator (if reported);
a channel quality indicator;
an indication of an overall number of non-zero amplitude coefficients across layers and all TRPs; and
a priority order of $N_{RS}$ per TRP PMIs reported in the second part of the CJT CSI, wherein each of the $N_{RS}$ per TRP PMIs comprises $L_S$ ($s=1, \ldots, N_{RS}$) selected spatial beams and $M_{v,s}$ selected frequency domain, FD, basis vectors associated with the $s^{th}$ CSI-RS resource or port group; and
the second part of the CJT CSI comprises three groups of parameters (Group 0, Group 1, and Group 2) arranged according to priority, wherein one or more of the groups of parameters are omitted, or dropped, by the UE if needed.

Embodiment 10: A method performed by a network node (800), the method comprising:
sending (804), to a User Equipment, UE, (802), a type II codebook, CB, based CJT CSI report configuration, the configuration comprising information that configures the UE with:
$N_{RS}$ CSI-RS resources or $N_{RS}$ port groups of a single CSI-RS resource, each transmitted from one of $N_{RS}$ TRPs; and
a number L of spatial beams for CJT; and
computing (808), based on the aggregate channel, CJT CSI comprising:
a rank indicator (if reported);
a channel quality indicator; and
a precoding matrix indicator, PMI, comprising:
$L'=L_1+ \ldots +L_{N_{RS}}$ ($1<L'\leq L$) spatial beams, where $L_s$ ($s=1, \ldots, N_{RS}$) is the number of selected beams associated with the $s^{th}$ CSI-RS resource or the $s^{th}$ port group, and $0\leq L_s \leq \min(L, P_{CSI-RS}^{(k)}/2)$, where $P_{CSI-RS}^{(k)}$ is the number of CSI-RS ports of the $s^{th}$ CSI-RS resource; and
$M_v$ selected FD basis vectors associated with all $N_{RS}$ CSI-RS resources or $N_{RS}$ port groups;
receiving (810), from the UE (802), a report of the CJT CSI in a first part and a second part, wherein:
the first part of the CJT CSI comprises:
a rank indicator (if reported);
a channel quality indicator; and
an indication of an overall number of non-zero amplitude coefficients across layers and all TRPs; and
the second part of the CJT CSI for reporting the PMI, the second part of the CJT CSI comprising three groups of parameters (Group 0, Group 1, and Group 2) arranged according to priority, wherein one or more of the groups of parameters are omitted, or dropped, if needed.

Embodiment 11: The method of any of the previous embodiments, further comprising: obtaining user data; and forwarding the user data to a host or a user equipment.

Group C Embodiments

Embodiment 12: A user equipment comprising: processing circuitry configured to perform any of the steps of any of the Group A embodiments; and power supply circuitry configured to supply power to the processing circuitry.

Embodiment 13: A network node comprising: processing circuitry configured to perform any of the steps of any of the Group B embodiments; and power supply circuitry configured to supply power to the processing circuitry.

Embodiment 14: A user equipment (UE) comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

Embodiment 15: A host configured to operate in a communication system to provide an over-the-top (OTT) service, the host comprising:
processing circuitry configured to provide user data; and
a network interface configured to initiate transmission of the user data to a cellular network for transmission to a user equipment (UE),
wherein the UE comprises a communication interface and processing circuitry, the communication interface and processing circuitry of the UE being configured to perform any of the steps of any of the Group A embodiments to receive the user data from the host.

Embodiment 16: The host of the previous embodiment, wherein the cellular network further includes a network node configured to communicate with the UE to transmit the user data to the UE from the host.

Embodiment 17: The host of the previous 2 embodiments, wherein:
the processing circuitry of the host is configured to execute a host application, thereby providing the user data; and
the host application is configured to interact with a client application executing on the UE, the client application being associated with the host application.

Embodiment 18: A method implemented by a host operating in a communication system that further includes a network node and a user equipment (UE), the method comprising: providing user data for the UE; and initiating a transmission carrying the user data to the UE via a cellular network comprising the network node, wherein the UE performs any of the operations of any of the Group A embodiments to receive the user data from the host.

Embodiment 19: The method of the previous embodiment, further comprising: at the host, executing a host application associated with a client application executing on the UE to receive the user data from the UE.

Embodiment 20: The method of the previous embodiment, further comprising: at the host, transmitting input data to the client application executing on the UE, the input data being provided by executing the host application, wherein the user data is provided by the client application in response to the input data from the host application.

Embodiment 21: A host configured to operate in a communication system to provide an over-the-top (OTT) service, the host comprising:
processing circuitry configured to provide user data; and
a network interface configured to initiate transmission of the user data to a cellular network for transmission to a user equipment (UE),
wherein the UE comprises a communication interface and processing circuitry, the communication interface and processing circuitry of the UE being configured to perform any of the steps of any of the Group A embodiments to transmit the user data to the host.

Embodiment 22: The host of the previous embodiment, wherein the cellular network further includes a network node configured to communicate with the UE to transmit the user data from the UE to the host.

Embodiment 23: The host of the previous 2 embodiments, wherein: the processing circuitry of the host is configured to execute a host application, thereby providing the user data; and the host application is configured to interact with a client application executing on the UE, the client application being associated with the host application.

Embodiment 24: A method implemented by a host configured to operate in a communication system that further includes a network node and a user equipment (UE), the method comprising: at the host, receiving user data transmitted to the host via the network node by the UE, wherein the UE performs any of the steps of any of the Group A embodiments to transmit the user data to the host.

Embodiment 25: The method of the previous embodiment, further comprising: at the host, executing a host application associated with a client application executing on the UE to receive the user data from the UE.

Embodiment 26: The method of the previous embodiment, further comprising: at the host, transmitting input data to the client application executing on the UE, the input data being provided by executing the host application, wherein the user data is provided by the client application in response to the input data from the host application.

Embodiment 27: A host configured to operate in a communication system to provide an over-the-top (OTT) service, the host comprising: processing circuitry configured to provide user data; and a network interface configured to initiate transmission of the user data to a network node in a cellular network for transmission to a user equipment (UE), the network node having a communication interface and processing circuitry, the processing circuitry of the network node configured to perform any of the operations of any of the Group B embodiments to transmit the user data from the host to the UE.

Embodiment 28: The host of the previous embodiment, wherein: the processing circuitry of the host is configured to execute a host application that provides the user data; and the UE comprises processing circuitry configured to execute a client application associated with the host application to receive the transmission of user data from the host.

Embodiment 29: A method implemented in a host configured to operate in a communication system that further includes a network node and a user equipment (UE), the method comprising: providing user data for the UE; and initiating a transmission carrying the user data to the UE via a cellular network comprising the network node, wherein the network node performs any of the operations of any of the Group B embodiments to transmit the user data from the host to the UE.

Embodiment 30: The method of the previous embodiment, further comprising, at the network node, transmitting the user data provided by the host for the UE.

Embodiment 31: The method of any of the previous 2 embodiments, wherein the user data is provided at the host by executing a host application that interacts with a client application executing on the UE, the client application being associated with the host application.

Embodiment 32: A communication system configured to provide an over-the-top service, the communication system comprising:
a host comprising:
processing circuitry configured to provide user data for a user equipment (UE), the user data being associated with the over-the-top service; and
a network interface configured to initiate transmission of the user data toward a cellular network node for transmission to the UE, the network node having a communication interface and processing circuitry, the processing circuitry of the network node configured to perform any of the operations of any of the Group B embodiments to transmit the user data from the host to the UE.

Embodiment 33: The communication system of the previous embodiment, further comprising: the network node; and/or the user equipment.

Embodiment 34: A host configured to operate in a communication system to provide an over-the-top (OTT) service, the host comprising: processing circuitry configured to initiate receipt of user data; and a network interface configured to receive the user data from a network node in a cellular network, the network node having a communication interface and processing circuitry, the processing circuitry of the network node configured to perform any of the operations of any of the Group B embodiments to receive the user data from a user equipment (UE) for the host.

Embodiment 35: The host of the previous 2 embodiments, wherein: the processing circuitry of the host is configured to execute a host application, thereby providing the user data; and the host application is configured to interact with a client application executing on the UE, the client application being associated with the host application.

Embodiment 36: The host of the any of the previous 2 embodiments, wherein the initiating receipt of the user data comprises requesting the user data.

Embodiment 37: A method implemented by a host configured to operate in a communication system that further includes a network node and a user equipment (UE), the method comprising: at the host, initiating receipt of user data from the UE, the user data originating from a transmission which the network node has received from the UE, wherein the network node performs any of the steps of any of the Group B embodiments to receive the user data from the UE for the host.

Embodiment 38: The method of the previous embodiment, further comprising at the network node, transmitting the received user data to the host.

Those skilled in the art will recognize improvements and modifications to the embodiments of the present disclosure. All such improvements and modifications are considered within the scope of the concepts disclosed herein.

The invention claimed is:

1. A method performed by a User Equipment, UE, for Channel State Information, CSI, feedback, the method comprising:
receiving, from a network node, a CSI report configuration that configures the UE for Coherent Joint Transmission, CJT, CSI reporting, the CSI report configuration comprising an indication of $N_{RS} > 1$ CSI Reference Signal, CSI-RS, resources indexed by s (s=1,2, . . . , $N_{RS}$) for channel measurement and a codebook configuration corresponding to a number of antenna ports;

measuring channels based on the $N_{RS}>1$ CSI-RS resources;

determining, based on the measured channels, a number, $v \geq 1$, of layers indexed by l (l=1,2, . . . , v), a number, $2L_s$ (where $L_s \geq 0$ is an integer), of spatial beams or CSI-RS ports indexed by $i_s$ ($i_s$=0,1, . . . , $2L_s$−1) for each s-th CSI-RS resource of the $N_{RS}$ CSI-RS resources, and a number, $M_v \geq 1$, of frequency domain, FD, basis vectors indexed by f (f=0,1, . . . , $M_v$−1) for each of the v layers;

computing CSI based on the determined spatial beams or CSI-RS ports and FD basis vectors, wherein the CSI comprises a precoding matrix indicator, PMI, indicating a precoding matrix comprising a set of coefficients, wherein each of the set of coefficients is associated to one of the determined layers, one of the $N_{RS}$ CSI-RS resources having at least one determined spatial beam or port (i.e., $L_s > 0$), one of the determined spatial beams or ports and one of the determined FD basis vectors associated to the one CSI-RS resource, and is indexed by l, $i_s$, s, and f, and wherein the PMI further comprises a non-zero coefficients, NZC, bit map wherein each bit in the bitmap is associated to one of the set of coefficients and indicates whether an associated coefficient is zero or non-zero, wherein only non-zero coefficients are reported;

assigning a priority index to each of the set of coefficients, wherein a different priority index is assigned to different coefficients and wherein the priority indices are allocated from low index value to high index value to the coefficients in an increasing order of l first, then $i_s$, then s, and then a permutated FD basis vector index $\pi(f)$ ($\pi(f)$=0, 1, . . . , $M_{v,s}$−1), wherein the lowest priority index is allocated to one of the set of coefficients associated to {l=1, $i_s$=0, s=1, $\pi(f)$=0} and the highest priority index is allocated to one of the set of coefficients associated to {l=v, $i_s$=$2L_s$−1, s=$N_{TRS}$, $\pi(f)$=$M_v$−1}; and transmitting, to the network node, a CSI report comprising the non-zero coefficient bitmap and non-zero coefficients in the set of coefficients indicated by the non-zero coefficient bitmap, wherein a first number of the lowest priority bits in the non-zero coefficient bitmap and a second number of the lowest priority non-zero coefficients in the set of coefficients are placed in a first group and the remaining bits in the non-zero coefficient bitmap and the remaining non-zero coefficients in the set of coefficients are placed in a second group in the CSI report.

2. The method of claim 1, wherein in case that some part of the CSI needs to be dropped, the first group is dropped first.

3. The method of claim 1, wherein the permutated FD basis vector index $\pi(f)$ is given by $$\pi(f) = \min(2 \cdot n_{3,l}^{(f)}, 2 \cdot (N_3 - n_{3,l}^{(f)}) - 1$$

where $N_3$ is a length of the FD basis vectors and $n_{3,l}^{(f)} \in (0, 1, . . . , N_3 - 1)$ is a FD basis vector index associated to the determined FD basis vector index f at layer l.

4. The method of claim 1, wherein the priority index, Pri (l, $i_s$, f, s), for each of the non-zero coefficients indexed by s, l, $i_s$, and f in the set of coefficients is given according to:

$$Pri(l, i_s, f, s) = 2 \cdot \sum_{k=1}^{N_{RS}} L_k \cdot v \cdot \pi(f) + v \cdot \left( \sum_{k=1}^{s-1} 2L_k + i_s \right) + l.$$

5. The method of claim 1, wherein the determined spatial beams or CSI-RS ports are indexed by $j \in (0, 1, 2, . . . , 2\Sigma_{s=1}^{N_{RS}} L_s - 1)$, across all the $N_{RS}$ CSI-RS resources in increasing order of s, where j=($\Sigma_{k=1}^{s-1} 2L_k$+i), and each non-zero coefficient in the set of coefficients is indexed by s, l, i, and f and is assigned with a priority index, Pri(l, i, f, s), given by:

$$Pri(l, i, f, s) =$$
$$2 \cdot \sum_{s=1}^{N_{RS}} L_s \cdot v \cdot \pi(f) + v \cdot j + l = 2 \cdot \sum_{k=1}^{N_{RS}} L_k \cdot v \cdot \pi(f) + v \left( \sum_{k=1}^{s-1} 2L_k + i \right) + l.$$

6. The method of claim 1, wherein the CSI further comprises information that indicates the number of determined spatial beams or ports for each of the $N_{RS}$ CSI-RS resources.

7. The method of claim 1, wherein the CSI report configuration further comprises an indication of a maximum total number, $K^{NZ}$, of non-zero coefficients to be reported in the CSI.

8. The method of claim 7, wherein the first number of the lowest priority bits in the non-zero coefficient bitmap is given by $\lceil K^{NZ}/2 \rceil$, a largest integer smaller than or equal to $K^{NZ}/2$.

9. The method of claim 7, wherein the second number of the lowest priority non-coefficients is given by min $$\left( K^{NZ} - v, \left\lfloor \frac{K^{NZ}}{2} \right\rfloor \right).$$

10. The method of claim 1, wherein each of the non-zero coefficients comprises an amplitude and a phase factor.

11. The method of claim 1, wherein the $N_{RS}$ CSI-RS resources are associated to $N_{RS}$ Transmission and Reception Points, TRPs.

12. The method of claim 1, wherein:
the CSI report comprises a first part and a second part, and wherein the first part comprises information indicating one or more of
the determined number of layers or rank v;
the determined number of spatial beams or ports for each of the $N_{RS}$ CSI-RS resources,
total number of reported non-zero coefficients.

13. The method of claim 12, wherein the second part comprises the first group and the second group.

14. The method of claim 1, wherein the $N_{RS}$ CSI-RS resources are ordered according to their order of presence in the CSI report configuration.

15. The method of claim 1, wherein each of the $N_{RS}$ CSI-RS resources is associated with a resource index and the NRs CSI-RS resources are indexed in increasing order of the CSI-RS resource indices.

16. The method of claim 1, wherein the $N_{RS}$ CSI-RS resources are ordered in increasing order of their received power at the UE and the order is also reported in the CSI report.

17. A User Equipment, UE, for Channel State Information, CSI, feedback, the UE comprising processing circuitry configured to cause the UE to:
- receive, from a network node, a CSI report configuration that configures the UE for Coherent Joint Transmission, CJT, CSI reporting, the CSI report configuration comprising an indication of $N_{RS}>1$ CSI Reference Signal, CSI-RS, resources indexed by s (s=1, 2, . . . , $N_{RS}$) for channel measurement and a codebook configuration corresponding to a number of antenna ports;
- measure channels based on the $N_{RS}>1$ CSI-RS resources;
- determine, based on the measured channels, a number, $v \geq 1$, of layers indexed by l (l=1, 2, . . . , v), a number, $2L_s$ (where $L_s \geq 0$ is an integer), of spatial beams or CSI-RS ports indexed by $i_s$ ($i_s$=0,1, . . . ,$2L_s$−1) for each s-th CSI-RS resource of the $N_{RS}$ CSI-RS resources, and a number, $M_v \geq 1$, of frequency domain, FD, basis vectors indexed by f (f=0,1, . . . , $M_v$−1) for each of the v layers;
- compute CSI based on the determined spatial beams or CSI-RS ports and FD basis vectors, wherein the CSI comprises a precoding matrix indicator, PMI, indicating a precoding matrix comprising a set of coefficients, wherein each of the set of coefficients is associated to one of the determined layers, one of the $N_{RS}$ CSI-RS resources having at least one determined spatial beam or port (i.e., $L_s>0$), one of the determined spatial beams or ports and one of the determined FD basis vectors associated to the one CSI-RS resource, and is indexed by l, $i_s$, s, and f, and wherein the PMI further comprises a non-zero coefficients, NZC, bit map wherein each bit in the bitmap is associated to one of the set of coefficients and indicates whether an associated coefficient is zero or non-zero, wherein only non-zero coefficients are reported;
- assign a priority index to each of the set of coefficients, wherein a different priority index is assigned to different coefficients and wherein the priority indices are allocated from low index value to high index value to the coefficients in an increasing order of l first, then $i_s$, then s, and then a permutated FD basis vector index $\pi(f)$($\pi(f)$=0, 1, . . . , $M_{v,s}$−1), wherein the lowest priority index is allocated to one of the set of coefficients associated to {l=1, $i_s$=0, s=1, $\pi(f)$=0} and the highest priority index is allocated to one of the set of coefficients associated to {l=v, $i_s$=$2L_s$−1, s=$N_{TRS}$, $\pi(f)$=$M_v$−1}
- transmit, to the network node, a CSI report comprising the non-zero coefficient bitmap and non-zero coefficients in the set of coefficients indicated by the non-zero coefficient bitmap, wherein a first number of the lowest priority bits in the non-zero coefficient bitmap and a second number of the lowest priority non-zero coefficients in the set of coefficients are placed in a first group and the remaining bits in the non-zero coefficient bitmap and the remaining non-zero coefficients in the set of coefficients are placed in a second group in the CSI report.

18. A method performed by a network node for Channel State Information, CSI, feedback, the method comprising:
- sending, to a User Equipment, UE, a CSI report configuration that configures the UE for Coherent Joint Transmission, CJT, CSI reporting, the CSI report configuration comprising an indication of $N_{RS}>1$ CSI Reference Signal, CSI-RS, resources indexed by s (s=1, 2, . . . , $N_{RS}$) for channel measurement and a codebook configuration corresponding to a number of antenna ports;
- receiving, from the UE, a CSI report comprising a non-zero coefficient bitmap and non-zero coefficients in a set of coefficients indicated by the non-zero coefficient bitmap, wherein:
  - a different priority index is assigned to different coefficients in the set of coefficients and wherein the priority indices are allocated from low index value to high index value to the coefficients in an increasing order of layer index l (l=1, 2, . . . , v) first, then spatial beam or CSI-RS port index $i_s$ ($i_s$=0,1, . . . , $2L_s$−1), then s, and then a permutated FD basis vector index $\pi(f)$($\pi(f)$=0, 1, . . . , $M_{v,s}$−1), wherein the lowest priority index is allocated to one of the set of coefficients associated to {l=1, $i_s$=0, s=1, $\pi(f)$=0} and the highest priority index is allocated to one of the set of coefficients associated to {l=v, $i_s$=$2L_s$−1, s=$N_{TRS}$, $\pi(f)$=$M_v$−1}; and
  - a first number of the lowest priority bits in the non-zero coefficient bitmap and a second number of the lowest priority non-zero coefficients in the set of coefficients are placed in a first group and the remaining bits in the non-zero coefficient bitmap and the remaining non-zero coefficients in the set of coefficients are placed in a second group in the CSI report.

19. The method of claim 18, wherein the permutated FD basis vector index $\pi(f)$ is given by $$\pi(f) = \min(2 \cdot n_{3,l}^{(f)}, 2 \cdot (N_3 - n_{3,l}^{(f)}) - 1$$

where $N_3$ is a length of the FD basis vectors and $n_{3,l}^{(f)} \in (0, 1, \ldots, N_3-1)$ is a FD basis vector index associated to the determined FD basis vector index f at layer l.

20. The method of claim 18, wherein the priority index, Pri(l, $i_s$, f, s), for each of the non-zero coefficients indexed by s, l, $i_s$, and f in the set of coefficients is given according to:

$$Pri(l, i_s, f, s) = 2 \cdot \sum_{k=1}^{N_{RS}} L_k \cdot v \cdot \pi(f) + v \cdot \left(\sum_{k=1}^{s-1} 2L_k + i_s\right) + l.$$

* * * * *